(12) United States Patent
Fenske

(10) Patent No.: US 12,036,618 B2
(45) Date of Patent: Jul. 16, 2024

(54) WORKPIECE SHEARING APPARATUS

(71) Applicant: Greenlee Tools, Inc., Rockford, IL (US)

(72) Inventor: John Russell Fenske, Machesney Park, IL (US)

(73) Assignee: GREENLEE TOOLS, INC., Rockford, IL (US)

(*) Notice: Subject to any disclaimer, the term of this patent is extended or adjusted under 35 U.S.C. 154(b) by 0 days.

(21) Appl. No.: 18/069,468

(22) Filed: Dec. 21, 2022

(65) Prior Publication Data

US 2023/0405693 A1    Dec. 21, 2023

Related U.S. Application Data

(60) Continuation of application No. 17/367,778, filed on Jul. 6, 2021, now Pat. No. 11,565,332, which is a division of application No. 16/805,972, filed on Mar. 2, 2020, now Pat. No. 11,072,029, which is a division of application No. 15/816,591, filed on Nov. 17, 2017, now Pat. No. 10,576,557.

(51) Int. Cl.
| | |
|---|---|
| *B23D 23/00* | (2006.01) |
| *B23D 15/14* | (2006.01) |
| *B23D 29/00* | (2006.01) |
| *B23D 35/00* | (2006.01) |

(52) U.S. Cl.
CPC .............. *B23D 15/14* (2013.01); *B23D 23/00* (2013.01); *B23D 29/00* (2013.01); *B23D 29/002* (2013.01); *B23D 35/002* (2013.01)

(58) Field of Classification Search
CPC ........ B23D 15/14; B23D 23/00; B23D 29/00; B23D 29/002; B23D 35/002
USPC .................................................. 83/198, 200
See application file for complete search history.

(56) References Cited

U.S. PATENT DOCUMENTS

| | | | |
|---|---|---|---|
| 3,678,724 | A | 7/1972 | Stone et al. |
| 5,816,126 | A | 10/1998 | Pluber |
| 6,089,134 | A | 7/2000 | Marocco |
| 6,230,542 | B1 | 5/2001 | Frenken |
| 6,240,824 | B1 | 6/2001 | Hsu |
| 6,877,409 | B2 | 4/2005 | Huang et al. |

(Continued)

FOREIGN PATENT DOCUMENTS

| | | |
|---|---|---|
| DE | 1107485 B | 5/1961 |
| DE | 202012001605 U1 | 5/2013 |

(Continued)

OTHER PUBLICATIONS

Edwards—Wilton Strut Cutter (ESP1100), Amazon.com, https://www.amazon.com/Edwards-ESP1100-Strut-Pro/dp/B01MU9P5ID, Jan. 11, 2017, 6 pages.

(Continued)

*Primary Examiner* — Omar Flores Sanchez
(74) *Attorney, Agent, or Firm* — Klintworth & Rozenblat IP LLP

(57) ABSTRACT

A shearing apparatus includes a housing, dies within the housing, a force transmitting apparatus; and a die engaging mechanism between the force transmitting apparatus and the movable die. The dies are movable relative to each other and have cutouts which cut a workpiece. The die engaging mechanism is releasable to decouple the force transmitting apparatus from the movable die.

23 Claims, 40 Drawing Sheets

(56) References Cited

U.S. PATENT DOCUMENTS

| | | |
|---|---|---|
| 7,044,043 B2 | 5/2006 | Cheng et al. |
| D524,873 S | 7/2006 | Wickens |
| 7,069,833 B2 | 7/2006 | Roberts et al. |
| 7,107,889 B2 | 9/2006 | Marocco |
| 7,216,573 B2 | 5/2007 | Friend |
| D548,250 S | 8/2007 | Baumeister et al. |
| 7,278,345 B2 | 10/2007 | Schimmels |
| D565,951 S | 4/2008 | Sandford |
| D566,056 S | 4/2008 | Edmond et al. |
| D566,057 S | 4/2008 | Edmond et al. |
| D568,347 S | 5/2008 | Manera et al. |
| 7,444,910 B2 | 11/2008 | Marocco |
| 7,506,567 B2 | 3/2009 | Simokovic |
| D643,446 S | 8/2011 | Gupta et al. |
| D645,066 S | 9/2011 | Sakae |
| D659,470 S | 5/2012 | Narwankar et al. |
| D675,237 S | 1/2013 | Broadbent et al. |
| D686,065 S | 7/2013 | Kuo et al. |
| 8,739,666 B2 | 6/2014 | Kollman |
| D708,156 S | 7/2014 | Joo et al. |
| D714,368 S | 9/2014 | Kmoch et al. |
| D736,280 S | 8/2015 | Myrhum et al. |
| D741,921 S | 10/2015 | Jarvius et al. |
| D741,922 S | 10/2015 | Cowley |
| D764,554 S | 8/2016 | Charles et al. |
| D792,193 S | 7/2017 | Ullbors |
| D830,432 S | 10/2018 | Martino |
| RE47,416 E | 6/2019 | Lee |
| D866,623 S | 11/2019 | Fenske |
| D878,435 S | 3/2020 | Fenske |
| 2002/0029674 A1* | 3/2002 | Graves .............. E06B 9/266 83/633 |
| 2005/0166734 A1 | 8/2005 | Friend |
| 2008/0282857 A1* | 11/2008 | Khoury .............. B23D 21/00 83/54 |
| 2012/0006168 A1 | 1/2012 | Swopes et al. |

FOREIGN PATENT DOCUMENTS

| | | |
|---|---|---|
| GB | 854285 A | 11/1960 |
| KR | 101090070 B1 * | 12/2011 |
| WO | WO02076683 A1 | 10/2002 |

OTHER PUBLICATIONS

"Wilton Operating Instructions & Service Parts Manual—Hydraulic Strut Cutter #ESP1100, Manual No. M-ESP1100, Edition 2," Wilton, LaVergne, TN, Apr. 2017, 12 pages.

Extended European Search Report for corresponding European Patent Application No. 18206710.8 dated Apr. 2, 2019, 7 pages.

Claims for DE1107485B translated by Burg Translations with statement dated May 1, 2019.

* cited by examiner

WORKPIECE SHEARING APPARATUS

CROSS-REFERENCE TO RELATED APPLICATIONS

This application is a continuation application of U.S. application Ser. No. 17/367,778, filed on Jul. 6, 2021, which is a divisional application of U.S. application Ser. No. 16/805,972, filed on Mar. 2, 2020, now U.S. Pat. No. 11,072,029 issued on Jul. 27, 2021, which is a divisional application of U.S. application Ser. No. 15/816,591, filed on Nov. 17, 2017, now U.S. Pat. No. 10,576,557 B2 issued on Mar. 3, 2020, the contents of which are incorporated herein in its entirety.

FIELD OF THE DISCLOSURE

The present disclosure relates to an assembly for supporting and shearing a workpiece, for example strut channel and/or threaded rod.

BACKGROUND

Strut channel and threaded rod are used to support wiring, plumbing and other mechanical components in buildings. The strut channel and threaded rod are typically cut to length with a saw. Such sawing may cause burrs or sharp edges on the ends of the strut channel and threaded rod. The burrs or sharp edges are filed or ground down to remove them. This is a time-consuming process. Additionally, the sawing process may produce an undesirable cut end that is not perpendicular to the longitudinal direction.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
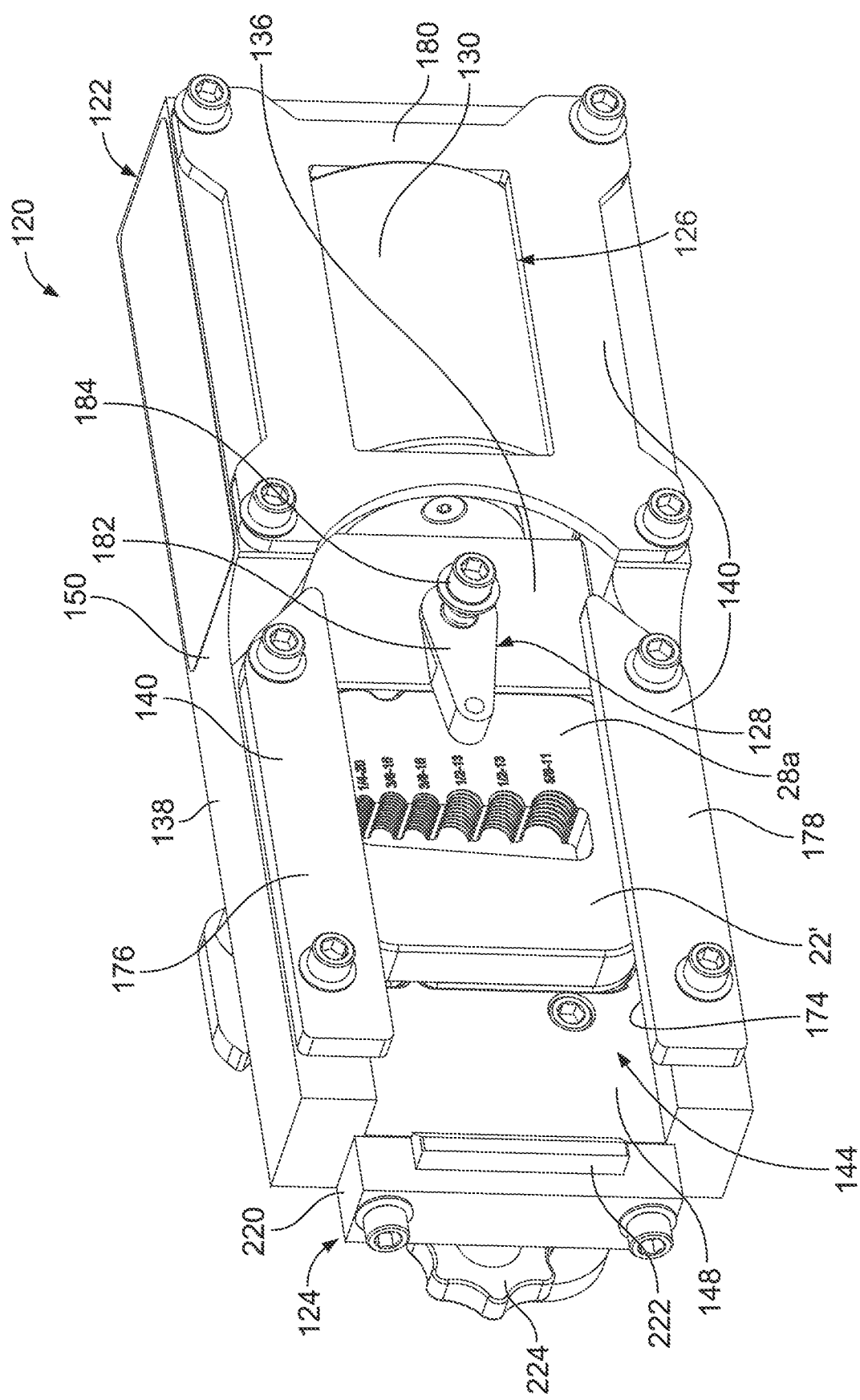
FIG. 1 depicts a perspective view of a shearing apparatus.
Figure 2:
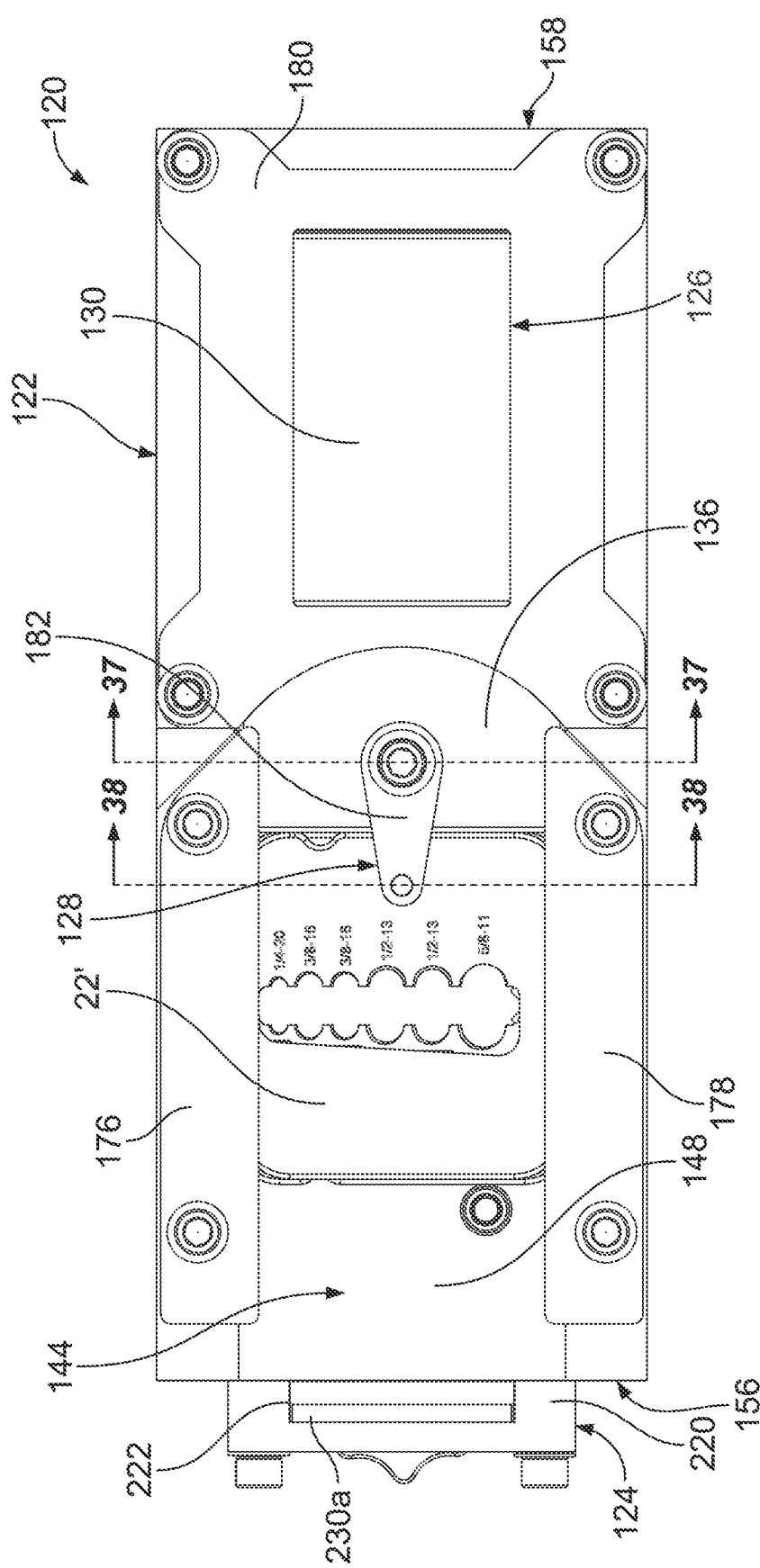
FIG. 2 depicts a side elevation view of the shearing apparatus.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A shearing apparatus 120 which is capable of cutting a workpiece is provided. Multiple dies 22, 22' having different shearing cutout profiles can be mounted in the shearing apparatus 120 to cut a variety of shapes of workpieces. Such a workpiece may be rigid, metallic, and have a continuous length. Examples of materials for the workpieces include, but are not limited to, steel and aluminum. Examples of workpieces include, but are not limited, to strut channel, threaded rod, din rail, cable tray, rebar, bus bar, Acme threaded rod, wire race way, ductway, light gauge angle, U-channel, I-beam, T-slotted framing, H-Bar, T-Bar, Z-Bar, sign posts, HVAC supports, wire rope/cable, guy wire, chains. The shearing apparatus 120 cuts the workpiece by shearing the workpiece between the dies 22, 22'. Shearing produces a clean cut and eliminates the need for a secondary deburring step and produces a perpendicular cut end. In addition, minimal chips are produced by shearing.

The shearing apparatus 120 has a pair of dies 22, 22' mounted therein. Each die 22, 22' used in the shearing apparatus 120 during a shearing operation in accordance with some example embodiments is identical which reduces the cost to manufacture the shearing apparatus 120. A single die 22 is described for ease in description.

The die 22 is formed of a plate 24 having an outer perimeter defined by an outer edge 26, first and second planar faces 28a, 28b, and a cutout 30 provided through the die 22 which extends from the first face 28a to the second face 28b. A thickness of the die 22, 22 is defined between the faces 28a, 28b. It is contemplated that the cutout 30 may be formed through the use of a mold, or through cutting means not limited to mechanical cutting, laser cutting, CNC machining, water jet cutting, or hydraulic cutting or through punch pressing means. The cutout 30 is sized to fittingly accommodate a workpiece having a cross-sectional shape similar to at least a portion of the cutout 30. In an embodiment, the die 22 is formed of tool steel. FIGS. 6-26 show embodiments of the shape of the outer edge 26 of the die 22; the elements shown in broken line illustrate a cutout 30, which may take a variety forms, and a receiving opening or openings 40, which may or may not be provided.

As shown in FIGS. 6-12, the outer edge 26 is formed from a first straight edge portion 26a, a second straight edge portion 26b extending from an end of the first edge portion 26a, a third straight edge portion 26c extending from the opposite end of the second edge portion 26b, and a fourth straight edge portion 26d extending from the opposite end of the third edge portion 26c. In some embodiments, the outer edge 26 generally forms a square or a rectangle such that the first and second straight edge portions 26a, 26b are perpendicular to each other and connected at a corner 32a, the second and third straight edge portions 26b, 26c are perpendicular to each other and are connected at a corner 32b, the third and fourth straight portions 26c, 26d are perpendicular to each other and are connected at a corner 32c, and the first and fourth straight portions 26a, 26d are perpendicular to each other and are connected at a corner 32d. In some embodiments, some or all of the corners 32a, 32b, 32c, 32d are radiused.

In some embodiments, as shown in FIGS. 13-19, the third straight edge portion 26c is interrupted by a groove 34 which extends inwardly from the third straight edge portion 26c and is proximate to, but spaced from, the second straight edge portion 26b, see FIGS. 6-12. In some embodiments, as shown in FIGS. 20-26, the third straight edge portion 26c is interrupted by the groove 34 which extends inwardly from the third straight edge portion 26c and is proximate to, but spaced from, the second straight edge portion 26b, and the first straight edge portion 26a is interrupted by a groove 36 which extends inwardly from the third straight edge portion 26c and is proximate to, but spaced from, the fourth straight edge portion 26d. The groove 34 or grooves 34, 36 extend from the first face 28a to the second face 28b. In an embodiment, the groove 34 is offset vertically from the groove 36. In some embodiments, the groove 34 is generally semi-circular or the grooves 34, 36 is generally semi-circular. The groove 34 or grooves 34, 36 may take other shapes, such as squared off, triangular, etc.

Figure 28:
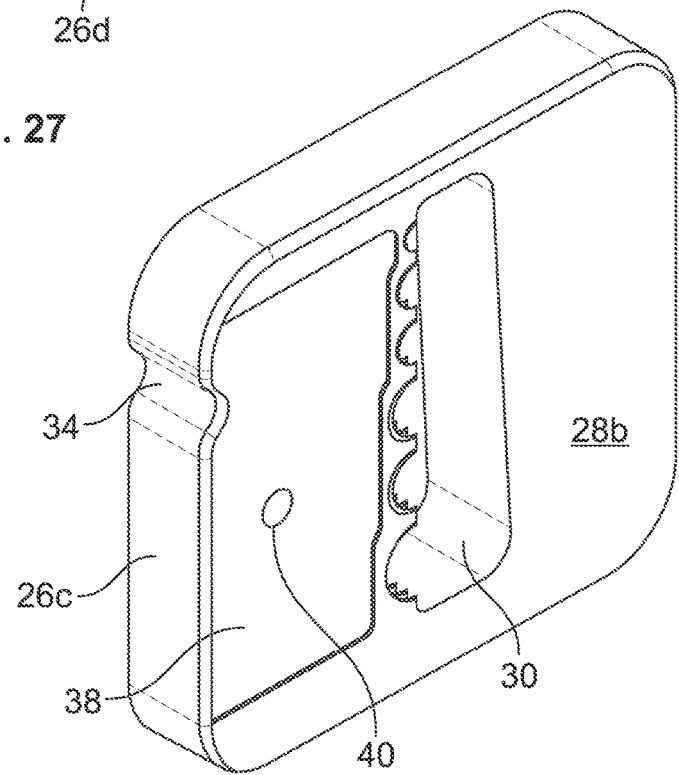
FIG. 28 depicts an alternate perspective view of the die of FIG. 27.

In some embodiments, a workpiece clearance pocket 38, see FIG. 28, is provided in the second face 28b of the die 22 and extends from the third edge portion 26c toward the cutout 30.

Figure 27:
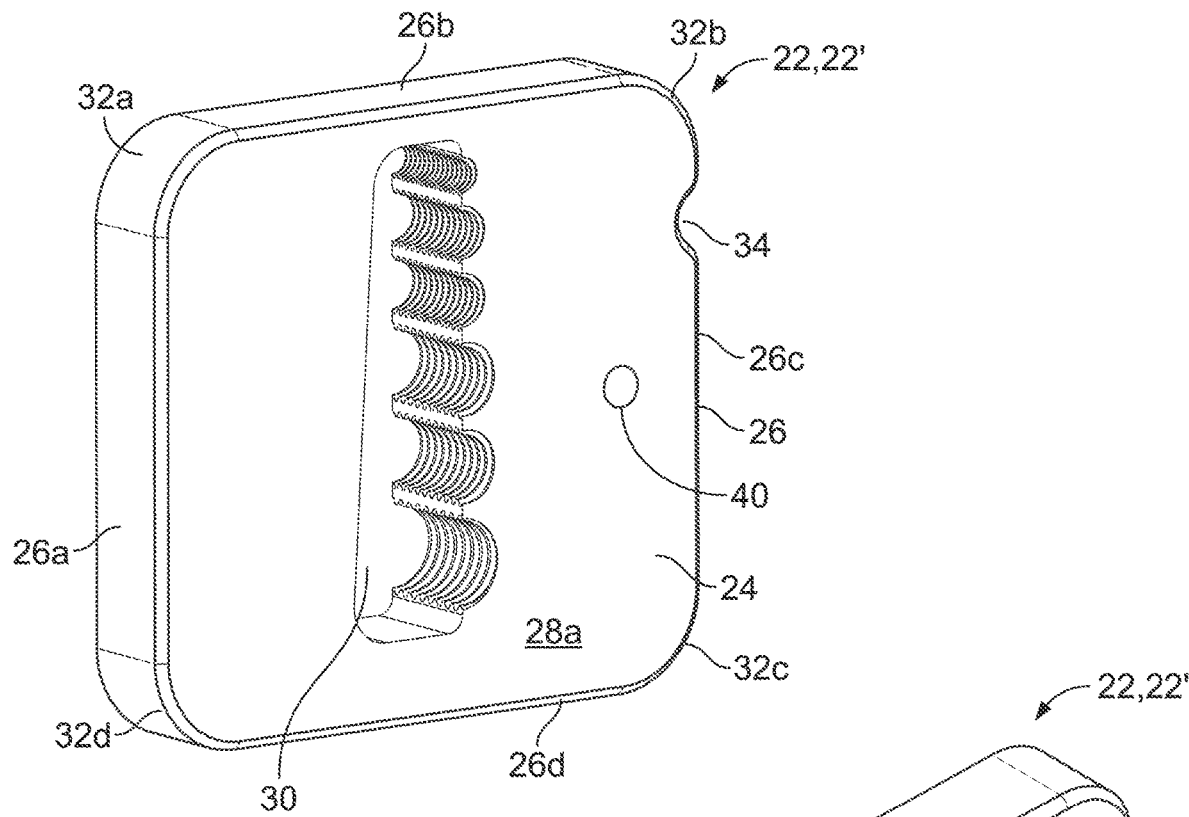
FIG. 27 depicts a perspective view of a die that can be used with the shearing apparatus.
Figure 29:
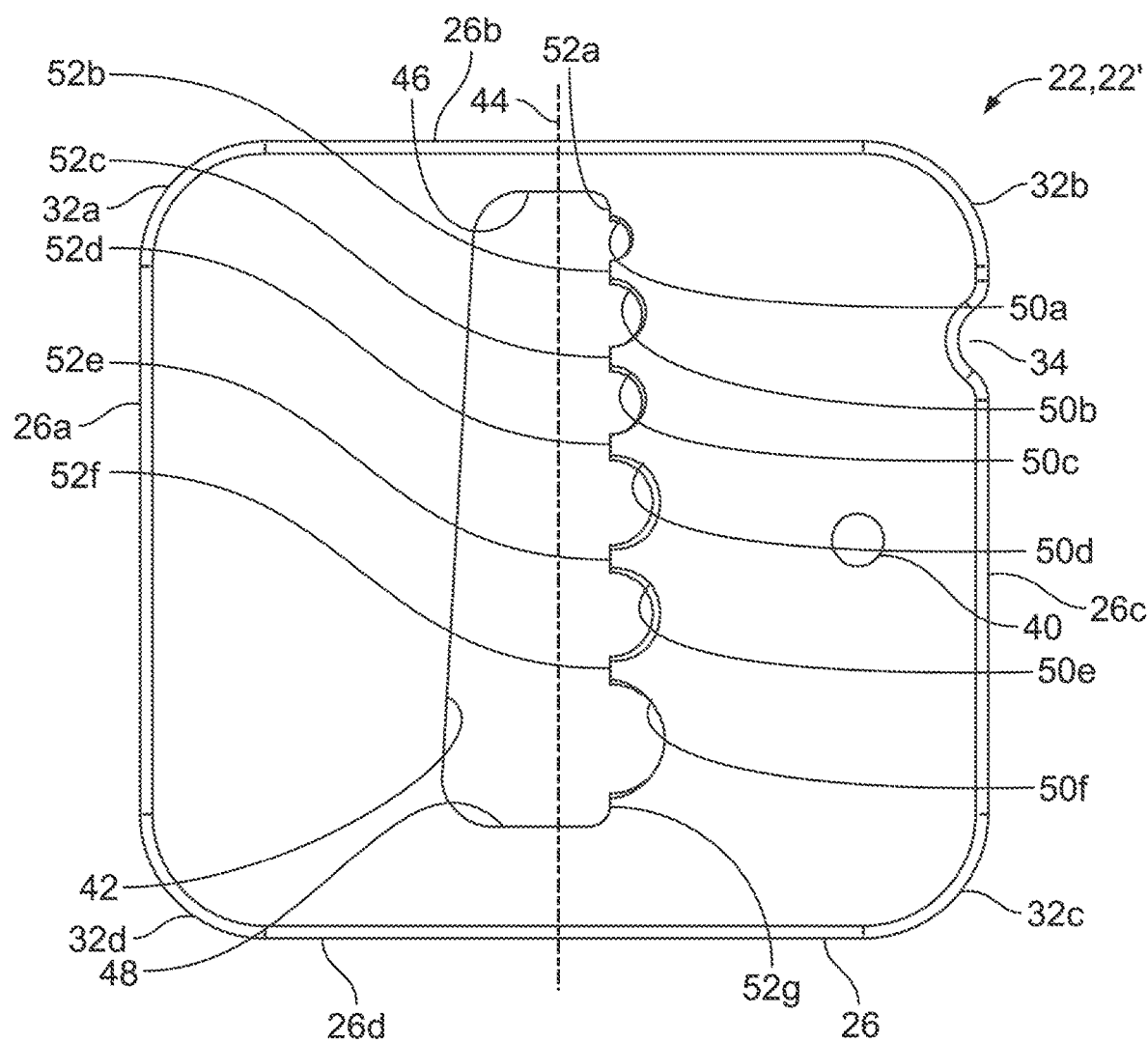
FIG. 29 depicts a side elevation view of the die of FIG. 27.
Figure 30:
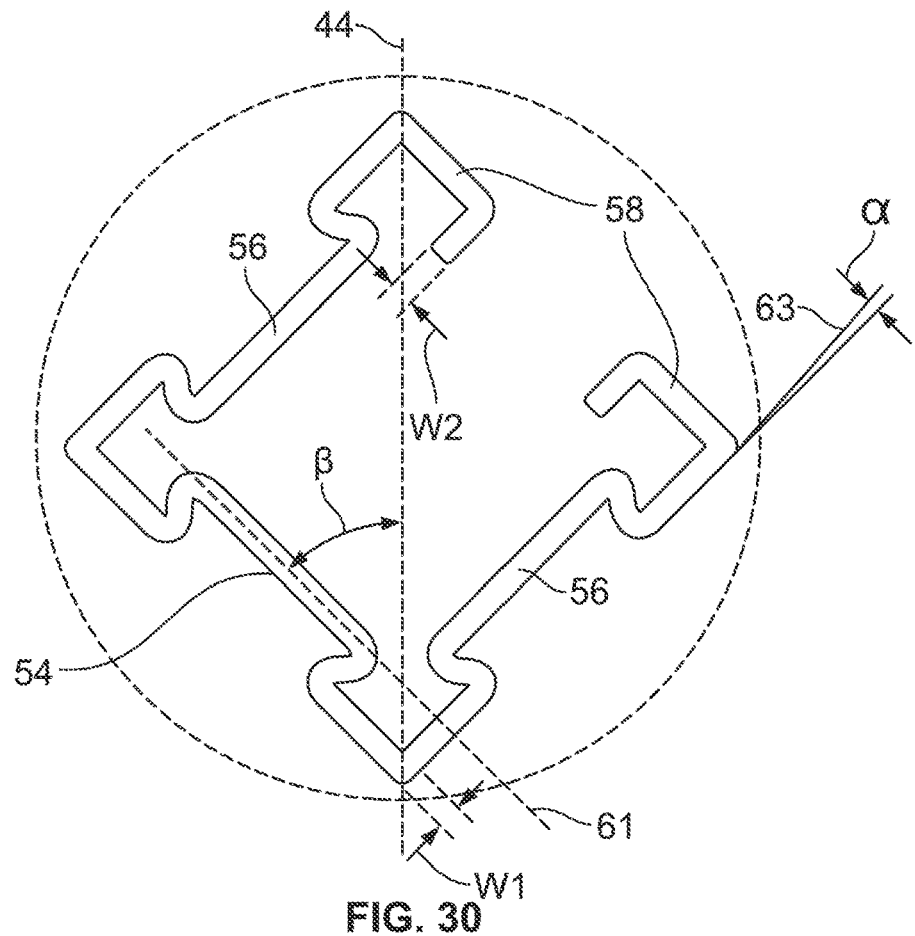
FIGS. 30-33 depict examples of cutouts for a die that can be with the shearing apparatus.
Figure 31:
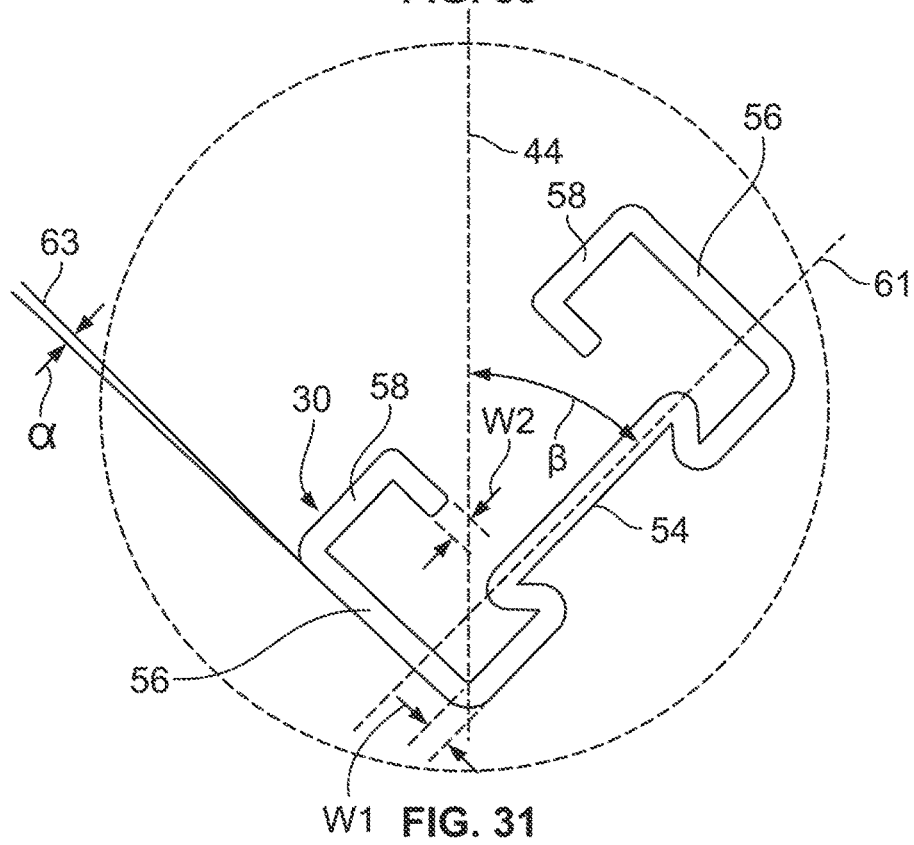
Figure 32:
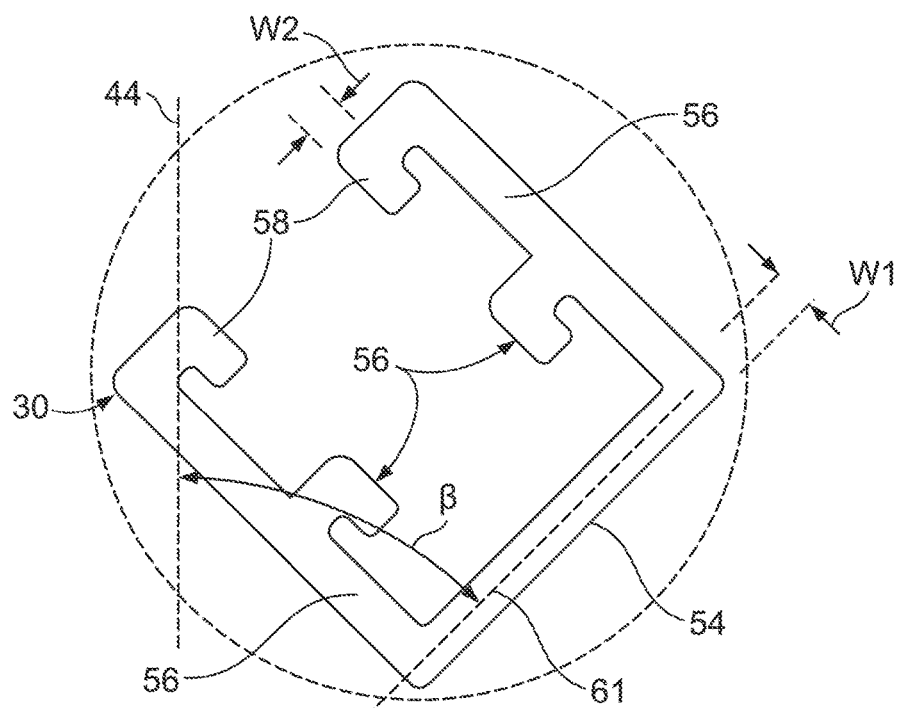

In some embodiments, a receiving opening 40, see FIGS. 27-29, is provided in the die 22. In some embodiments, the receiving opening 40 is proximate to the groove 34. In some embodiments, two receiving openings 40 are provided, with one receiving opening 40 being proximate to the groove 34, and the other receiving opening 40 being proximate to the groove 36. In an embodiment, the receiving opening 40 is a through aperture which extends from the first face 28a to the second face 28b. In an embodiment, the receiving opening 40 is a through aperture which extends from the first face 28a to the second face 28b and opens to the workpiece clearance pocket 38. In an embodiment, the receiving opening 40 is a pair of through apertures, each of which extends from the first face 28a to the second face 28b, see FIG. 34. In an embodiment, the receiving opening 40 is a recess or an indentation in each face 28a, 28b, and in some embodiments, the recesses or indentations are aligned with each other. In an embodiment, the receiving opening 40 is a recess or indentation in each face 28a, 28b, with one of the receiving openings 40 opening up to the workpiece clearance pocket 38, and in some embodiments, the recesses or indentations are aligned with each other. In an embodiment, the receiving opening 40 is a first pair of recesses or indentations, each of which extends from the first face 28a, and a second pair of recesses or indentations, each of which extends from the second face 28b; and in some embodiments, the recesses or indentations in the first face 28a align with the recesses or indentations in the second face 28b.

The cutout 30 may take a variety of forms and examples are shown in FIGS. 27-33. In this regard, for example, the cutout 30 may take a shape corresponding to a profile(s) of a type(s) of workpiece(s) that the dies 22, 22' are intended to cut. Any of the cutouts 30 shown in FIGS. 27-33 can be used in the dies 22, 22' shown in FIGS. 6-26. In any of the dies 22, 22' having any of the cutouts 30 shown in FIGS. 27-33, the workpiece clearance pocket 38 shown in FIG. 28 may be provided. In any of the dies 22, 22' having any of the cutouts 30 shown in FIGS. 27-33, the receiving opening or openings 40 may be provided through the die 22, 22'. Multiple ones of the example cutouts shown in FIGS. 27-33 can be included in a single die 22, 22'.

The embodiment of the cutout 30 shown in FIGS. 27-29 is used to cut a variety of diameters of threaded rod. Threaded rod is known in the art. The cutout 30 is generally centered on the die 22 and extends vertically. The cutout 30 is formed by a straight edge 42 which in an embodiment extends at an angle relative to a vertical centerline 44 of the die 22, edges 46, 48 which are perpendicular to the centerline 44 and extend from the opposite ends of the straight edge 42, and a plurality of spaced apart semi-circular segments 50a-50f extending between the edges 46, 48 and which are spaced apart from the edges 46, 48 and from each other by planar or substantially segments 52a-52f which are parallel to the centerline 44. As shown in an embodiment, the segments 50a-50f increase in diameter. Each segment 50a-50f may be threaded.

The embodiments of the cutout 30 shown in FIGS. 30-33 may be used to cut strut channel. Each of these embodiments include a back receiving portion 54, side receiving portions 56 and lip receiving portions 58. The back receiving portion 54 accommodates the back of the strut channel and is shaped accordingly; the side receiving portions 56 accommodate the sides of the strut channel and is shaped accordingly; the lip receiving portions 58 accommodates the lip of the strut channel and is shaped accordingly. The lip receiving portions 58 generally form hook-shapes to accommodate generally hook-shaped ends of the strut channel. During the strut channel manufacturing process or due to damage during transport, the lips of the strut channel often become deformed from jarring and can be difficult to slide through a cutout in die profiles. The lip receiving portions 58 of the dies 22, 22' are enlarged to allow significantly deformed ends of the strut channels to pass therethrough, while still producing a clean cut. The back receiving portion 54 and the side receiving portions 56 of the cutout 30 have a width (or widths) W1 which closely conforms to the width of the strut channel being cut. The lip receiving portions 58 have a width W2 which is larger than the width of the lips of the strut channel being cut. In some embodiments, the lip receiving portions 58 have a width which is about 60% greater than the width of the lips of the strut channel. This allows for deformed lips of the strut channel to easily slide through the die 22, 22'. During the strut channel manufacturing process or due to warping during storage or transport, the sides of the strut channel often bend inwards or outwards away from their nominal perpendicular position with the channel back. In some embodiments, the side receiving portions 56 are angled outwardly at an angle α relative to a line 63 transverse to a centerline 61 of the back receiving portion 54. In some embodiments, angle α is about 0.5 degrees. In some embodiments, the back receiving portion 54 is angled at an angle β relative to the centerline 44 of the die 22, 22' at an angle of 45 degrees.

Figure 33:
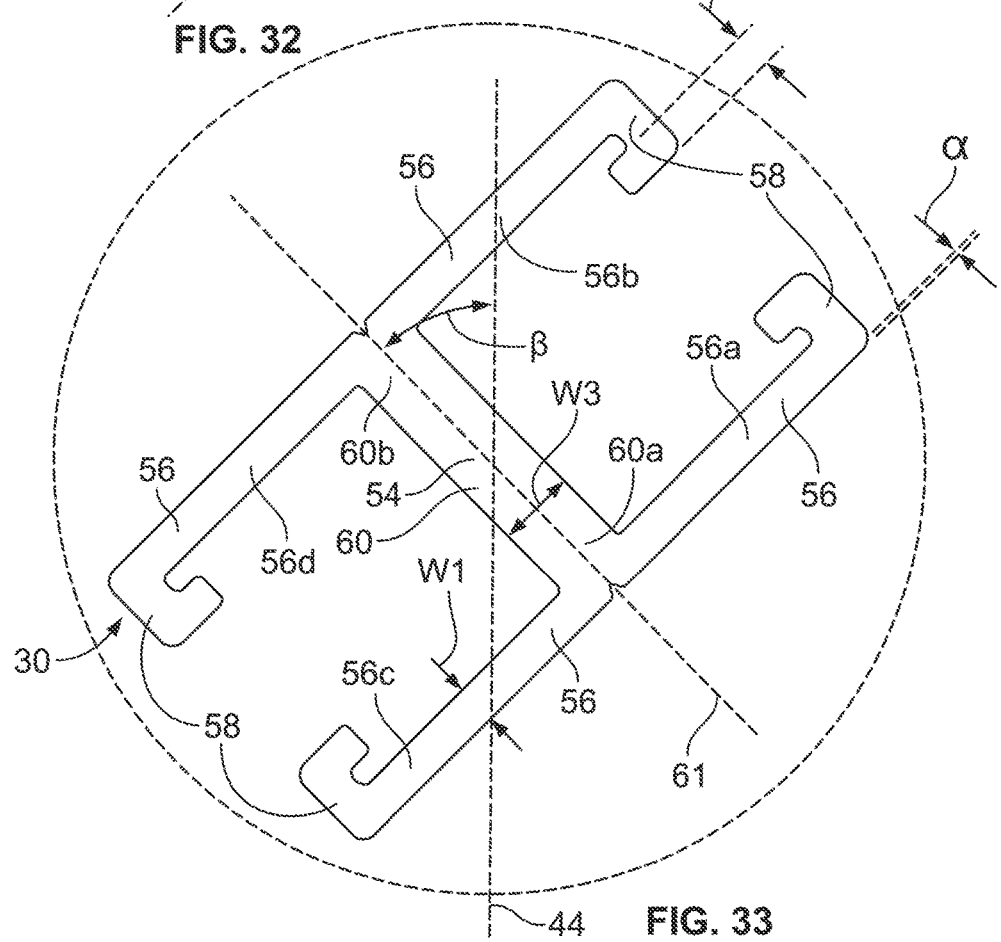
Figure 34:
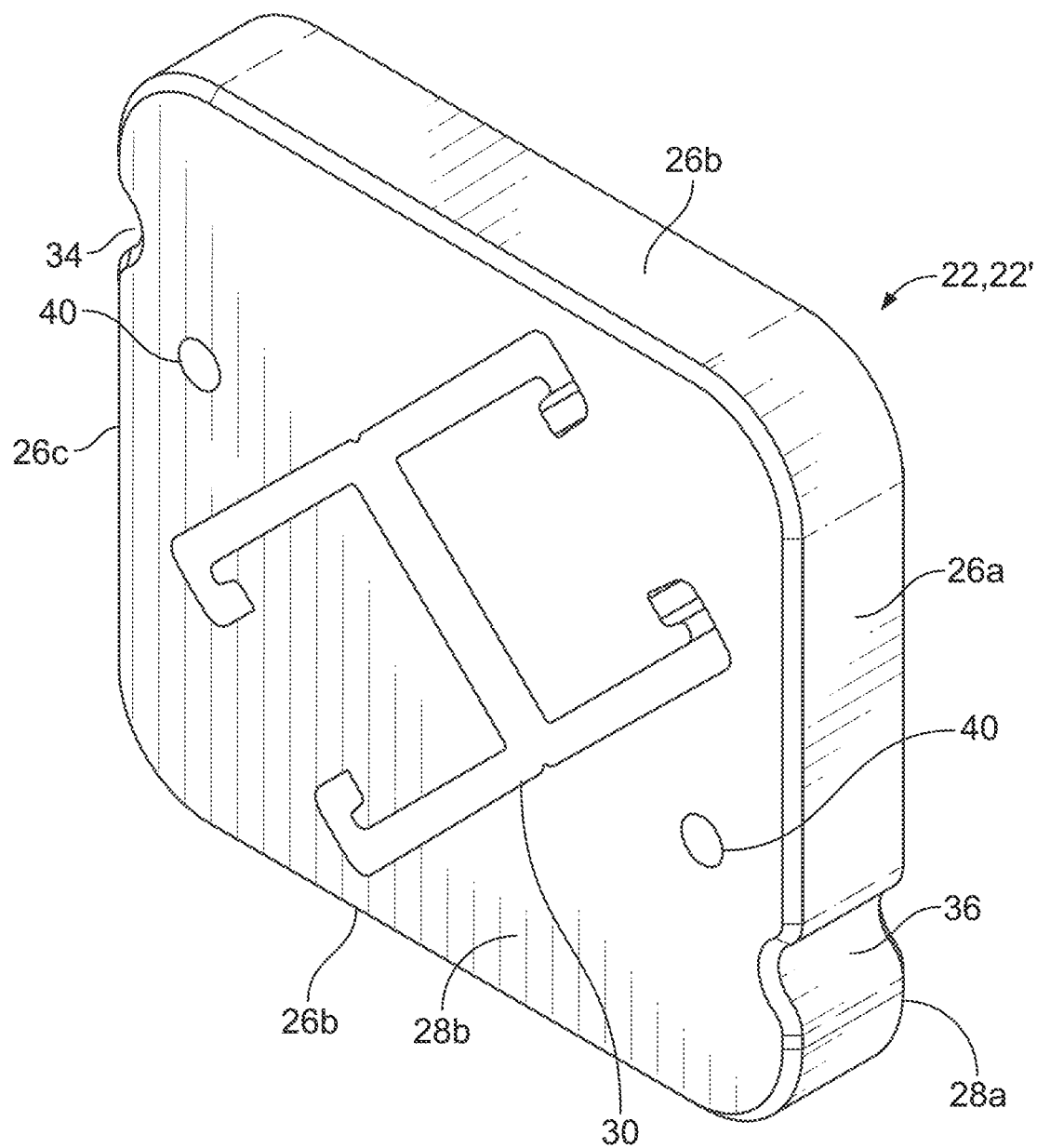
FIG. 34 depicts the cutout of FIG. 33 shown in an embodiment of the die.
Figure 35:
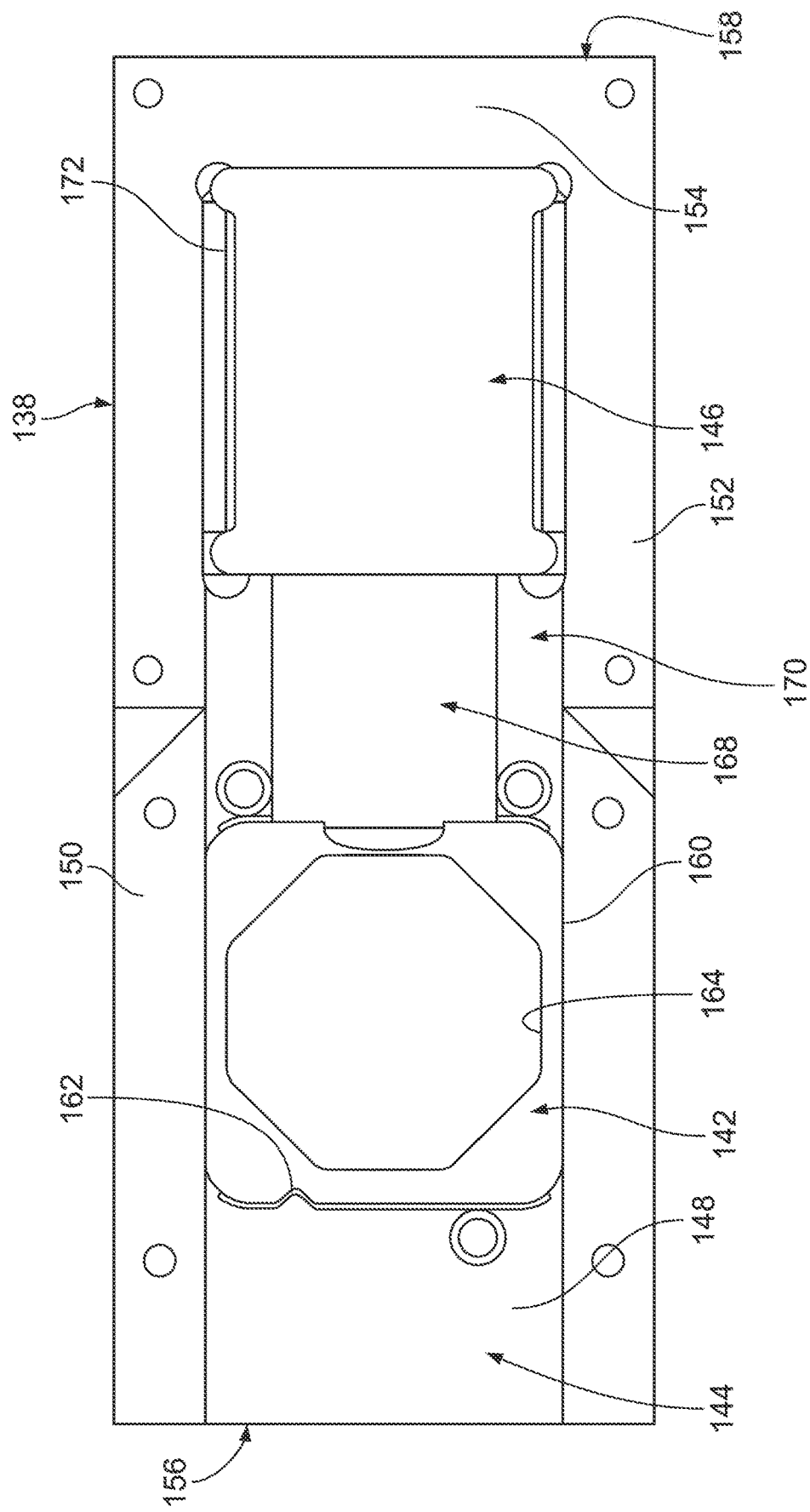
FIG. 35 depicts a side elevation view of a first part of a housing of the shearing apparatus.

FIGS. 33 and 34 show an embodiment of the cutout 30 through which a back to back double box strut channel can be fed. As shown, the cutout 30 generally takes the shape of an "I". The back receiving portion 54 has a width W3 which is wider than the width W1 of the side receiving portions 56 to allow a wider base of the strut channel to be seated therein. As shown, the cutout 30 includes an elongated straight part 60, a first elongated straight part 56a extending outwardly from an end 60a of the straight part 60 and extending at an angle α relative to a line 63 transverse to a centerline 61 of the straight part 60, a second elongated straight part 56b extending outwardly from an opposite end 60b of the straight part 60 and extending at the same angle α relative to the line 63, the first and second parts 56a, 56b extending in the same direction, a third elongated straight part 56c extending outwardly from the end 60a of the straight part 60 and extending at the same angle α relative to the line 63, a fourth elongated straight part 56d extending outwardly from the end 60b of the straight part 60 and extending at the same angle α relative to the line 63, the third and fourth parts 56c, 56d extending in the same direction. The parts 56a, 56c extend in opposite directions; the parts 56b, 56d extend in opposite directions. In some embodiments, angle α is about 0.5 degrees. In some embodiments, the straight part 60 is angled at an angle β relative to the centerline 44 of the die 22, 22' at an angle of 45 degrees.

Attention is invited to FIGS. 1-5 and 35-48, which show the shearing apparatus 120 and its components. The shearing apparatus 120 includes a housing 122, an end stop assembly 124, a force transmitting apparatus 126 mounted in the housing 122, and a die engaging mechanism 128 attached between the force transmitting apparatus 126 and the die 22'. The force transmitting apparatus 126 moves the die 22' relative to the die 22 and the housing 122. The end stop assembly 124 and the die engaging mechanism 128 prevent the removal of the dies 22, 22' from the housing 122 while allowing an operator to quickly change the dies 22, 22' without the use of tools.

The force transmitting apparatus 126 is constructed and arranged such that it applies a force to the movable die 22'. This force may be a pushing force or a pulling force. The force transmitting apparatus 126 may be a hydraulic cylinder 130 having a ram 132 extending therefrom, an adapter 134 attached to an end of the ram 132 and a push block 136 mounted at the end of the adapter 134. The hydraulic cylinder 130 is conventional. The adapter 134 may be formed as a circular puck. The push block 136 may be formed as a rectangular prism. The ram 132, the adapter 134 and the push block 136 may be formed as one piece. The push block 136 is releasably engaged with the die 22' via the die engaging mechanism 128. A hydraulic line (not shown) may have one end of the line attached to the hydraulic cylinder 130 and may also be in hydraulic communication with the hydraulic cylinder 130, and the other end of the hydraulic line may be engaged to and may be in hydraulic communication with a hydraulic foot pump or motorized pump (not shown). The pump is capable of providing at least enough pressure to activate movement in the cylinder 130. In an embodiment, the hydraulic cylinder 130 is a 30-ton hydraulic cylinder 130. When the cylinder 130 is activated, the ram 132, the adapter 134 and the push block 136 move longitudinally relative to the housing 122.

The housing 122 includes a first housing part 138 and a second housing part 140 mated therewith. A stationary die retaining pocket 142 in which the stationary die 22 is seated during use is formed in the first housing part 138, a movable die retaining pocket 144 in which the movable die 22' is seated during use and in which the movable die 22' can be slid longitudinally is formed between the housing parts 138, 140, and a force transmitting apparatus pocket 146 which holds the force transmitting apparatus 126 is formed between the housing parts 138, 140.

The first housing part 138 includes a side wall 148, a top wall 150 extending from an upper end of the side wall 148, a bottom wall 152 extending from a lower end of the side wall 148, and a rear wall 154 extending from the rear ends of the walls 148, 150, 152. A front end of the first housing part 138/housing 122 is shown at reference numeral 156 and a rear end of the first housing part 138/housing 122 is shown at reference numeral 158. A longitudinal axis of the first housing part 138/housing 122 extends from the front end 156 to the rear end 158. In some embodiments, the inner surface of the side wall 148 is planar.

The stationary die retaining pocket 142 is formed in the side wall 148 and is spaced from the front end 156. The pocket 142 has an outer perimeter 160 which has a shape that mirrors the shape of the stationary die 22 and has a depth which is equal to, or approximately equal to, the thickness of the stationary die 22 such that the stationary die 22 seats completely within, or almost completely within, the pocket 142. As such, the pocket 142 has a mating protrusion 162 which extends inwardly into the pocket 142. In some embodiments, the protrusion 162 and the groove 34 or 36 do not have identical shapes, but the protrusion 162 still seats within the groove 34 or 36 to properly orient the stationary die 22 within the pocket 142. In some embodiments, the protrusion 162 is provided on the stationary die 22 and the grooves 34 and/or 36 are provided on the housing part 138. A through passageway 164 is provided through the side wall 148 from the inner surface to the outer surface and is in communication with the pocket 142.

Figure 40:
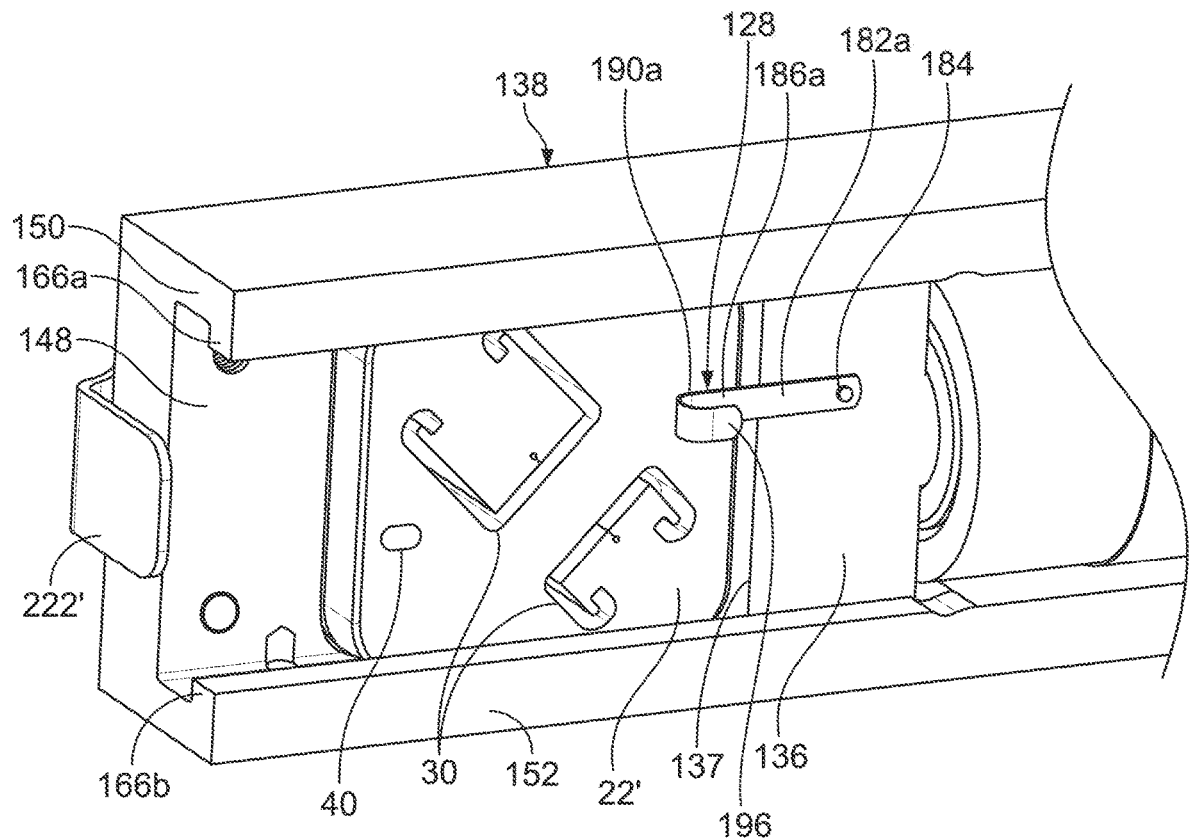
FIG. 40 depicts an alternate partial perspective view of an embodiment of the shearing apparatus.
Figure 41:
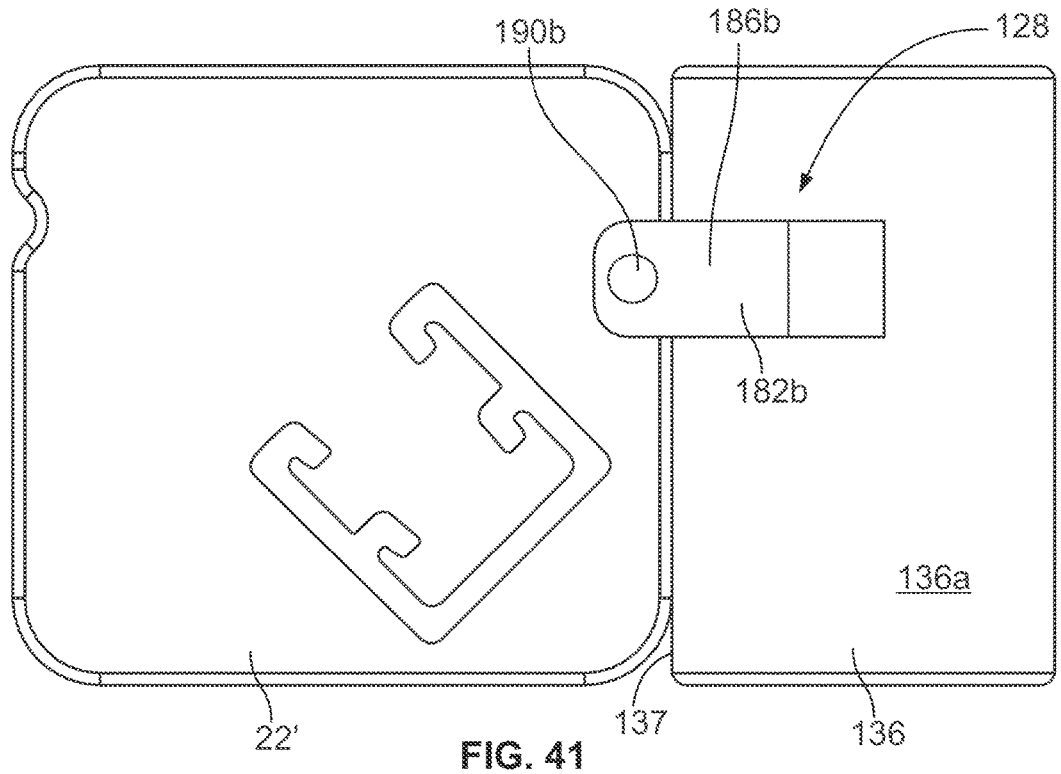
FIG. 41 depicts a partial side elevation view of an alternate shearing apparatus with portions of the shearing apparatus removed.
Figure 42:
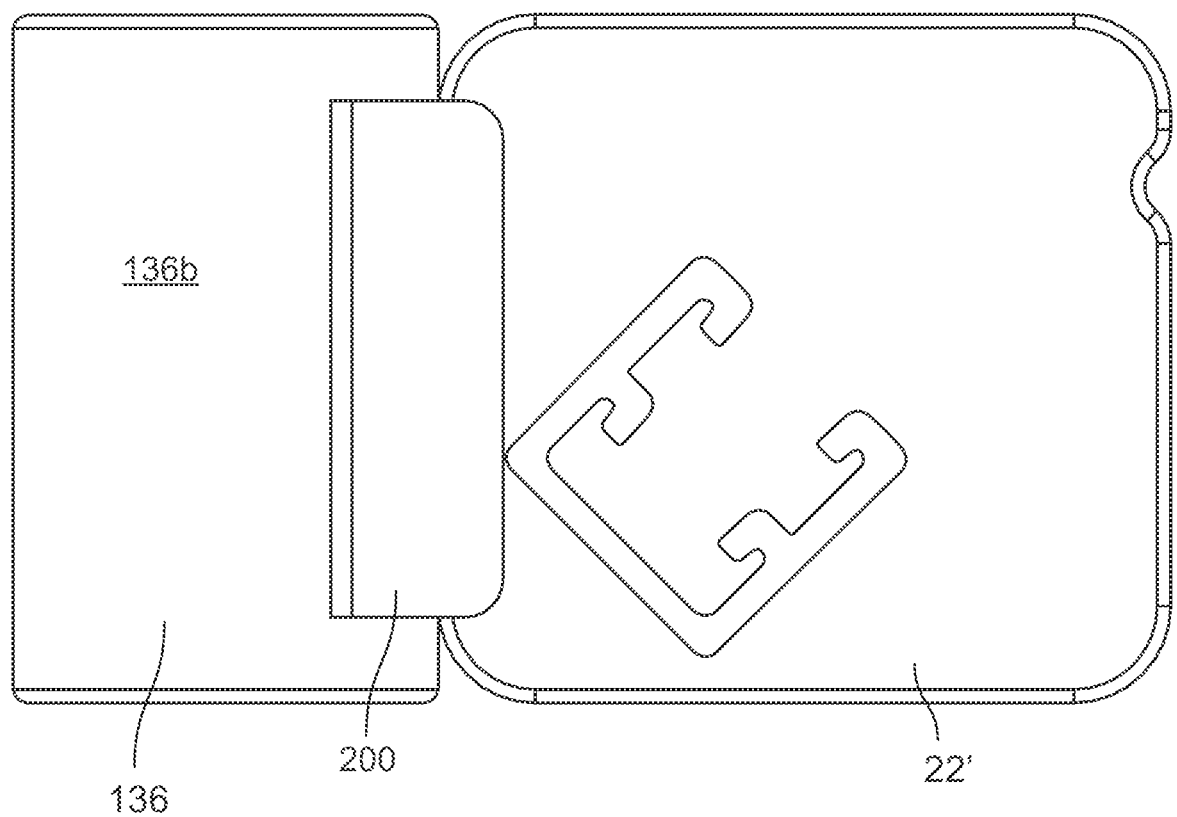
FIG. 42 depicts an alternate partial side elevation view of the shearing apparatus of FIG. 41 with portions of the shearing apparatus removed.
Figure 43:
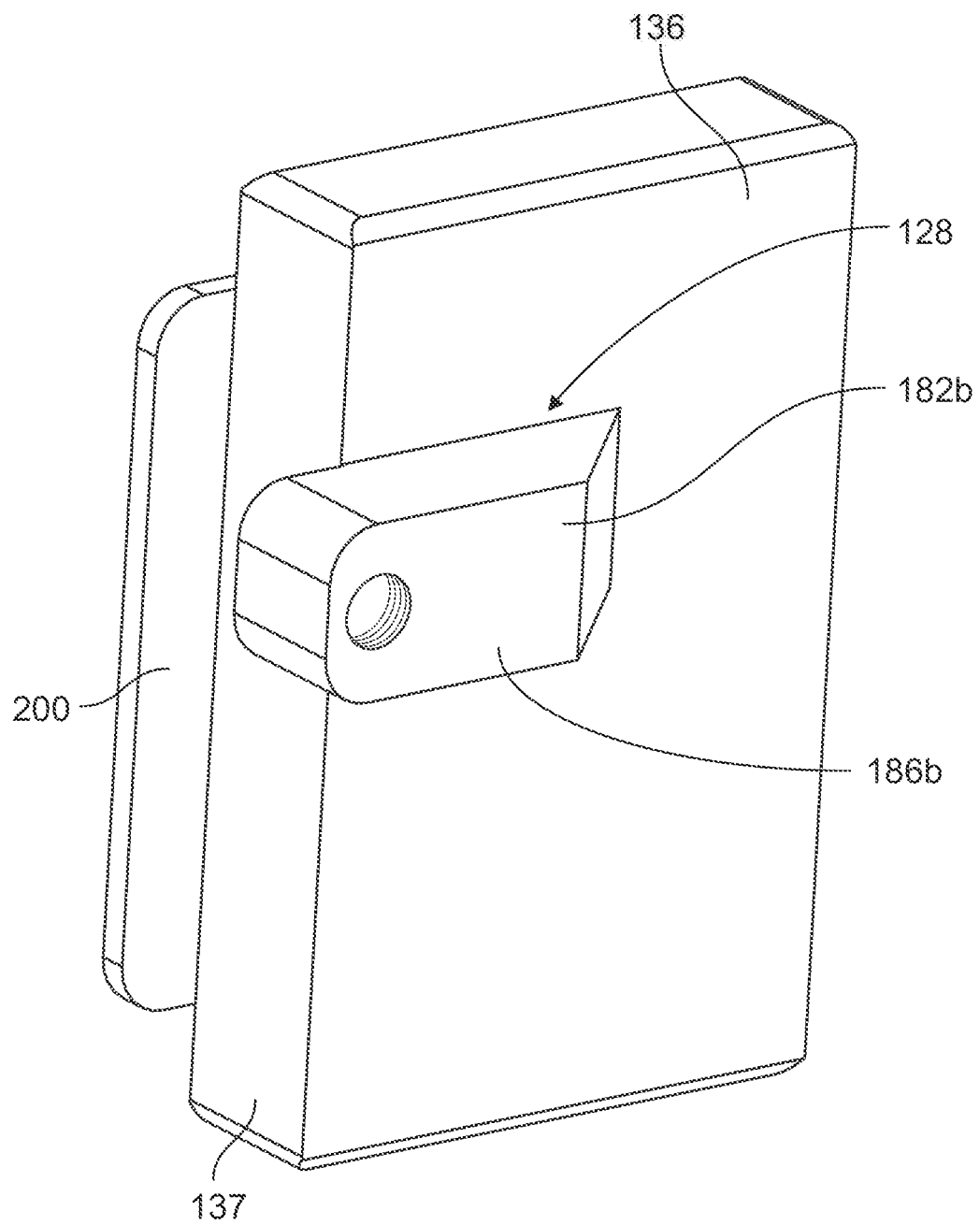
FIG. 43 depicts a perspective view of an embodiment of a push block of the shearing apparatus of FIGS. 41 and 42.
Figure 44:
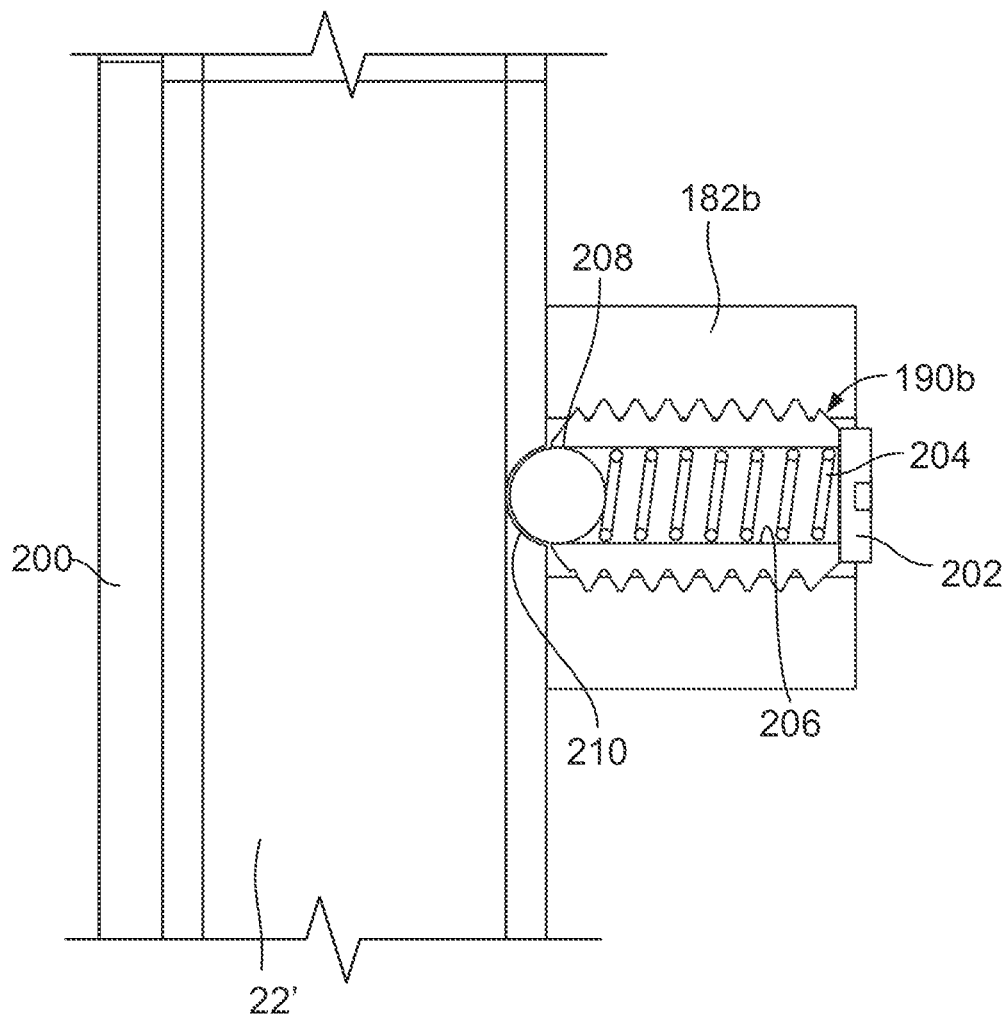
FIG. 44 depicts an enlarged cross-sectional view of the shearing apparatus of FIGS. 41 and 42.
Figure 48:
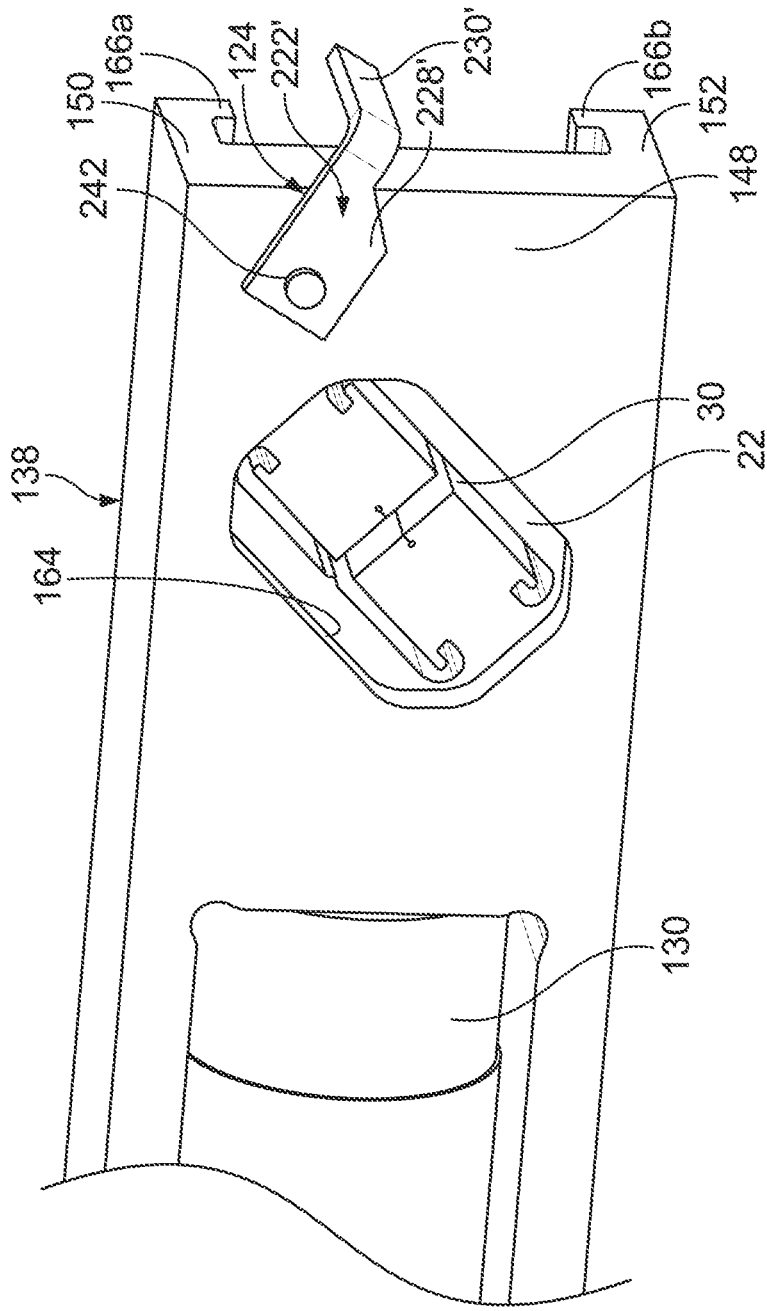
FIG. 48 depicts an alternate partial perspective view of the embodiment of the shearing apparatus of FIG. 40.

The movable die retaining pocket 144 is open at the front end 156 of the housing 122 and extends from the front end 156 rearwardly. The movable die retaining pocket 144 overlaps the stationary die retaining pocket 142 along the longitudinal axis of the housing 122. The pocket 144 is formed by the inner surface of the side wall 148, a front section of the top wall 150, a front section of the bottom wall 152, and the second housing part 140 such that the inner surfaces of the walls 148, 150, 152 and, in some embodiments, an inner surface of the second housing part 140 form a track along which the movable die 22' is configured to slide. Alternatively, as shown in FIGS. 40 and 48, the first housing part 138 includes a downwardly extending lip 166a extending from the top wall 150 and an upwardly extending lip 166b extending from the bottom wall 152 to form the track in which the movable die 22' is seated. The movable die retaining pocket 144 overlaps the stationary die retaining pocket 142 along the longitudinal axis of the housing 122. As such, the movable die retaining pocket 144 has a length which is greater than the length of the stationary die retaining pocket 142.

The force transmitting apparatus pocket 146 extends rearwardly from the pocket 142, 144 to the rear wall 154. The force transmitting apparatus pocket 146 includes an adapter receiving recess 168 into which the adapter 134 seats, a push block receiving recess 170 into which the push block 136 seats, and a hydraulic cylinder recess 172 into which the hydraulic cylinder 130 seats.

The adapter receiving recess 168 is formed in the side wall 148 and has a profile which mirrors the shape of a side edge of the adapter 134. In an embodiment and as shown in the drawings, the recess 168 has a curved profile. The recess 168 may have profiles which are not curved, such as for example, a rectangular profile. The recess 168 may be in communication with the stationary die retaining pocket 142 or may separate from the pocket 142.

The push block receiving recess 170 is formed by the inner surface of the side wall 148, an intermediate section of the top wall 150, and an intermediate section of the bottom wall 152. The push block receiving recess 170 mirrors the shape of the push block 136. The push block receiving recess 170 overlaps the adapter receiving recess 168 in the longitudinal direction. The hydraulic cylinder recess 172 is provided by the rear sections of the walls 148, 150, 152 and the rear wall 154. The hydraulic cylinder recess 172 is sized to accommodate the hydraulic cylinder 130. The second housing part 140 overlays the push block receiving recess 170 and the hydraulic cylinder recess 172 such that the force transmitting apparatus pocket 146 is formed.

A through passageway 174 is provided through the second housing part 140 and is in communication with the movable die retaining pocket 144. The through passageway 174 in the second housing part 140 aligns with the through passageway 164 in the first housing part 138. In some embodiments, the second housing part 140 is attached to the first housing part 138 by fasteners. In some embodiments, the second housing part 140 is attached to the first housing part 138 by welding. In some embodiments, the second housing part 140 is formed of separate components such as an upper retaining rail 176 attached to the top wall 150 of the first housing part 138, a lower retaining rail 178 attached to the bottom wall 152 of the first housing part 138, and a face plate 180 attached to the top and bottom walls 150, 152 of the first housing part 138. While three components are shown in the drawings, the second housing part 140 may be formed of a single component, two components, or more than three components.

The die engaging mechanism 128 provides for a releasable attachment between the push block 136 and the movable die 22'.

Figure 36:
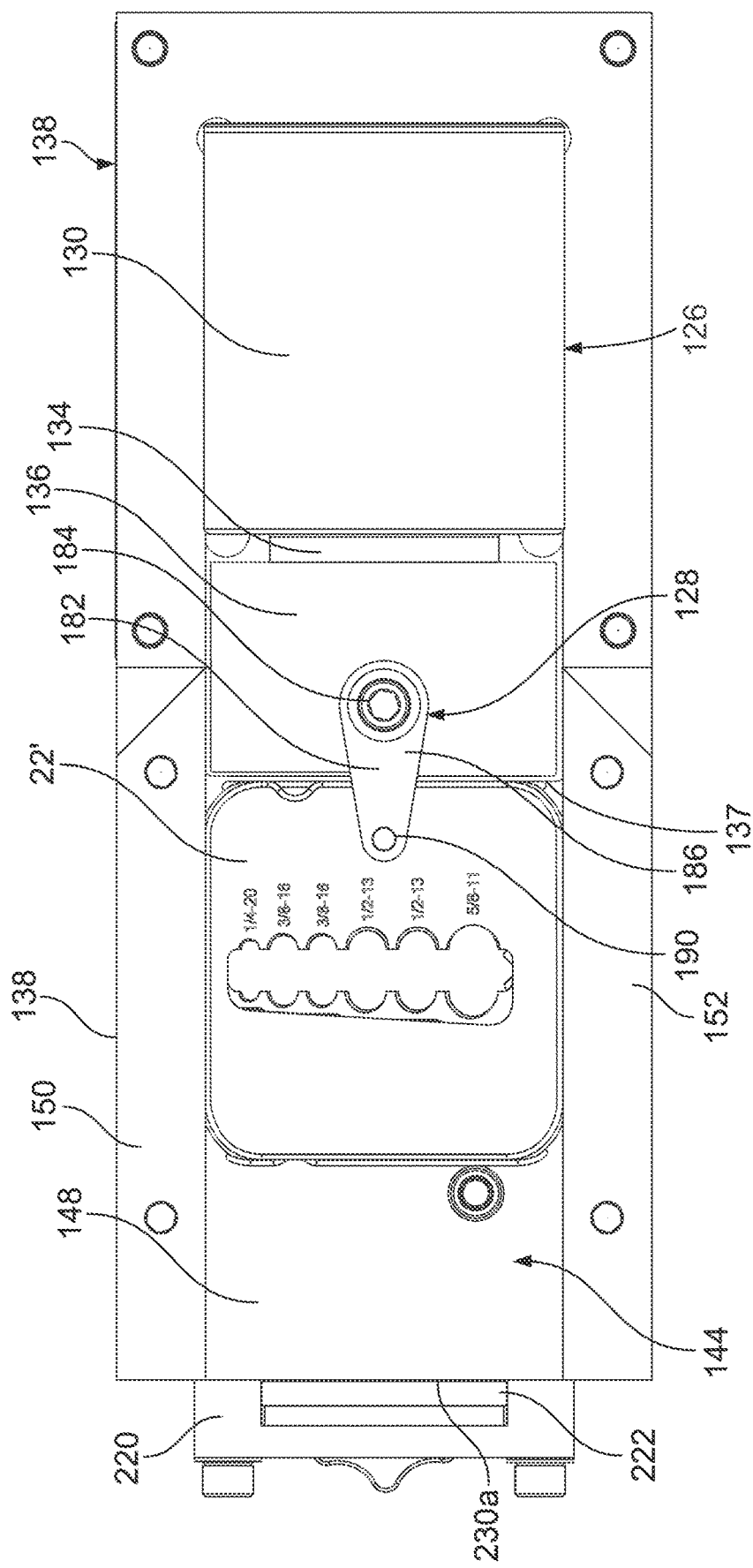
FIG. 36 depicts a side elevation view of the shearing apparatus with a second part of the housing removed.
Figure 37:
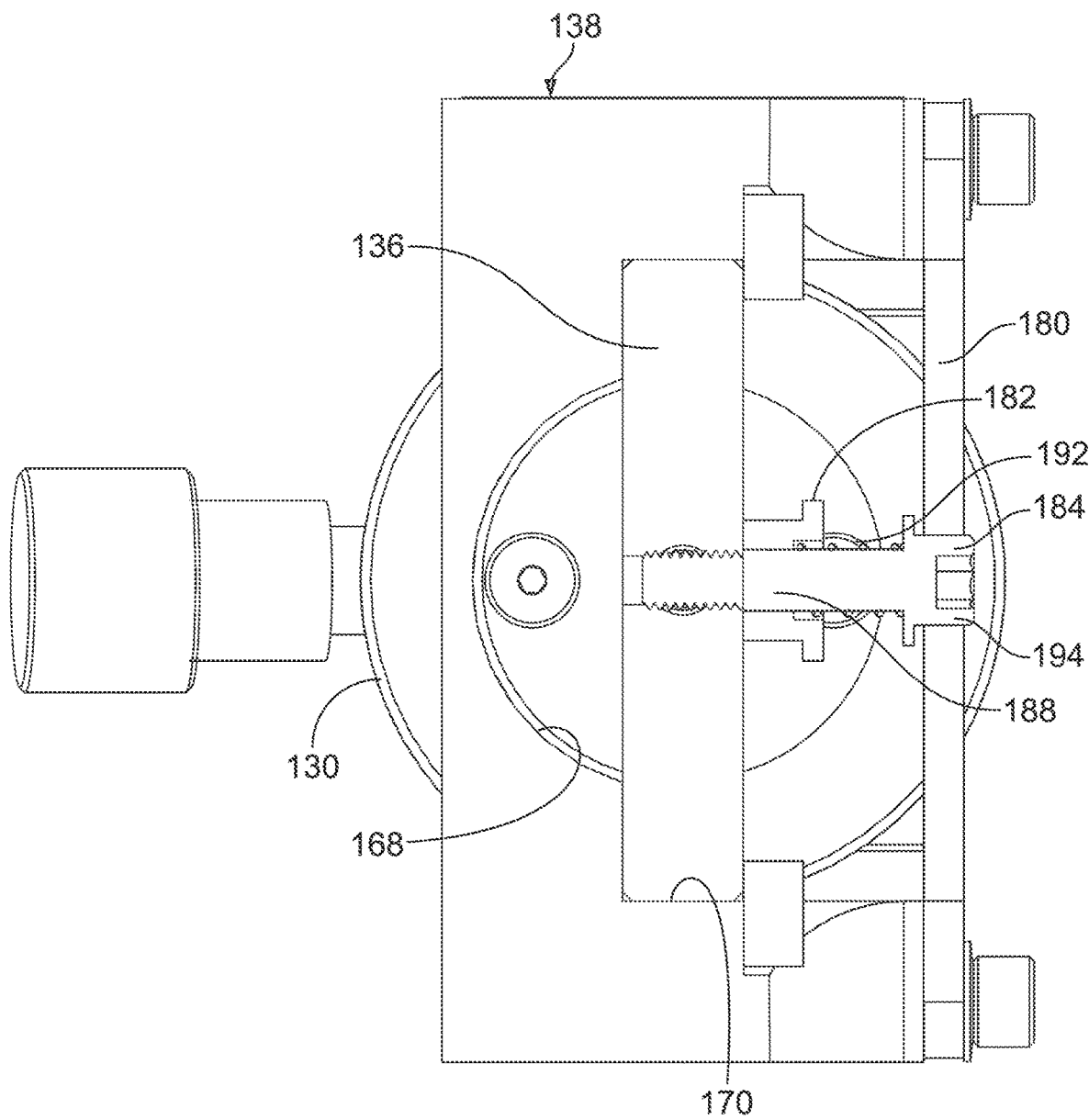
FIG. 37 depicts a cross-sectional view along line 37-37 of FIG. 2.
Figure 38:
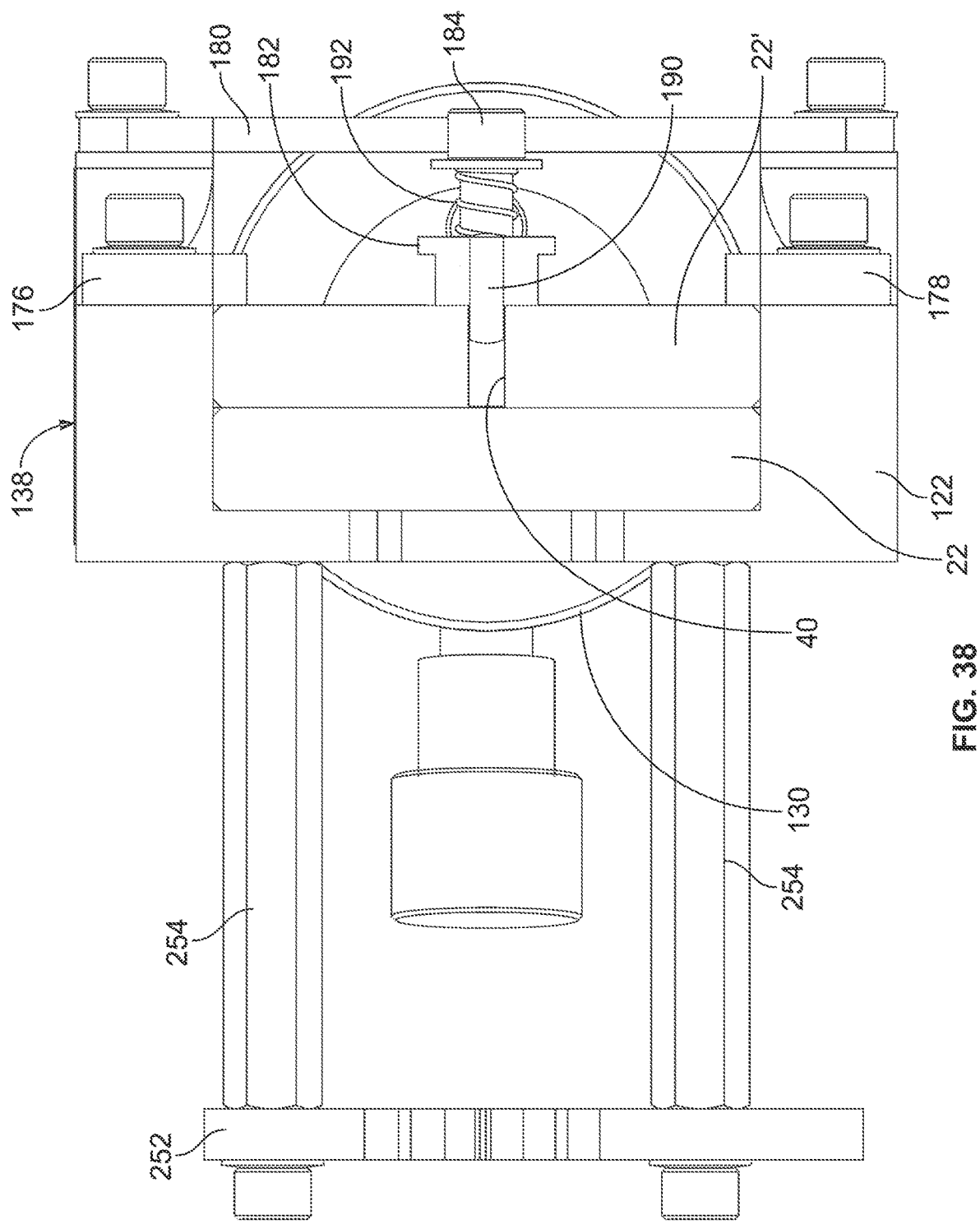
FIG. 38 depicts a cross-sectional view along line 38-38 of FIG. 2.

In some embodiments as shown in FIGS. 36-38, the die engaging mechanism 128 includes a spring-loaded arm 182 pivotally attached to the push block 136 by a fastener 184. The arm 182 extends forwardly of a front end 137 of the push block 136 and overlaps the face 28a or 28b of the die 22'. The arm 182 includes a body 186 having a first end rotatably attached to a shaft 188 of the fastener 184 and an engagement 190 on a second end of the body 186. A spring 192 is mounted between a head 194 of the fastener 184 and the body 186 which biases the arm 182 toward the push block 136. In an embodiment, the engagement 190 on the arm 182 is a pin which seats within the receiving opening 40 in the movable die 22'. In an embodiment, the engagement 190 on the arm 182 is a magnet which magnetically engages with the movable die 22' (the spring 192 can be eliminated in this embodiment). The body 186 can have a handle (not shown) thereon which allows an operator to easily grasp the arm 182. The arm 182 may be reversed such that the arm 182 is pivotally attached to the die 22' and the engagement 190 is releasably engaged with the push block 136.

To engage the die 22' with the die engaging mechanism 128 of FIGS. 36-38, the die 22' is inserted into the housing 122 until the die 22' abuts the push block 136. The arm 182 is pivoted to align the engagement 190 with the receiving opening 40. Thereafter, the arm 182 is released, the spring 192 expands, and the engagement 190 enters into the receiving opening 40. To release the die 22' from the die engaging mechanism 128 of FIGS. 36-38, the arm 182 is pulled outwardly until the engagement 190 is released from the receiving opening 40. Thereafter, the arm 182 is pivoted. The die 22' is pulled out the front end 156 of the housing 122.

Figure 39:
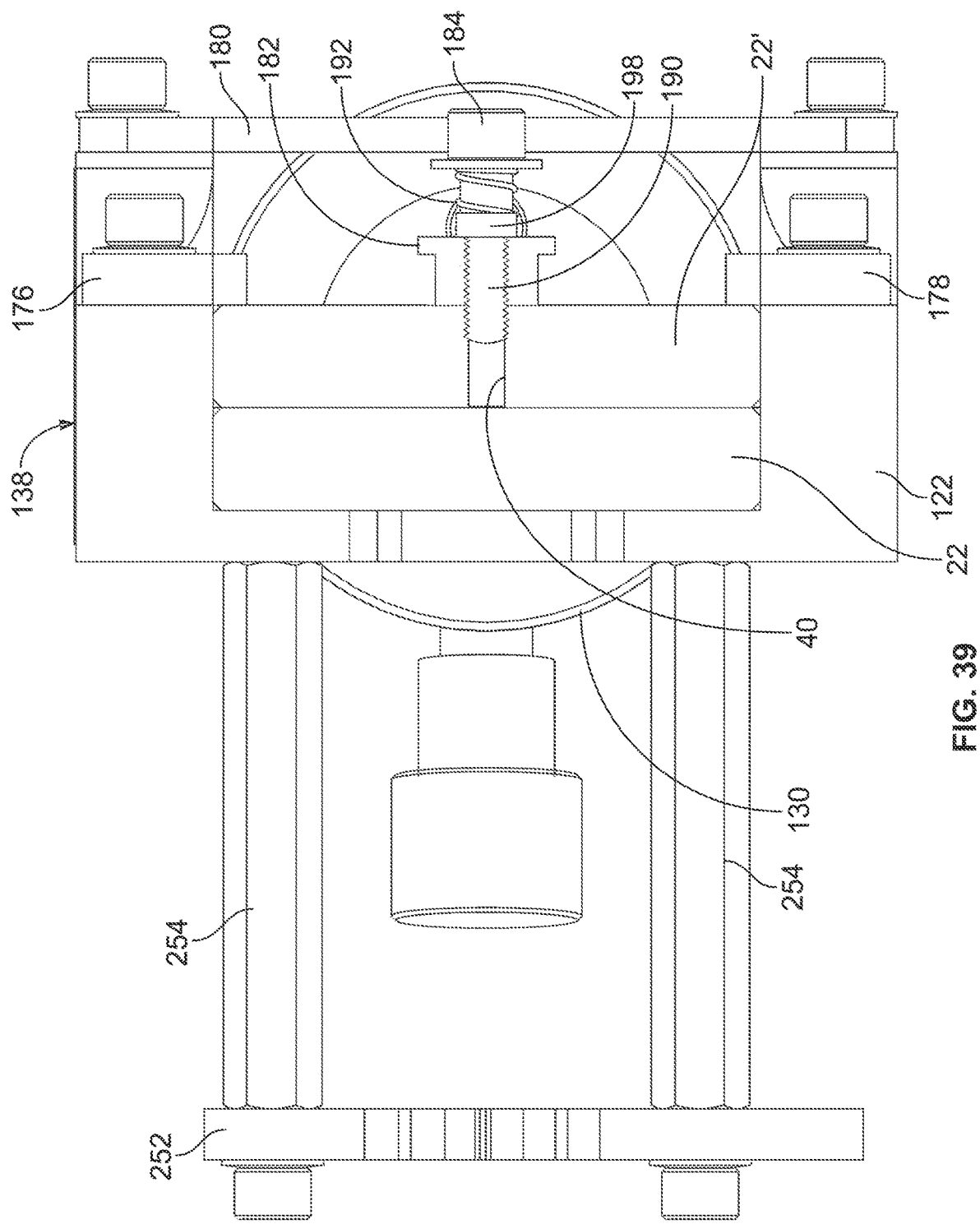
FIG. 39 depicts a cross-sectional view of an alternate embodiment of the shearing apparatus.

In an embodiment as shown in FIG. 39, the engagement 190 shown in FIGS. 36-38 is replaced by a fastener 198 which is threadedly engaged with the arm 182 and the receiving opening 40 of the die 22'. The arm 182 may be reversed such that the arm 182 is pivotally attached to the die 22' and the engagement 190 is releasably engaged with the push block 136. The arm 182 in the embodiment of FIG. 39 may be permanently affixed to the die 22' or to the push block 136 such that the arm 182 does not pivot relative to the die 22' or to the push block 136.

To engage the die 22' with the die engaging mechanism 128 of FIG. 39, the die 22' is inserted into the housing 122 until the die 22' abuts the push block 136 and the engagement 190 is aligned with the receiving opening 40. Thereafter, the fastener 198 is threadedly engaged with the die 22' or the push block 136. To release the die 22' from the die engaging mechanism 128 of FIG. 39, the fastener 198 is removed from its engagement with the die 22' or with the push block 136 such that the die 22' can be released from the housing 122.

In some embodiments as shown in FIG. 40, the die engaging mechanism 128 includes a spring steel arm 182*a* pivotally attached to the push block 136 by the fastener 184. The arm 182*a* extends forwardly of the front end 137 of the push block 136 and overlaps the face 28*a* or 28*b* of the die 22'. The arm 182*a* includes a body 186*a* having a first end rotatably attached to the shaft 188 of the fastener 184 and an engagement 190*a* on a second end of the body 186*a*. The arm 182*a* is normally biased toward the push block 136. In an embodiment, the engagement 190*a* on the arm 182*a* is a pin which seats within the receiving opening 40 in the movable die 22'. In an embodiment, the engagement 190*a* on the arm 182*a* is a magnet which magnetically engages with the movable die 22'. The body 186*a* can have a handle 196 thereon which allows an operator to easily grasp the arm 182*a*. The arm 182*a* may be reversed such that the arm 182*a* is pivotally attached to the die 22' and the engagement 190*a* is releasably engaged with the push block 136. The arm 182*a* may be permanently affixed to the die 22' or to the push block 136 such that the arm 182*a* does not pivot relative to the die 22' or to the push block 136.

To engage the die 22' with the die engaging mechanism 128 of FIG. 40, the die 22' is inserted into the housing 122 until the die 22' abuts the push block 136 and the engagement 190*a* is aligned with the receiving opening 40. The arm 182*a* flexes to allow the die 22' to pass under the engagement 190*a*. Once the engagement 190*a* aligns with the receiving opening 40, the arm 182*a* flexes and the engagement 190*a* seats within the receiving opening 40. To release the die 22' from the die engaging mechanism 128 of FIG. 40, the arm 182*a* is flexed to remove the engagement 190*a* from its seat within the die 22' or within the push block 136 such that the die 22' can be released from the housing 122.

In an embodiment as shown in FIGS. 41-44, the die engaging mechanism 128 includes an arm 182*b* extending from a first side 136*a* of the push block 136, extending forwardly of the front end 137 of the push block 136, and overlapping the face 28*a* or 28*b* of the die 22'. The arm 182*b* includes a body 186*b* having a first end permanently affixed to the first side 136*a* of the push block 136 and which may be formed integrally with the push block 136, and an engagement 190*b* on a second end of the body 186*b*. A second arm 200 extends from a second opposite side 136*b* of the push block 136 and extends forwardly of the front end 137 of the push block 136. The die 22' seats between arms 182*b*, 200 such that the distance between the arms 182*b*, 201 is sized to be slightly larger than a thickness of the die 22'. The engagement 190*b* is formed of a fastener 202 which is threadedly engaged with the second end of the body 186*b*, a spring 204 seated within a passageway 206 in a shaft of the fastener 202 and which engages with a ball 208 seated in an end of the passageway 206. The end of the passageway 206 is sized such that the ball 208 is configured to protrude outwardly from the end of the fastener 202, but the ball 208 cannot be released from the passageway 206. The spring 204 biases the ball 208 partially outwardly from the passageway 206. The ball 208 engages within a depression 210 in the die 22, 22' or engages within the receiving opening 40. In the embodiment shown in FIGS. 41-44, the arms 182*b*, 200 may be reversed such that the arms 182*b*, 200 are attached to the die 22' and the engagement 190*b* is releasably engaged with the push block 136. If the depression 210 is provided, the receiving opening 40 can be eliminated.

To engage the die 22' with the die engaging mechanism 128 of FIGS. 41-44, the die 22' is inserted into the housing 122 until the die 22' seats between the arms 182*b*, 200. Once seated therebetween, the ball 208 seats within the depression 210 or the receiving opening 40 such that the die 22' is clamped between the arms 182*b*, 200, thereby connecting the die 22' to the push block 136. To release the die 22' from the die engaging mechanism 128 of FIGS. 41-44, the die 22' is pulled out the front end 156 of the housing 122. As the die 22' is pulled out from the housing 122, the force of the spring 204 is overcome, the ball 208 moves out of the depression 210, and the ball 208 retracts into the passageway 206 of the fastener 202.

Figure 45:
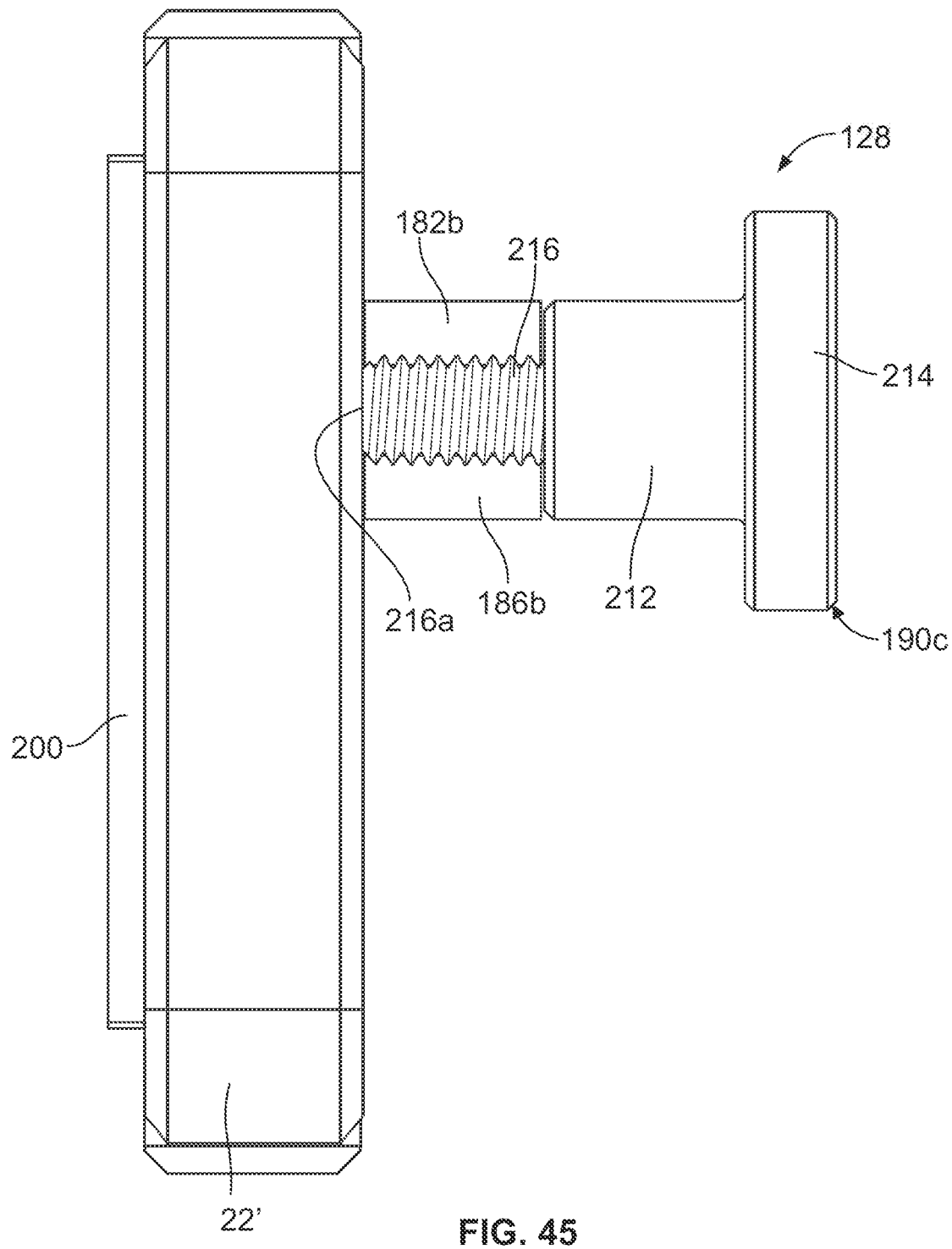
FIG. 45 depicts a cross-sectional view of an embodiment of the shearing apparatus.

In an embodiment as shown in FIG. 45, the die engaging mechanism 128 of FIGS. 41-44 is modified such that the engagement 190*b* is replaced by engagement 190*c* which provides a frictional engagement between the push block 136 and the die 22'. The engagement 190*c* is formed of a fastener 212 which is threadedly engaged with the second end of the body 186*b* of the arm 182*b*. The fastener 212 has a head 214 having a threaded shaft 216 extending therefrom. The head 214 may be formed as a knob that can be easily gripped by an operator. An end 216*a* of the shaft 216 bears against the surface of the die 22' or the push block 136 such that the die 22' or the push block 136 is clamped between the arms 182*b*, 200, thereby connecting the die 22' to the push block 136.

To engage the die 22' with the die engaging mechanism 128 of FIG. 45, the die 22' is inserted into the housing 122 until the die 22' seats between the arms 182b, 200 and the fastener 212 aligns with the surface of the die 22' or the push block 136. Once seated therebetween, the fastener 212 is rotated until the end 216a reengages with the surface to provide a frictional engagement. To release the die 22' from the die engaging mechanism 128 of FIG. 45, the fastener 212 is rotated until the end 216a is disengaged from the surface. Thereafter, the die 22' is pulled out the front end 156 of the housing 122.

Figure 46:
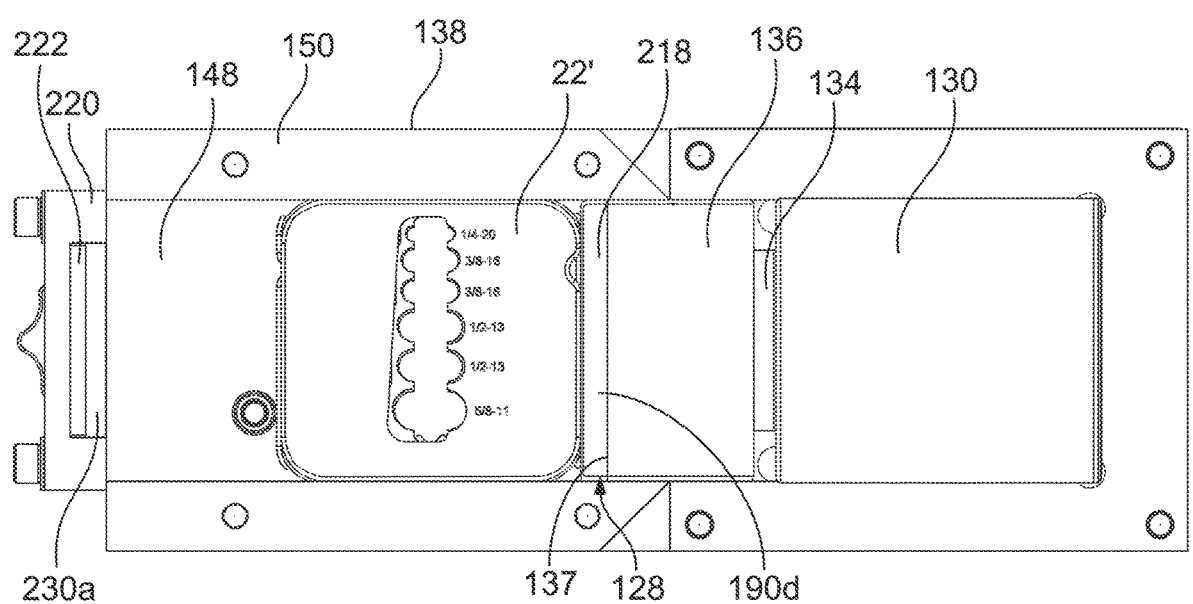
FIG. 46 depicts a side elevation view of an alternate shearing apparatus with a second part of the housing removed.

In some embodiments as shown in FIG. 46, the engagement 190d of the die engaging mechanism 128 is provided by a magnet 218 affixed to the end of the push block 136 which magnetically attaches to the die 22', or the die engaging mechanism 128 is provided by a magnet 218 affixed to the end of the die 22' which magnetically attaches to the push block 136. In this embodiment, the receiving opening 40 may be eliminated.

To engage the die 22' with the die engaging mechanism 128 of FIG. 46, the die 22' is inserted into the housing 122 until the magnetic attachment is established. To release the die 22' from the die engaging mechanism 128 of FIG. 46, the die 22' is pulled out the front end 156 of the housing 122, thereby releasing the magnetic attachment.

The end stop assembly 124 selectively closes the movable die retaining pocket 144 at the front end 156.

Figure 47:
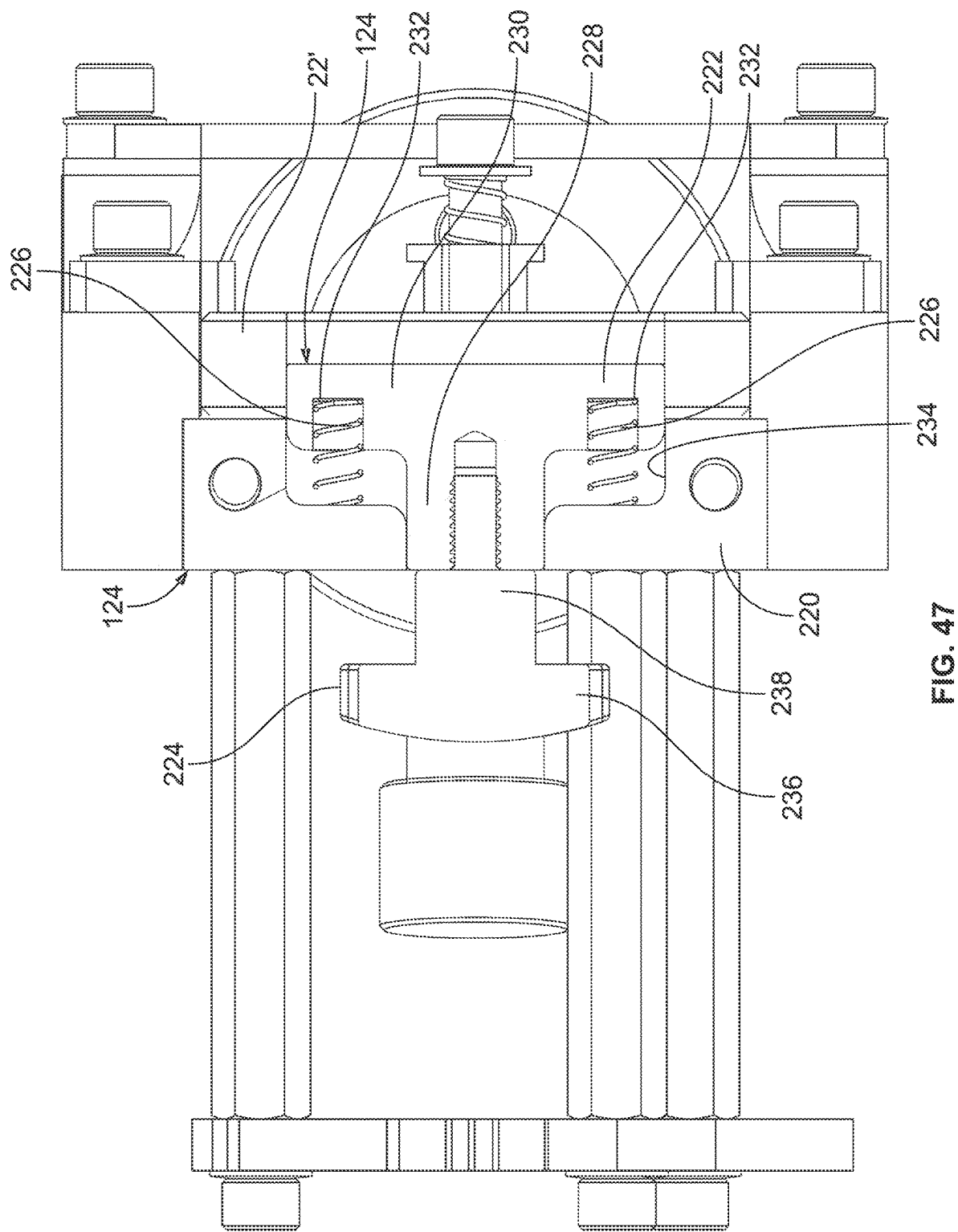
FIG. 47 depicts a cross-sectional view along line 47-47 of FIG. 4.

In an embodiment as shown in FIGS. 36 and 47, the end stop assembly 124 includes a retaining block 220 affixed to the first housing part 138 and which forms a portion of the side wall 148, a stop block 222 mounted on the retaining block 220, a handle 224 attached to the stop block 222, and at least one spring 226 between the stop block 222 and the retaining block 220. While the retaining block 220 is shown and described as a separate component from the side wall 148 of the first housing part 138, the retaining block 220 may be formed as an integral portion of the side wall 148. In addition, the end stop assembly 124 may be provided on the top wall 150. The stop block 222 is generally T-shaped having first and second legs 228, 230; the first leg 228 extending from the midpoint of the second leg 230. The first leg 228 has a width which is less than the second leg 230. In some embodiments, the second leg 230 has a beveled rear edge 230a. A pair of pockets 232 are provided in the second leg 230 and open in the direction of the first leg 228. A through slot 234 is formed through the retaining block 220 and in an embodiment, generally mirrors the shape of the stop block 222. The retaining block 220 is affixed to the front end of the first housing part 138, but does not overlap the open front end 156 of the first housing part 138. The stop block 222 seats within the through slot 234. A spring 226 is seated within each pocket 232 such that the ends of the springs 226 abut against the stop block 222 and the retaining block 220. The springs 226 bias the stop block 222 away from the retaining block 220 and into a position which obstructs the front end 156 of the housing 122. The handle 224 has a grip portion 236 and a shaft 238 extending therefrom. The shaft 238 is affixed to the first leg 228 of the stop block 222 and the grip portion 236 extends outwardly from the retaining block 220. In an embodiment, the grip portion 236 has a diameter which is greater than the diameter of the portion of through slot through which the first leg 228 of the stop block 222 passes. In an at rest position, the stop block 222 is biased away from the retaining block 220 such that the second leg 230 overlays the front end 156 and obstructs the front end 156. The handle 224 can be grasped by an operator and pulled outwardly to retract the stop block 222 into the retaining block 220, thereby compressing the springs 226 between the second leg 230 of the stop block 222 and the retaining block 220, until the second leg 230 does not overlap the front end 156 of the movable die retaining pocket 144. When the handle 224 is released, the springs 226 expand between the first leg 228 of the stop block 222 and the retaining block 220, and the second leg 230 moves outwardly from the retaining block 220 until the second leg 230 overlaps and obstructs the front end 156 of the movable die retaining pocket 144. While the end stop assembly 124 is shown and described in some embodiments with a handle 224 that is pulled to retract the stop block 222, in some embodiments the handle 224 is not provided.

In an embodiment as shown in FIGS. 40 and 48, the end stop assembly 124 includes a spring-loaded stop block 222' attached to the side wall 148 (or top wall 150) of the housing 122 by a fastener 242. The stop block 222' includes a first leg 228' which extends parallel to the side wall 148 and a second leg 230' which is perpendicular to the first leg 228'. A spring (not shown) is provided between a head of the fastener 242 and the first leg 228' to bias the stop block 222' toward the side wall 148. In an at rest position, the stop block 222' is biased toward the side wall 148 such that the second leg 230' overlays and obstructs the front end 156. The stop block 222' can be grasped by an operator and pulled away from the side wall 148 (or top wall 150) to retract the second leg 230' from overlapping the front end 156 of the movable die retaining pocket 144. When the stop block 222' is released, the spring expands between the first leg 228' of the stop block 222 and the head of the fastener 242, and the second leg 230 moves outwardly from the side wall 148 (or top wall 150) until the second leg 230' overlaps and obstructs the front end 156 of the movable die retaining pocket 144.

In an alternate embodiment, the spring (not shown) of FIGS. 40 and 48 is not used and the fastener 242 is threadedly engaged with the side wall 148 (or top wall 150) of the housing 122. To remove the stop block 222' from obstructing the front end 156 of the movable die retaining pocket 144, the fastener 242 is unscrewed and the stop block 222' pulled away from the housing 122.

Alternatively, the end stop assembly 124 can include a pin (not shown) which extends through the top wall 150 of the housing part 138. The pin can be held in a down position, such as by gravity or by a spring, to obstruct the front end 156 of the pocket 144.

Now that the specifics of the shearing apparatus 120 have been described, loading of the dies 22, 22' into the shearing apparatus 120 is described.

The end stop assembly 124 is activated to open the front end 156 of the pocket 144. The leg 230, 230' of the stop block 222, 222' is retracted as described herein so that the leg 230, 230' does not overlap the front end 156 of the pocket 144. This allows an operator to insert the dies 22, 22' into the housing 122. The die 22 is slid into the open front end 156 of the pocket 144 and slid longitudinally along the track formed by the pocket 144 until the die 22 aligns with the pocket 142. The die 22 is then pushed into the pocket 142 until the die 22 seats within the pocket 142. The groove 34 and the protrusion 162 mate together, thereby assuring proper orientation of the stationary die 22 relative to the housing 122. Thereafter, the die 22' is slid into the open front end 156 of the pocket 144 and slid longitudinally along the pocket 144 until the movable die 22' engages against the push block 136. The front end 156 of the pocket 144 is closed by releasing the stop block 222, 222' as described herein. As a result, the dies 22, 22' cannot be removed from the housing 122 unless the end stop assembly 124 is activated to open the front end 156 of the pocket 144.

Once the die 22' is seated, the die engaging mechanism 128 is used to engage the engagement 190, 190a, 190b, 190c, 190d with the die 22' as described herein. This locks the movable die 22' to the force transmitting apparatus 126.

When the dies 22, 22' are inserted in the housing 122, the workpiece can be loaded therein for shearing. In the workpiece loading position, when the cutout 30 shown in FIG. 29 is used, the cutouts 30 in the dies 22, 22' partially overlap each other, and the semi-circular segments 50a-50f face each other such that the workpiece can pass therethrough, and the second faces 28b of the dies 22, 22' face each other. In some embodiments, the second faces 28b of the dies 22, 22' abut against each other. In the workpiece loading position, when the cutouts 30 shown in FIGS. 30-33 are used, the cutouts 30 in the dies 22, 22' align with each other such that the workpiece can pass therethrough, and the second faces 28b of the dies 22, 22' face each other. In some embodiments, the second faces 28b of the dies 22, 22' abut against each other.

The operator places the workpiece through the passageway 164, through the cutouts 30 in the dies 22, 22', and through the passageway 174. When using the cutouts 30 shown in FIGS. 30-33, because the lip receiving portions 58 have a width W2 which is larger than the width of the ends of the workpiece, any deformation of the ends of the workpiece is accommodated.

Thereafter, the hydraulic pressure in the hydraulic cylinder 130 is released and a return spring in the hydraulic cylinder 130 pushes a piston rod of the hydraulic cylinder 130, the adapter 134, the push block 136, the die engaging mechanism 128 and the die 22' back to their starting positions, or the force transmitting apparatus 126 is activated which causes the adapter 134 to slide longitudinally along the adapter receiving recess 168 toward the front end 156, causes the push block 136 to slide longitudinally along the push block receiving recess 170 toward the front end, and causes the movable die 22' to slide longitudinally along the pocket 144 toward the front end 156 and to slide relative to the stationary die 22. Once the movable die 22' is moved forwardly far enough relative to the stationary die 22, the workpiece is sheared between the movable die 22' and the stationary die 22 by the cutting edges on the cutout 30. Thereafter, the force transmitting apparatus 126 is activated to retract the movable die 22' toward the rear end 158.

The dies 22, 22' can be quickly and easily released from the housing 122 without the use of tools. The dies 22, 22' can be removed from the housing 122 and replaced with other dies 22, 22' having a different cutout configuration.

When shearing using the cutouts 30 shown in FIGS. 30-33, the dies 22, 22' can be removed from the housing 122 and flipped over to use the other side of the dies 22, 22' in the shearing action so that other cutting edges are provided. If a single groove 34 is provided in the dies 22, 22', since the dies 22, 22' are identical, the stationary die 22 can be moved to the position where the movable die 22' was placed with the movable die 22' moved to the position where the stationary die 22 was placed. This abuts the faces 28a (instead of faces 28b) against each other to provide different cutting edges on the dies 22, 22'. If two grooves 34, 36 are provided in the dies 22, 22', since the dies 22, 22' are identical and symmetrical, the stationary die 22 can be moved to the position where the movable die 22' was placed with the movable die 22' moved to the position where the stationary die 22 was placed, or one or both of the dies 22, 22' can be flipped over such that the opposite face of the die 22, 22' faces the other die 22, 22'. This also provides different cutting edges for shearing the workpiece. As a result, the dies 22, 22' of FIGS. 30-33 have a longer lifespan.

It will be appreciated, however, that some alternative embodiments may provide dies 22, 22' which are not identically formed. For example, the dies 22, 22' may be differently sized; one die 22 may not include the groove or grooves 34, 36; one die 22 may have one groove 34 while the other die 22' has two grooves 34, 36.

To release the dies 22, 22' from the housing 122, the die engaging mechanism 128 is first disengaged as described herein. Thereafter, the end stop assembly 124 is activated to open the front end 156 of the pocket 144 as described herein. The die 22' is slid longitudinally along the pocket 144 until the die 22' exits the open front end 156. Next, the die 22 is pushed out of the pocket 142 and into the pocket 144. The die 22 is slid longitudinally along the pocket 144 until the die 22 exits the open front end 156. Thereafter, the end stop assembly 124 is released.

Figure 3:
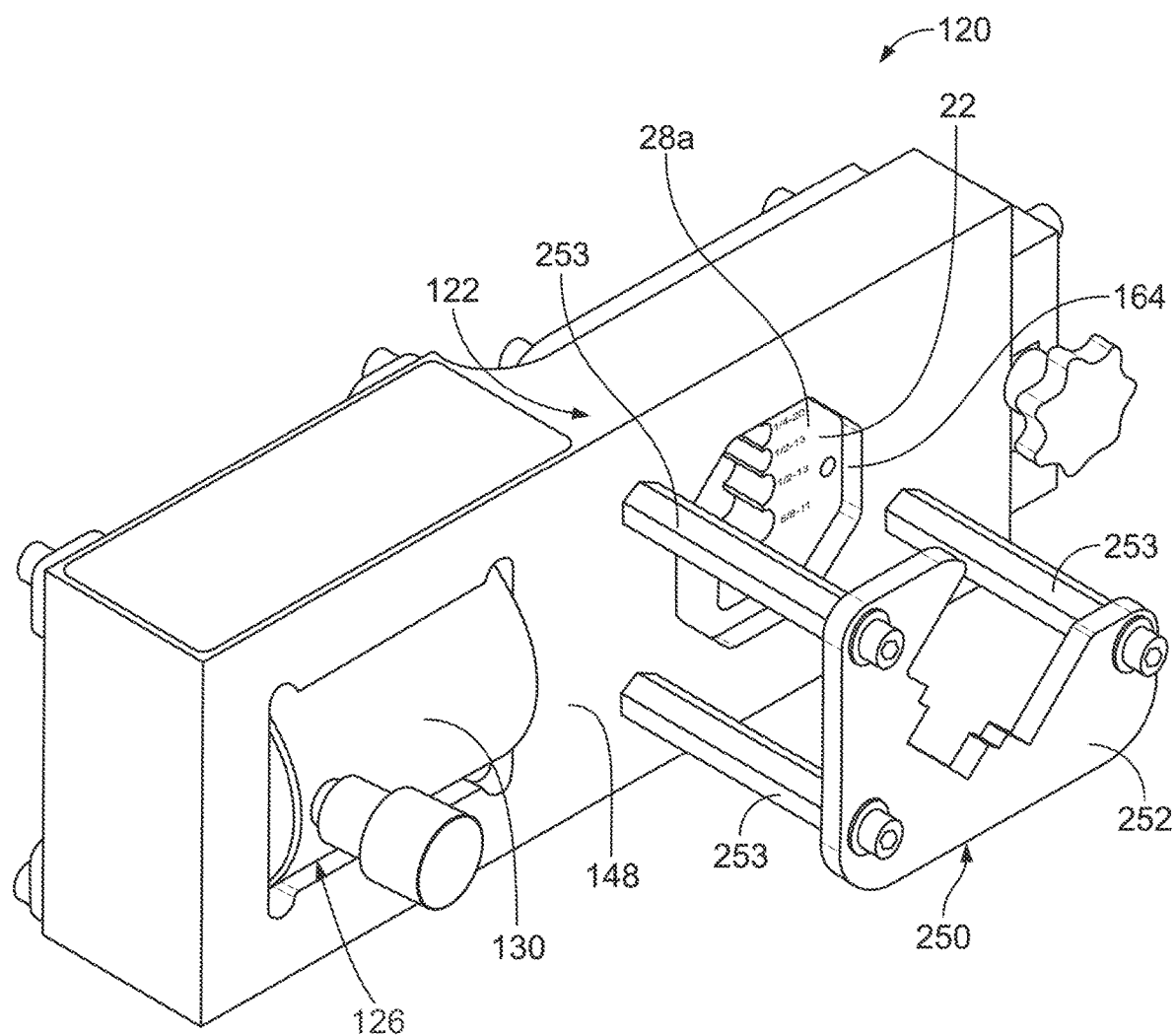
FIG. 3 depicts an alternate perspective view of the shearing apparatus.
Figure 4:
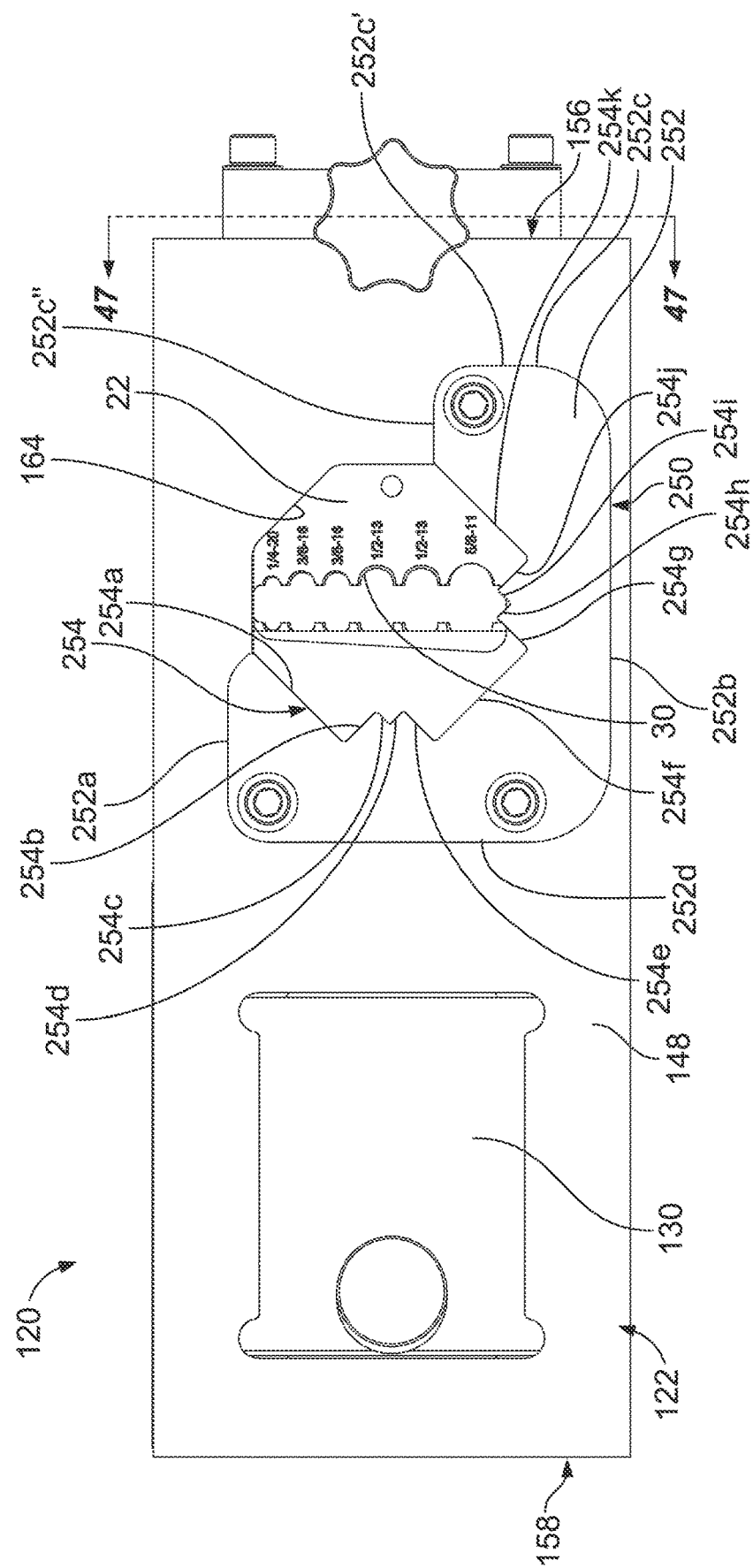
FIG. 4 depicts an alternate side elevation view of the shearing apparatus.
Figure 5:
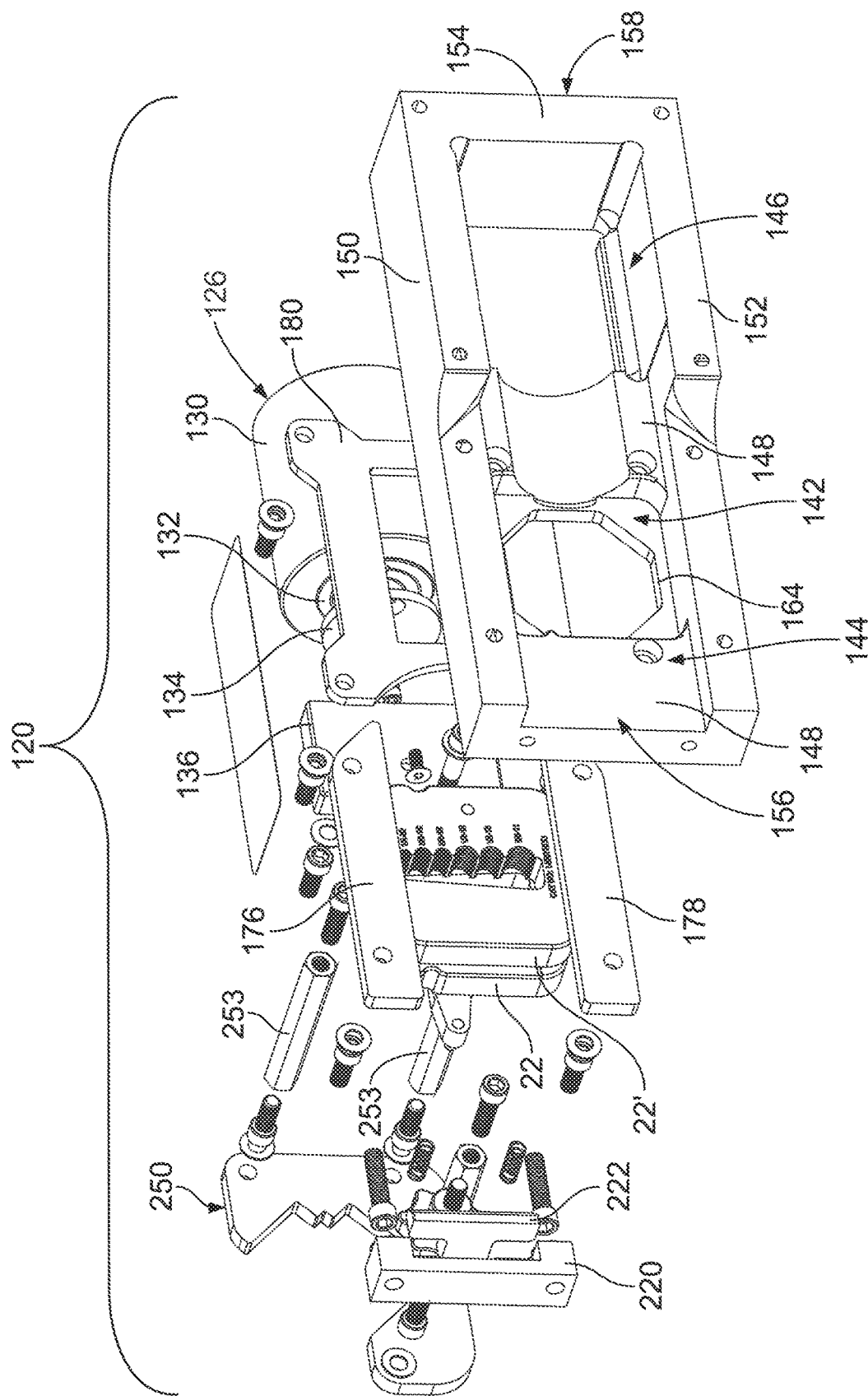
FIG. 5 depicts an exploded perspective view of the shearing apparatus.
Figure 6:
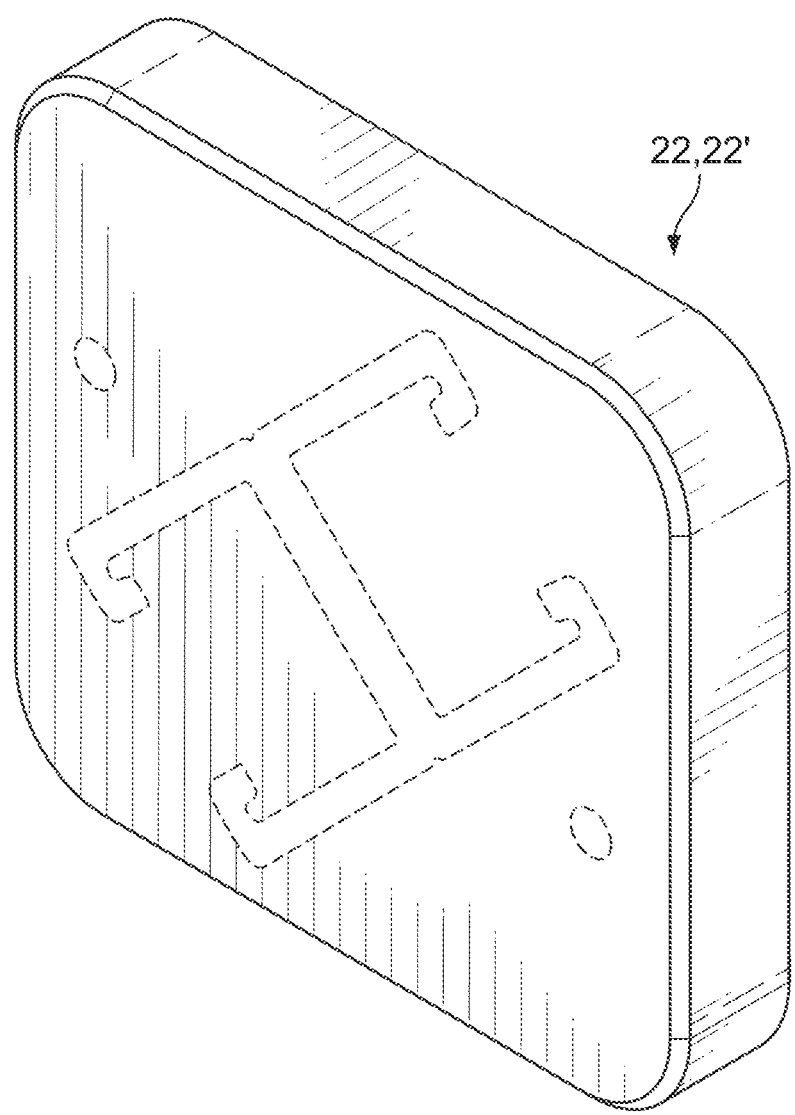
FIG. 6 depicts a perspective view of an outer edge of a die that can be used with the shearing apparatus.
Figure 7:
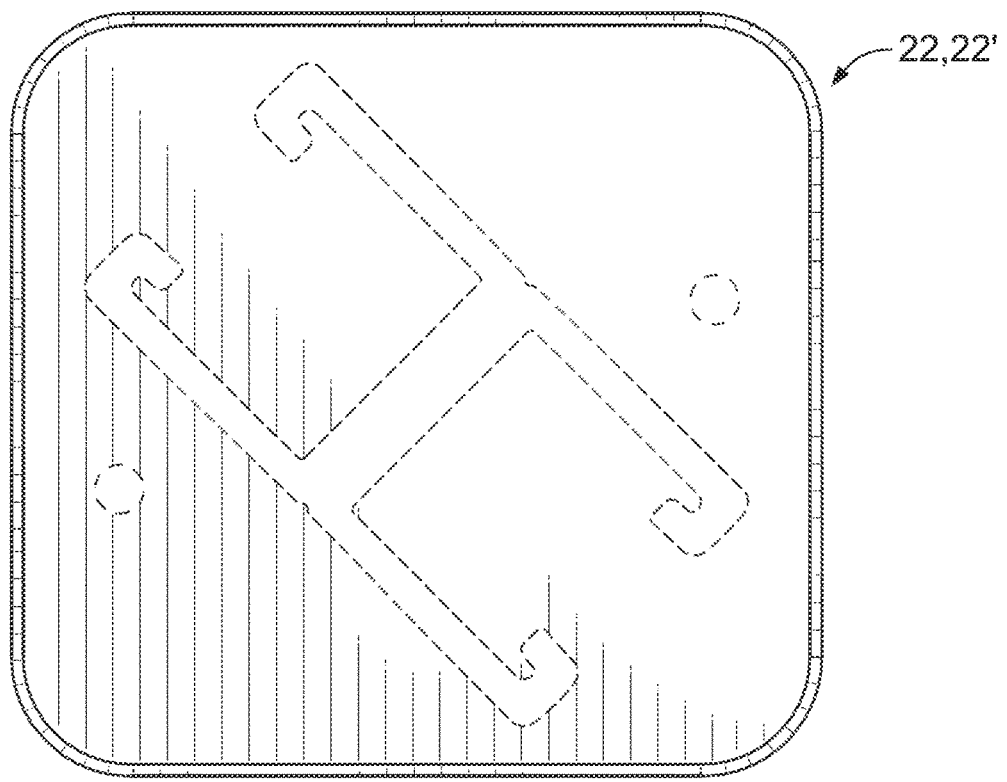
FIG. 7 depicts a right side elevation view of the outer edge of the die of FIG. 6.
Figure 8:
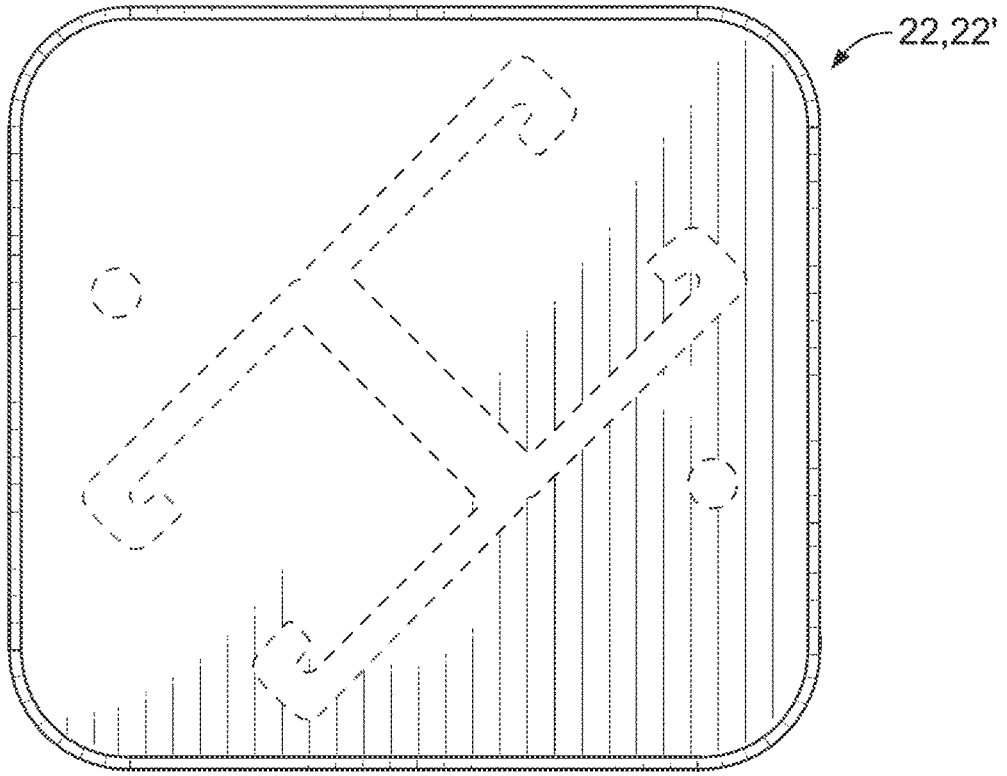
FIG. 8 depicts a left side elevation view of the outer edge of the die of FIG. 6.
Figure 9:
FIG. 9 depicts a front elevation view of the outer edge of the die of FIG. 6.
Figure 10:
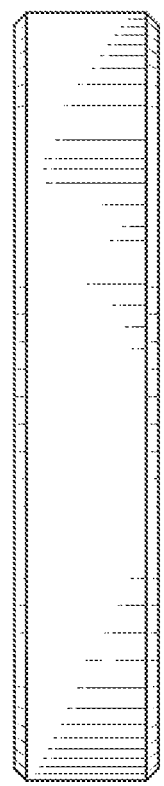
FIG. 10 depicts a rear elevation view of the outer edge of the die of FIG. 6.
Figure 11:
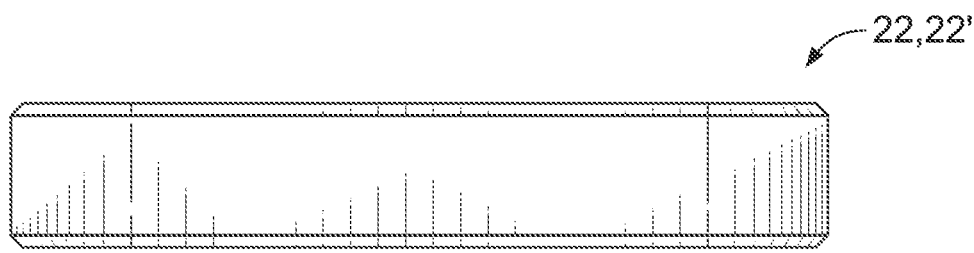
FIG. 11 depicts a top elevation view of the outer edge of the die of FIG. 6.
Figure 12:
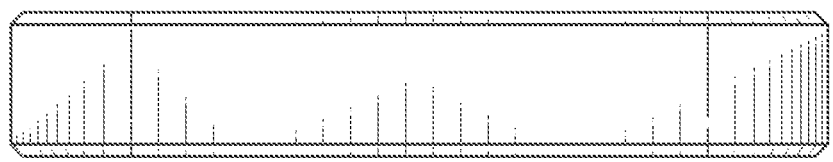
FIG. 12 depicts a bottom elevation view of the outer edge of the die of FIG. 6.
Figure 13:
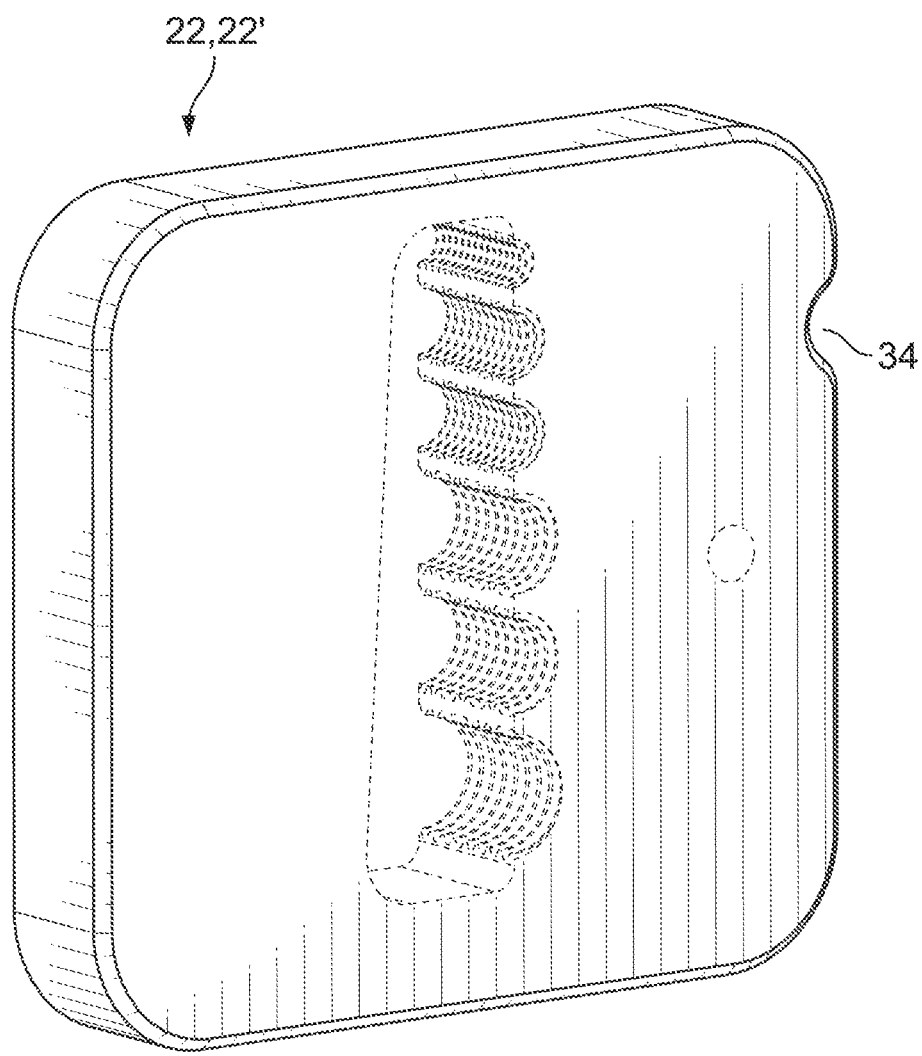
FIG. 13 depicts a perspective view of an alternate outer edge of a die that can be used with the shearing apparatus.
Figure 14:
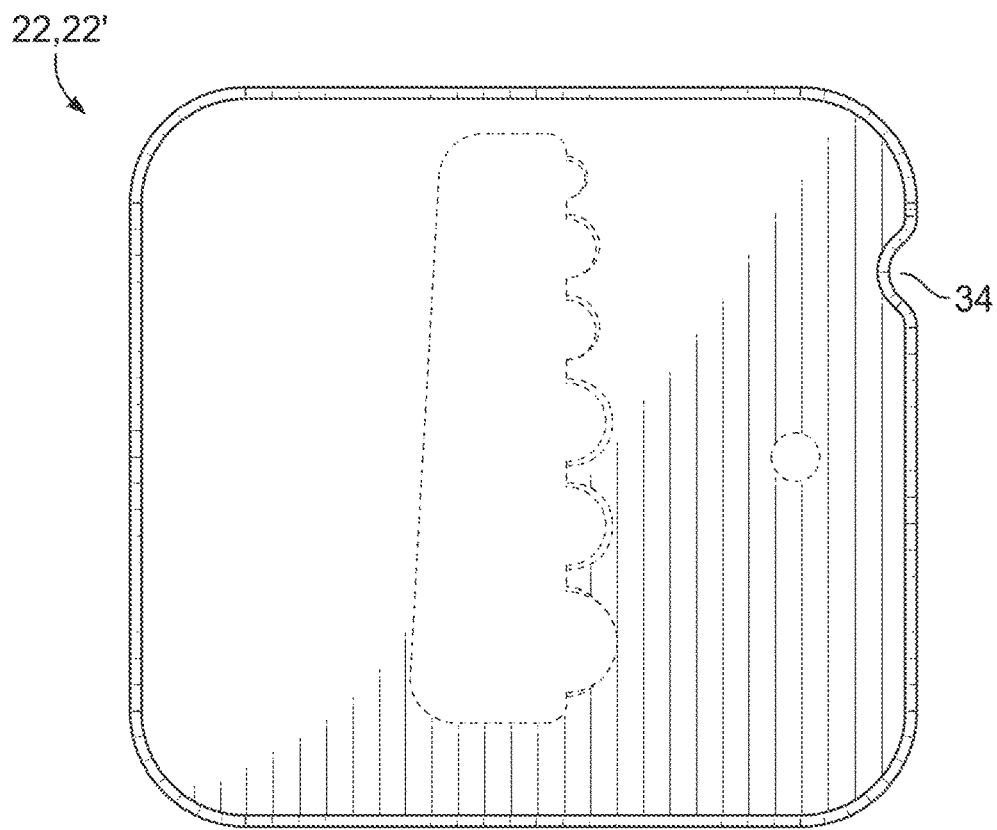
FIG. 14 depicts a right side elevation view of the outer edge of the die of FIG. 13.
Figure 15:
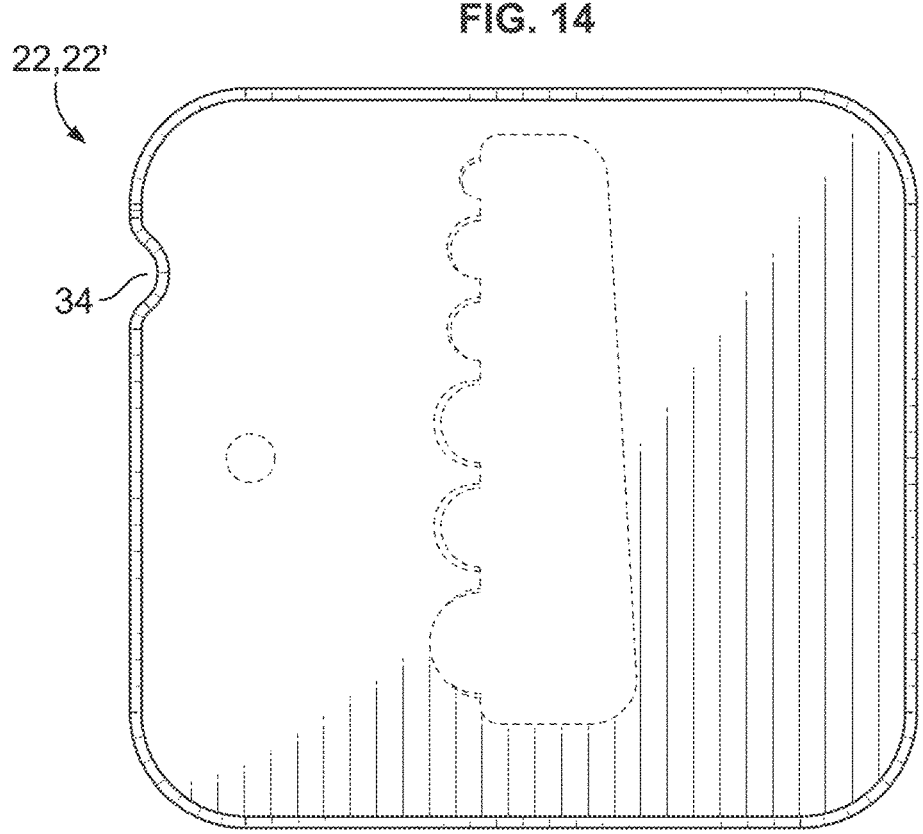
FIG. 15 depicts a left side elevation view of the outer edge of the die of FIG. 13.
Figure 16:
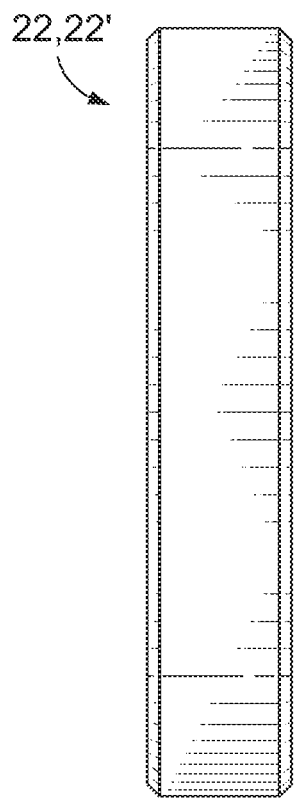
FIG. 16 depicts a front elevation view of the outer edge of the die of FIG. 13.
Figure 17:
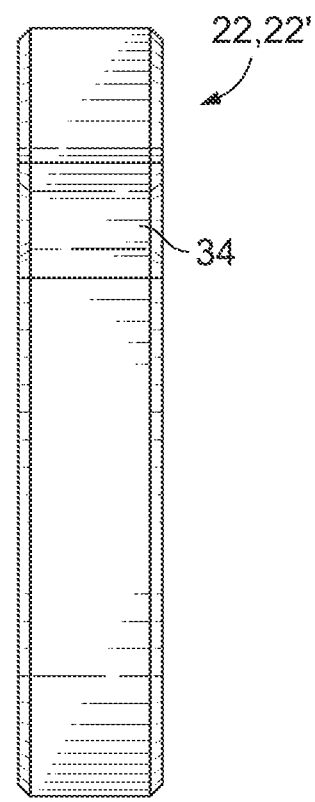
FIG. 17 depicts a rear elevation view of the outer edge of the die of FIG. 13.
Figure 18:
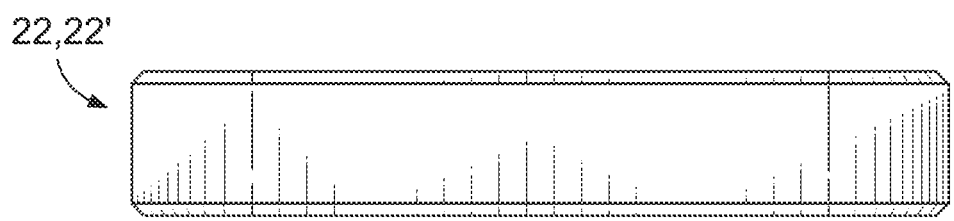
FIG. 18 depicts a top elevation view of the outer edge of the die of FIG. 13.
Figure 19:
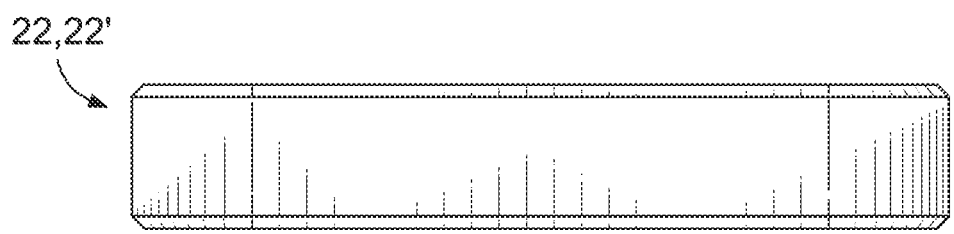
FIG. 19 depicts a bottom elevation view of the outer edge of the die of FIG. 13.
Figure 20:
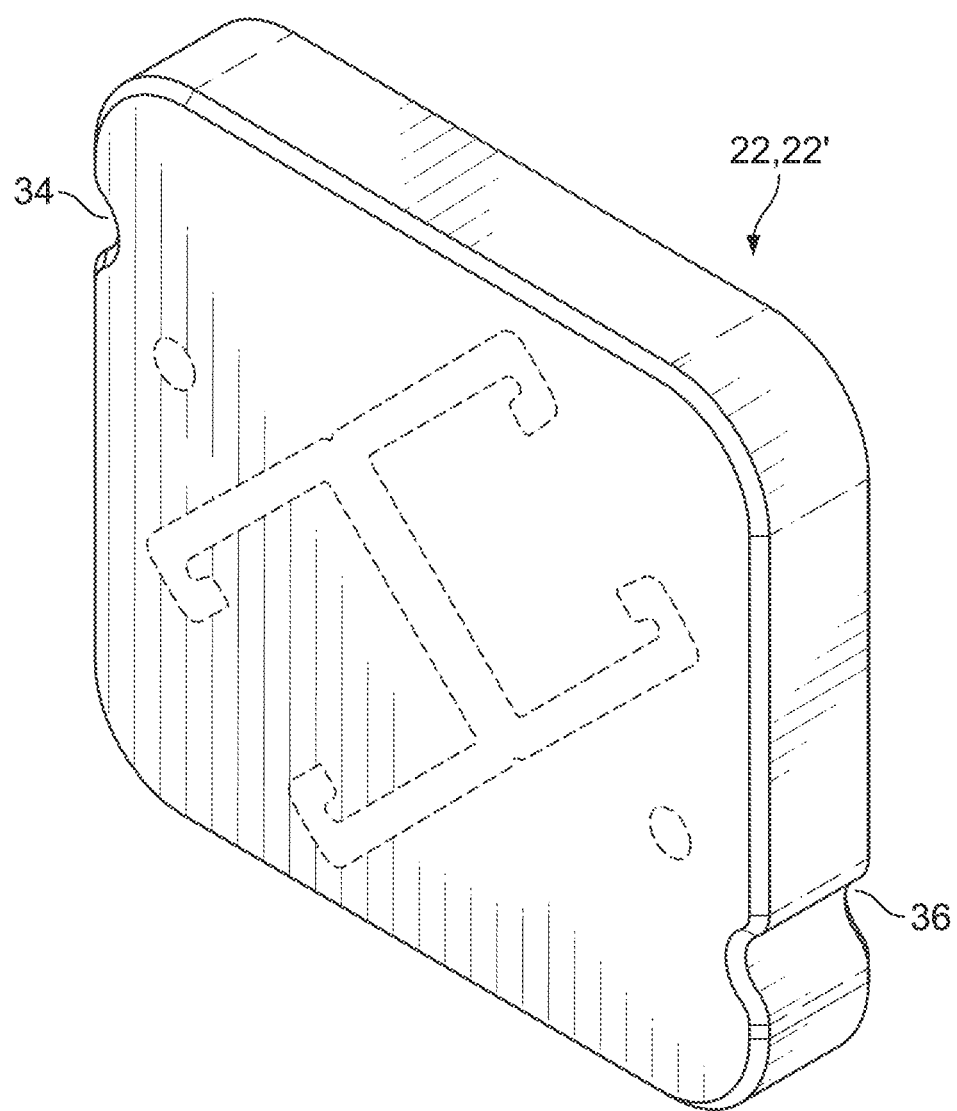
FIG. 20 depicts a perspective view of yet another alternate outer edge of a die that can be used with the shearing apparatus.
Figure 21:
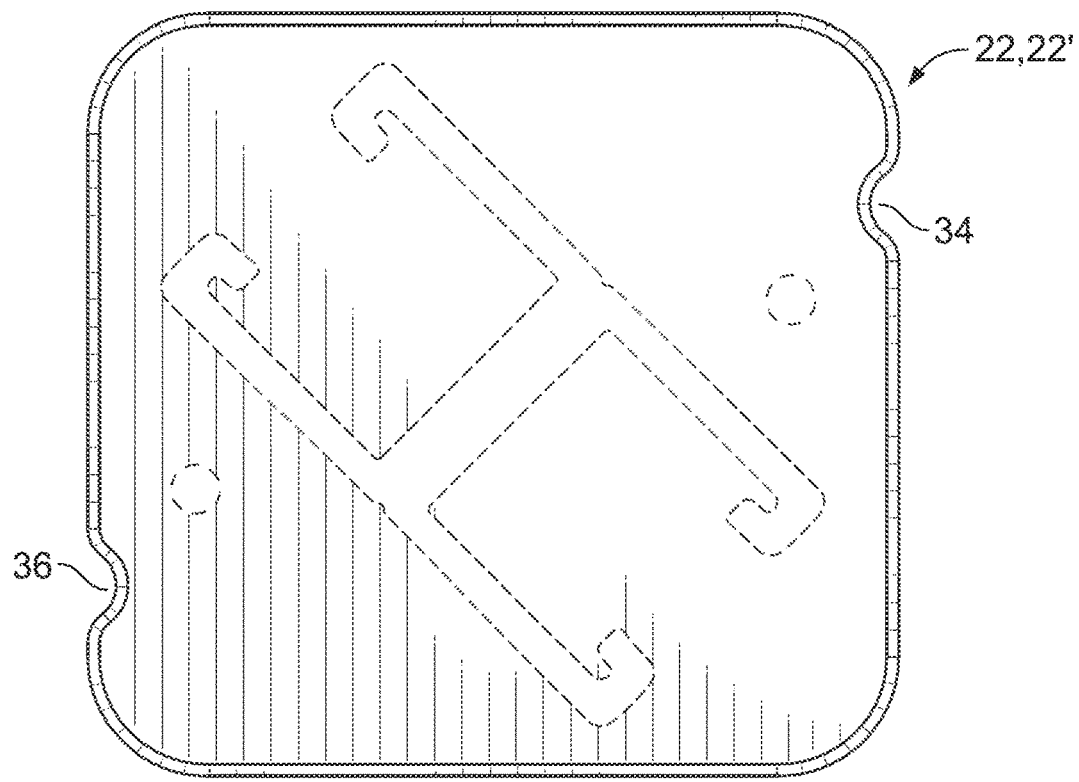
FIG. 21 depicts a right side elevation view of the outer edge of the die of FIG. 20.
Figure 22:
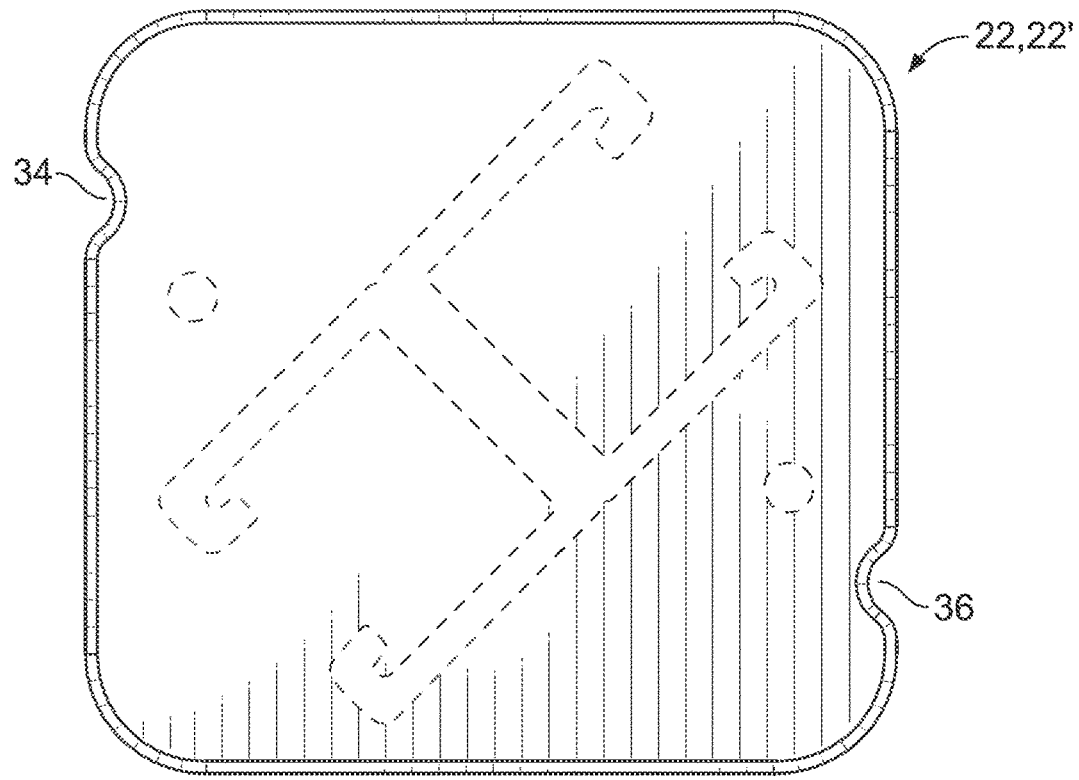
FIG. 22 depicts a left side elevation view of the outer edge of the die of FIG. 20.
Figure 23:
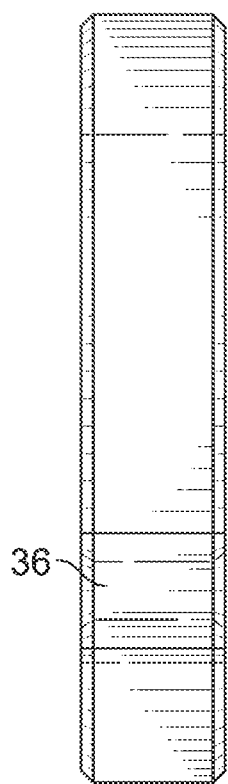
FIG. 23 depicts a front elevation view of the outer edge of the die of FIG. 20.
Figure 24:
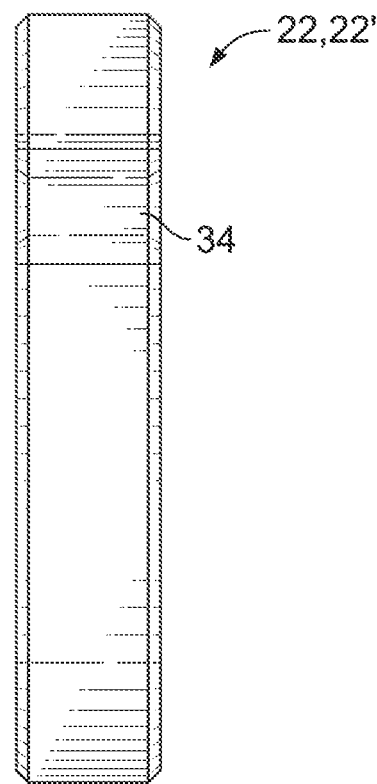
FIG. 24 depicts a rear elevation view of the outer edge of the die of FIG. 20.
Figure 25:
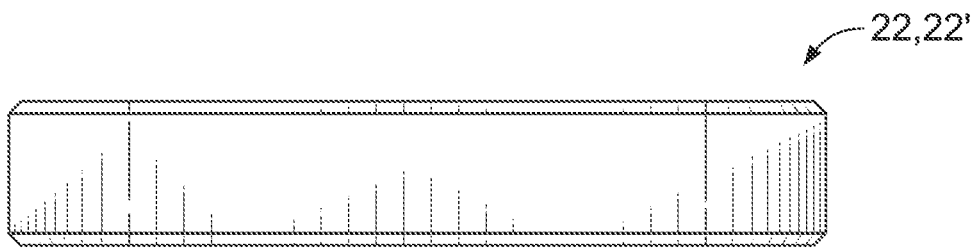
FIG. 25 depicts a top elevation view of the outer edge of the die of FIG. 20.
Figure 26:
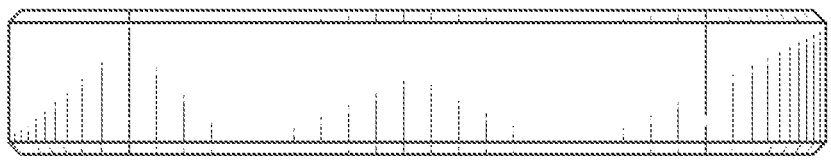
FIG. 26 depicts a bottom elevation view of the outer edge of the die of FIG. 20.
Figure 49:
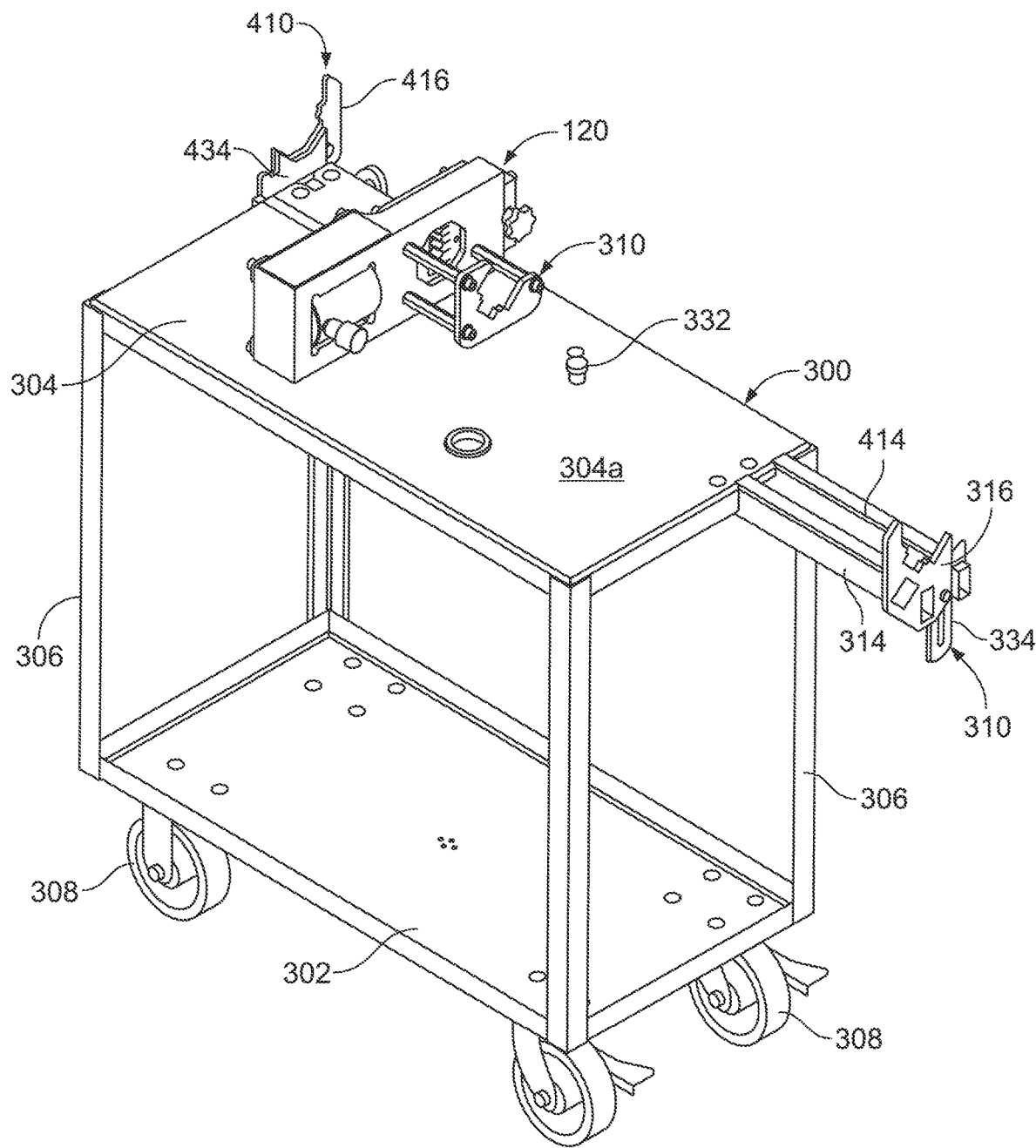
FIG. 49 depicts a perspective view of the shearing apparatus mounted on a mobile cart.

In some embodiments, a workpiece rest assembly 250, see FIGS. 3, 4 and 49, extends outwardly from the side wall 148 of the housing 122 and is used to support the workpiece during the shearing operation. The workpiece rest assembly 250 includes a workpiece seat plate 252 which is cantilevered from the side wall 148 by a plurality of standoffs 253.

As shown in FIG. 4, the workpiece seat plate 252 has an upper edge 252a, a lower edge 252b, a front edge 252c and a rear edge 252d. In an embodiment, the upper, lower and rear edges 252a, 252b, 252d are straight, and the front edge 252c has a vertical section 252c' and a horizontal section 252c". A cutout 254 is provided in the workpiece seat plate 252 and extends downwardly from the upper edge 252a and inwardly from the horizontal section 252c" of the front edge 252c. The profile of the cutout 254 can vary from that shown in the drawings. The cutout 254 provides a seat into which a variety of workpieces can be seated to properly align the workpieces with the cutouts 30 in the shear dies 22, 22'.

In some embodiments, the cutout 254 includes series of surfaces 254a-254k which are perpendicular to each other. A first surface 254a extends from the upper edge 252a and extends at an angle relative to a vertical centerline of the workpiece seat plate 252. An eleventh surface 254k extends from the horizontal section 252c" of the front edge 252c and is parallel to, but offset from, the first surface 254a. The first, third, fifth, seventh, ninth and eleventh surfaces 254a, 254c, 254e, 254g, 254i, 254k are parallel to each other. The second, fourth, sixth, eighth, tenth surfaces 254b, 254d, 254f, 254h, 254j are parallel to each other. Surfaces 254b and 254j are aligned with each other. Surfaces 254d and 254h are aligned with each other. Surface 254f has a width which is less than the width between surfaces 254c and 254i. The width between surfaces 254c and 254i is less than the width between surfaces 254a and 254k. In an embodiment, the horizontal section 252c" of the front edge 252c is eliminated and the eleventh surface 252k extends to the vertical section 252c' of the front edge 252c. The cutout 254 aligns with the through passageways 164, 174 in the side wall 148 and the second housing part 140. The different workpieces can be supported on the surfaces 254a-254k such that the workpieces are aligned with the particular cutout 30 in the dies 22, 22'. In some embodiments, if the dies 22, 22' having the cutouts 30 for threaded rod are mounted in the shearing apparatus 120, the workpiece rest assembly 250 is not used.

Figure 50:
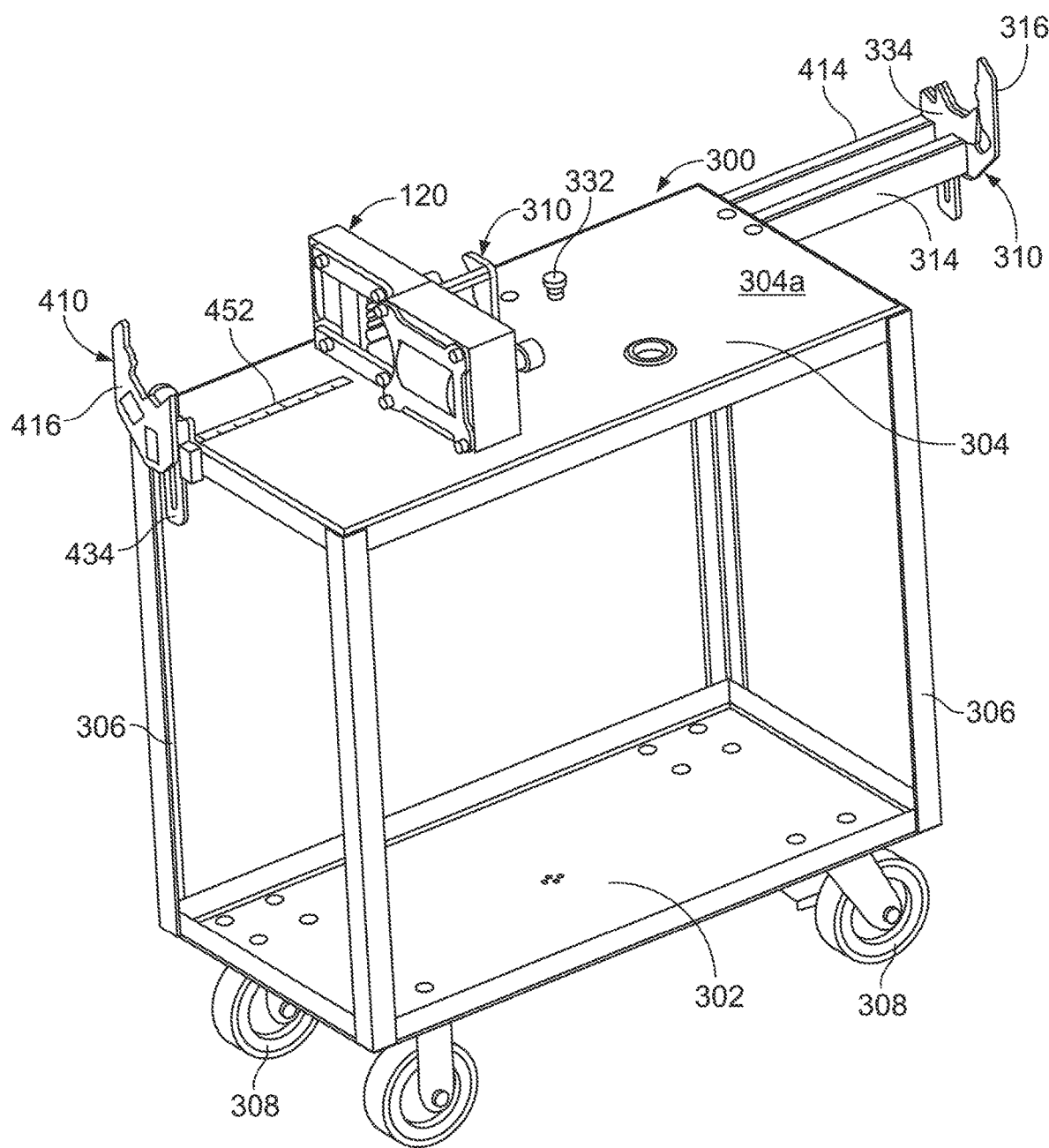
FIG. 50 depicts an alternate perspective view of the shearing apparatus mounted on the mobile cart.

In some embodiments, the shearing apparatus 120 is mounted on a mobile cart 300, see FIGS. 49 and 50, so that the shearing apparatus 120 can be easily moved to different job sites. The cart 300 also provides a storage space for the hydraulic pump (not shown), additional shear dies 22, 22', additional workpieces, etc.

In an embodiment, the cart 300 includes a lower tray 302 and an upper tray 304 which are vertically spaced apart from each other by a plurality of upright legs 306. In some embodiments, the trays 302, 304 are rectangular and the upright legs 306 extend from the corners thereof. In some embodiments, a plurality of conventional casters 308 extend from a lower surface of the lower tray 302 in order to allow the cart 300 to be mobile. The casters 308 can be locked to prevent movement as is known in the art.

The upper tray 304 has a planar upper surface 304a upon which the shearing apparatus 120 is seated. In some embodiments, the shearing apparatus 120 is fixedly attached to the upper tray 304 by suitable means such as fasteners.

Figure 51:
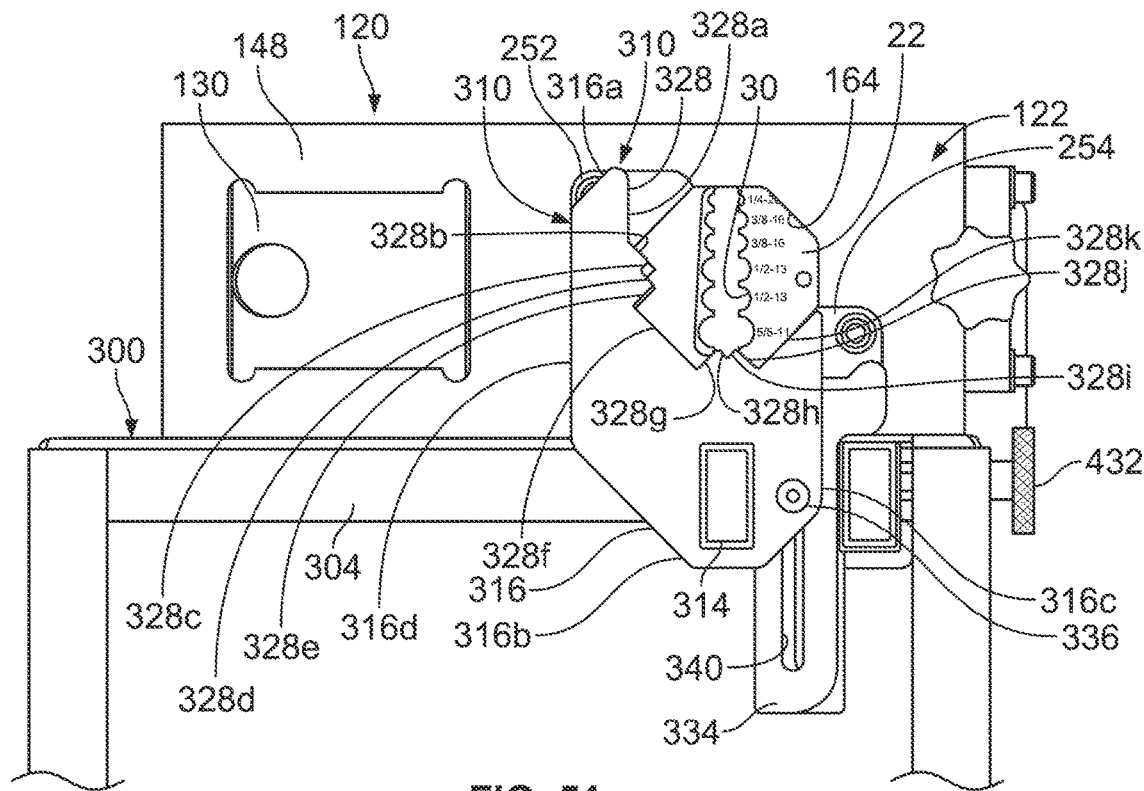
FIG. 51 depicts a partial side elevation view of the shearing apparatus and mobile cart, showing a workpiece rest provided on the mobile cart.

In some embodiments, a workpiece rest 310, see FIGS. 49-51, is provided on the cart 300 to allow an operator to seat a portion of the workpiece thereon. The workpiece rest 310 includes a slide channel 312 attached to the upper tray 304, an extension beam 314 mounted within the slide channel 312 and slidable relative thereto, and a workpiece seat plate 316 affixed to an end of the extension beam 314. In an embodiment, the slide channel 312 is attached to the lower surface of the upper tray 304.

Figure 53:
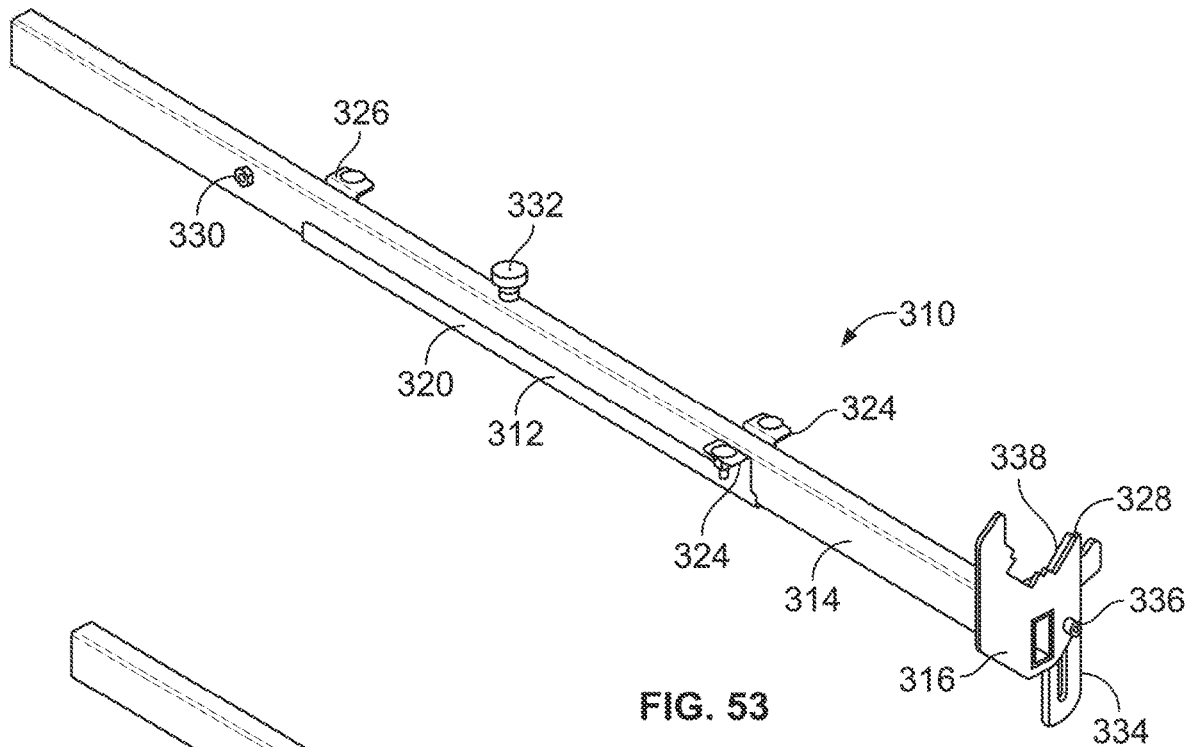
FIG. 53 depicts a perspective view of the workpiece rest.
Figure 54:
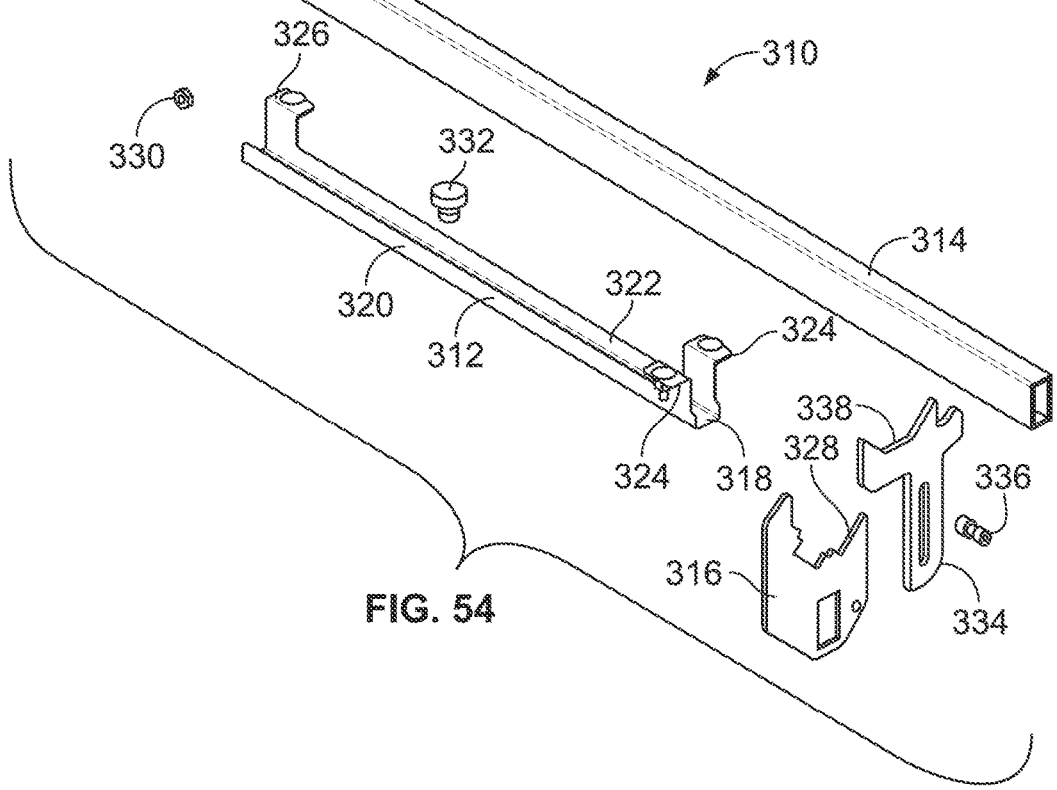
FIG. 54 depicts an exploded perspective view of the workpiece rest.

In an embodiment, the slide channel 312, see FIGS. 53 and 54, is generally U-shaped having a base wall 318 and first and second upright walls 320, 322 which depend from the base wall 318. L-shaped legs 324 extend from a first end of the base wall 318 and are attached to the upper tray 304 by suitable means such as fasteners or welding. An L-shaped leg 326 extends from an end of the base wall 318 and are attached to the upper tray 304 by suitable means such as fasteners or welding.

The extension beam 314, see FIGS. 53 and 54, is elongated and seats within the slide channel 312. In an embodiment, the extension beam 314 has a length which is greater than the length of the upper tray 304 such that end portions of the extension beam 314 can extend outwardly from the upper tray 304.

The workpiece seat plate 316 is fixed to a loading end of the extension beam 314 by suitable means, such as welding. As shown in FIG. 51, the workpiece seat plate 316 has an upper edge 316a, a lower edge 316b, a front edge 316c and a rear edge 316d. In an embodiment, the workpiece seat plate 316 is planar. A cutout 328 is provided in the workpiece seat plate 316 and extends downwardly from the upper edge 316a and inwardly from the front edge 316c. The profile of the cutout 328 can vary from that shown in the drawings, however, the cutout 328 provides a seat into which a variety of workpieces can be seated to properly align the workpiece with the cutouts 30 in the shear dies 22, 22'. In some embodiments, the profile of the cutout 328 has the same shape as, or generally the same shape as, the profile of the cutout 254 of the workpiece seat plate 252 of the workpiece rest assembly 250.

In some embodiments, the cutout 328 includes series of surfaces 328a-328k, with surfaces 328b-328k being perpendicular to each other. A first surface 328a extends from the upper edge 316a and extends parallel to a vertical centerline of the plate 316. An eleventh surface 328k extends from the front edge 316c extends at an angle relative to the vertical centerline of the plate 316. The second, fourth, sixth, eighth, tenth surfaces 328b, 328d, 328f, 328h, 328j are parallel to each other. The third, fifth, seventh, ninth and eleventh surfaces 328c, 328e, 328g, 328i, 328k are parallel to each other. Surfaces 328b and 328j are aligned with each other. Surfaces 328d and 328h are aligned with each other. Surface 328f has a width which is less than the width between surfaces 328c and 328i. The width between surfaces 328c and 328i is less than the width between surfaces 328a and 328k. The surfaces 254f, 328f align with each other, the surfaces 254g, 328g align with each other, the surfaces 254h, 328h align with each other, the surfaces 254i, 328i align with each other, the surfaces 254j 328j align with each other, and the surfaces 254k, 328k align with each other. Surfaces 254e and 328e may align with each other or may be slightly offset from one another. The cutout 328 also aligns with the through passageways 164, 174 in the side wall 148 and the second housing part 140 such that the workpiece seated thereon are aligned with the cutouts 30 in the dies 22, 22' depending upon which surfaces 254a-254k and 328a-328k are being used to support the workpiece. The workpiece seat plate 316 prevents the end of the extension beam 314 from moving into the slide channel 312.

In an embodiment, a stop 330, FIG. 53, which may take the form of a fastener, is attached to the extension beam 314. The stop 330 is provided on the extension beam 314 on the opposite side of the legs 324 than where the workpiece seat plate 316 is provided. When the stop 330 engages with the leg 324, the extension beam 314 is prevented from further moving along the length of the upper tray 304.

In an embodiment, a lock 332, see FIG. 50, is provided on the upper tray 304 which engages with the extension beam 314 to prevent movement of the extension beam 314 relative to the upper tray 304. In an embodiment, the lock 332 is set screw which extends through the upper tray 304 and engages with a surface of the extension beam 314. In an embodiment, the lock 332 extends through the top of the upper tray 304.

To move the extension beam 314 relative to the slide channel 312 and the upper tray 304, the lock 332 is disengaged and the extension beam 314 is slid such that the workpiece seat plate 316 is moved closer to or further away from the edge of the upper tray 304. Once the desired position is reached, the lock 332 is engaged to prevent movement of the extension beam 314 relative to the slide channel 312 and the upper tray 304.

In some embodiments, a height adjustable workpiece seat plate 334 is movably attached to the workpiece seat plate 316. The position of the height adjustable workpiece seat plate 334 can be vertically adjusted relative to the workpiece seat plate 316 and fixed in position to the workpiece seat plate 316 by a locking mechanism 336. This allows for workpieces, such as threaded rod, to be supported above the seat formed by the cutout 328 in the workpiece seat plate 316. In an embodiment, the workpiece seat plate 334 is between the workpiece seat plate 316 and the shearing apparatus 120.

Figure 52:
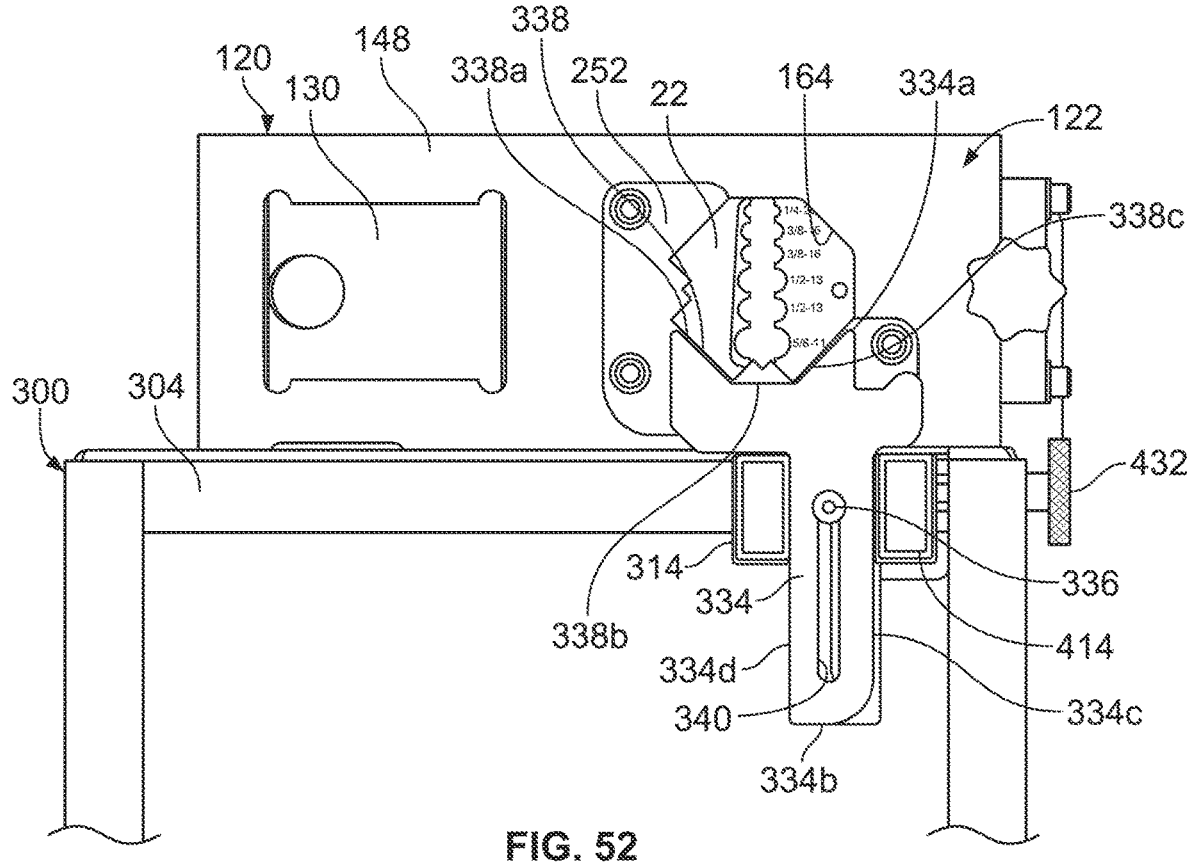
FIG. 52 depicts a partial side elevation view of the shearing apparatus and mobile cart, with a workpiece seat plate of the workpiece rest removed.

As shown in FIG. 52, the workpiece seat plate 334 has an upper edge 334a, a lower edge 334b, a front edge 334c and a rear edge 334d. In an embodiment, the workpiece seat plate 334 is planar. A cutout 338 is provided in the workpiece seat plate 334 and extends downwardly from the upper edge 334a and inwardly from the front edge 334c. The profile of the cutout 338 can vary from that shown in the drawings, however, the cutout 338 provides a seat into which a variety of workpieces can be seated to properly align the workpiece with the cutouts 30 in the shear dies 22, 22'. In an embodiment, the profile of the cutout 338 includes a first surface 338a extending from the upper edge 334a and which extends at an angle relative to a vertical centerline of the workpiece seat plate 334, a second surface 338b extending from the first surface 338a and which is perpendicular to the vertical centerline of the workpiece seat plate 334, and a third surface 338c extending from the second surface 338b and which extends at an angle relative to the vertical centerline of the workpiece seat plate 334. The first and third surfaces 338a, 338c angle toward each other such that the upper ends of the first and third surfaces 338a, 338c are spaced further apart from each other than the distance the lower ends of the first and third surfaces 338a, 338c are spaced apart from each other. In a lowered position, the first surfaces 228a aligns with the sixth surfaces 254f and 328f of the workpiece seat plate 252 and the workpiece seat plate 316, and the third surface 338c aligns with the eleventh surfaces 254k and 328k of the workpiece seat plate 252 and the workpiece seat plate 316.

Figure 55:
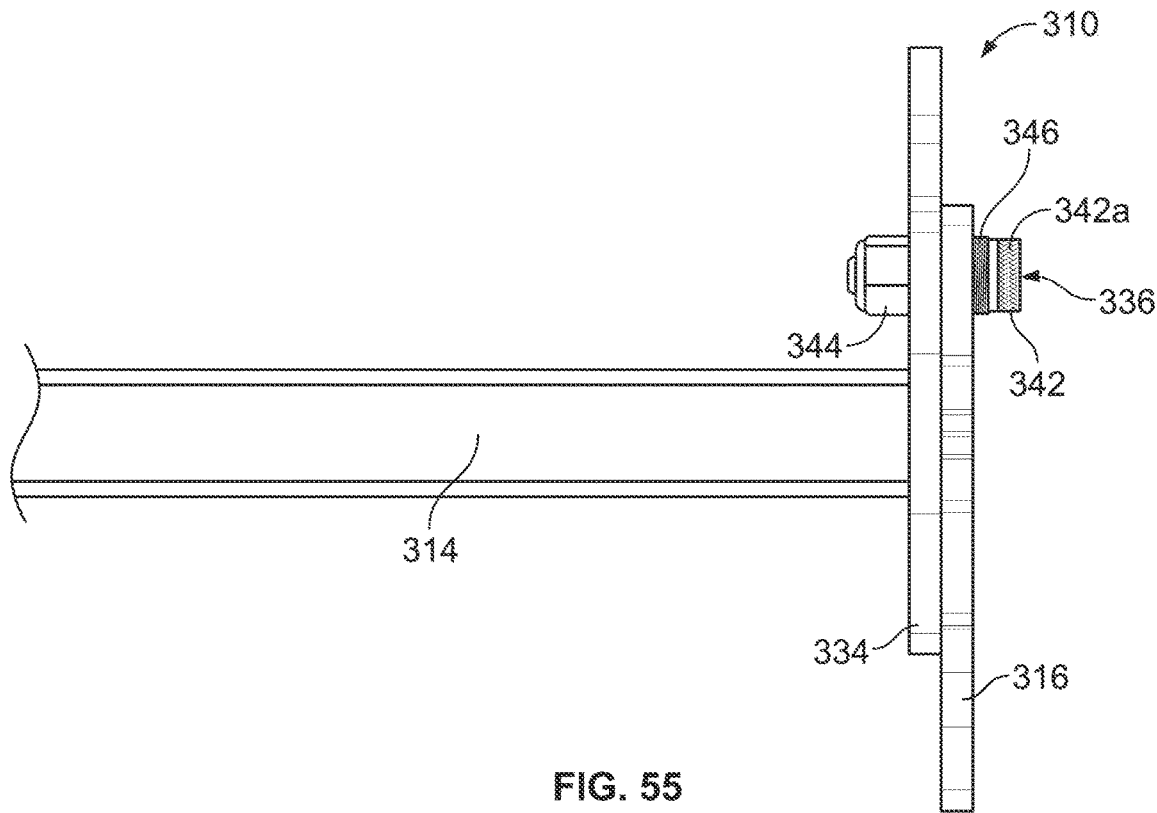
FIG. 55 depicts a partial top plan view of the workpiece rest.

In an embodiment, the locking mechanism 336 includes an elongated vertical slot 340 through the workpiece seat plate 334, a fastener 342 which extends through the workpiece seat plate 316 and through the slot 340, a nut 344 attached to the end of the fastener 342 and a spring 346 between a head 342a of the fastener 342 and the workpiece seat plate 316, see FIGS. 52 and 55.

To move the workpiece seat plate 334 relative to the workpiece seat plate 316, the operator grasps the workpiece seat plate 334 and lifts or lowers the workpiece seat plate 334 to a new position by sliding the workpiece seat plate 334 relative to the workpiece seat plate 316 such that the fastener 342 is repositioned within the elongated slot 340. Alternatively, to move the workpiece seat plate 334 relative to the workpiece seat plate 316, the operator pushes the head 342a toward the workpiece seat plate 316 and compresses the spring 346 to move the nut 344 away from the workpiece seat plate 334; the workpiece seat plate 334 can then be lifted (or lowered) by the operator to a new position by sliding the workpiece seat plate 334 relative to the workpiece seat plate 316 such that the fastener 342 is repositioned within the elongated slot 340, the head 342a is released, the spring 346 expands and the nut 344 reengages with the workpiece seat plate 334 to fix the workpiece seat plate 334 in position relative to the workpiece seat plate 316. This allows the cutout 338 of the workpiece seat plate 334 to be moved to support workpieces which are above the profile of the cutout 328 of the workpiece seat plate 316. Alternate locking mechanisms can be provided.

Figure 56:
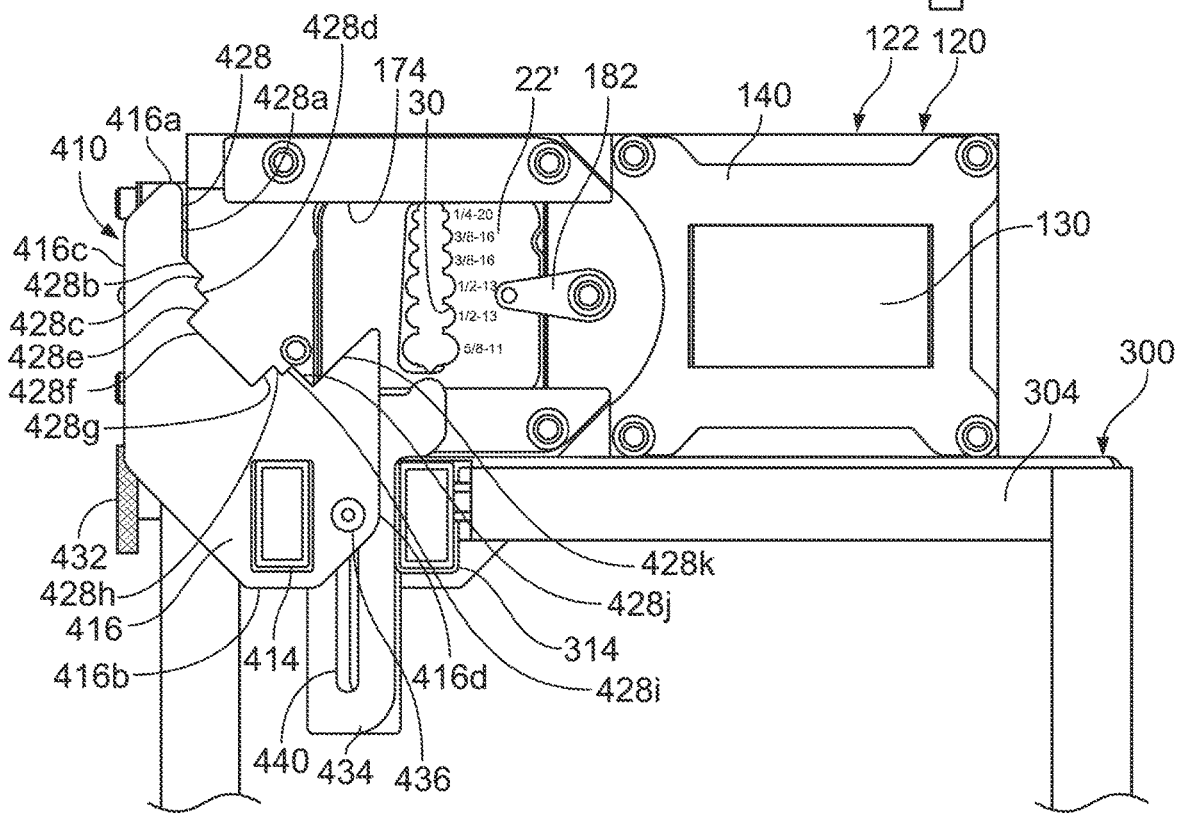
FIG. 56 depicts a partial side elevation view of the shearing apparatus and mobile cart, showing a measurement assembly provided on the mobile cart.

In some embodiments, a measurement assembly 410, see FIGS. 49, 40 and 56, is attached to the cart 300 and enables a user to accurately determine the length of workpiece to be cut. In some embodiments, the measurement assembly 410 is used to cut the workpiece into common finished lengths (for example, between 12 and 48 inches). The measurement assembly 410 includes a slide channel 412 attached to the upper tray 304, an extension beam 414 mounted within the slide channel 412 and slidable relative thereto, and a first stop plate 416 affixed to an end of the extension beam 414 and a height adjustable second stop plate 434 movably attached to the first stop plate 416. In an embodiment, the slide channel 412 is attached to the lower surface of the upper tray 304. The extension beams 314, 414 are parallel to each other.

Figure 58:
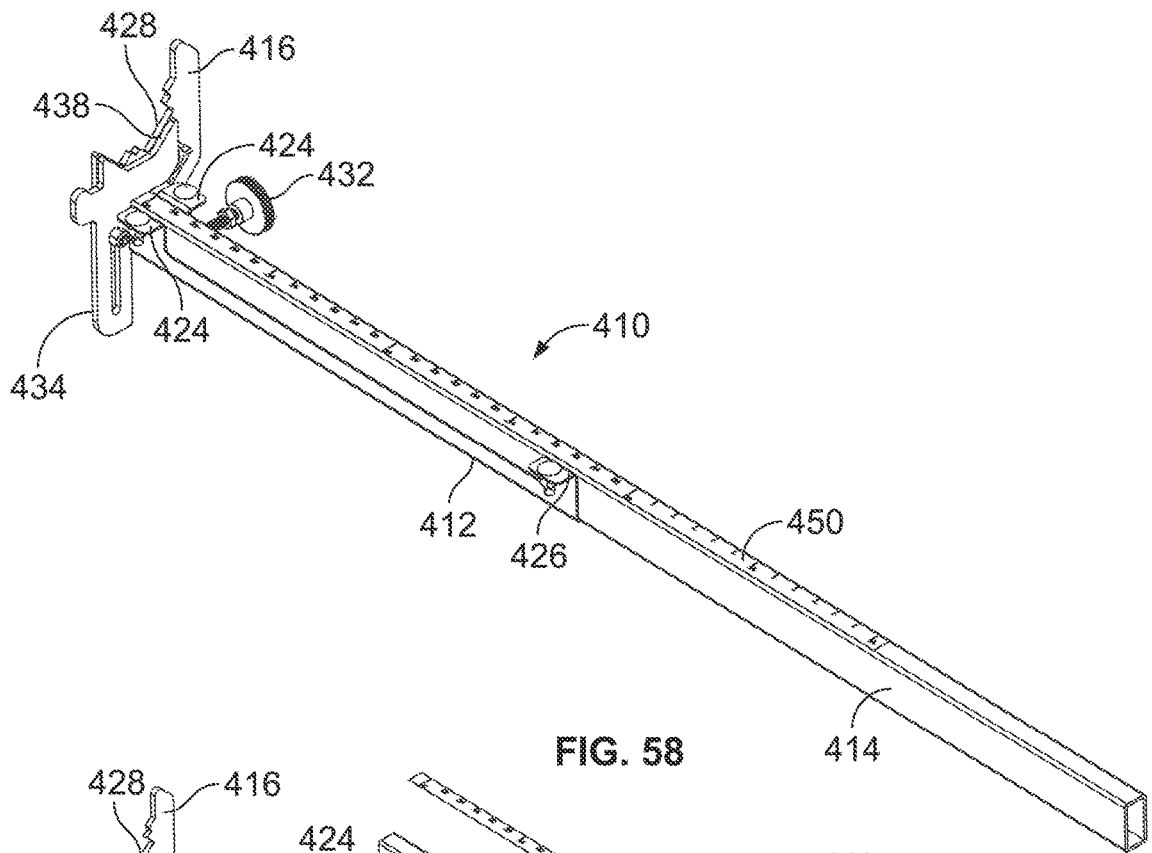
FIG. 58 depicts a perspective view of the measurement assembly.
Figure 59:
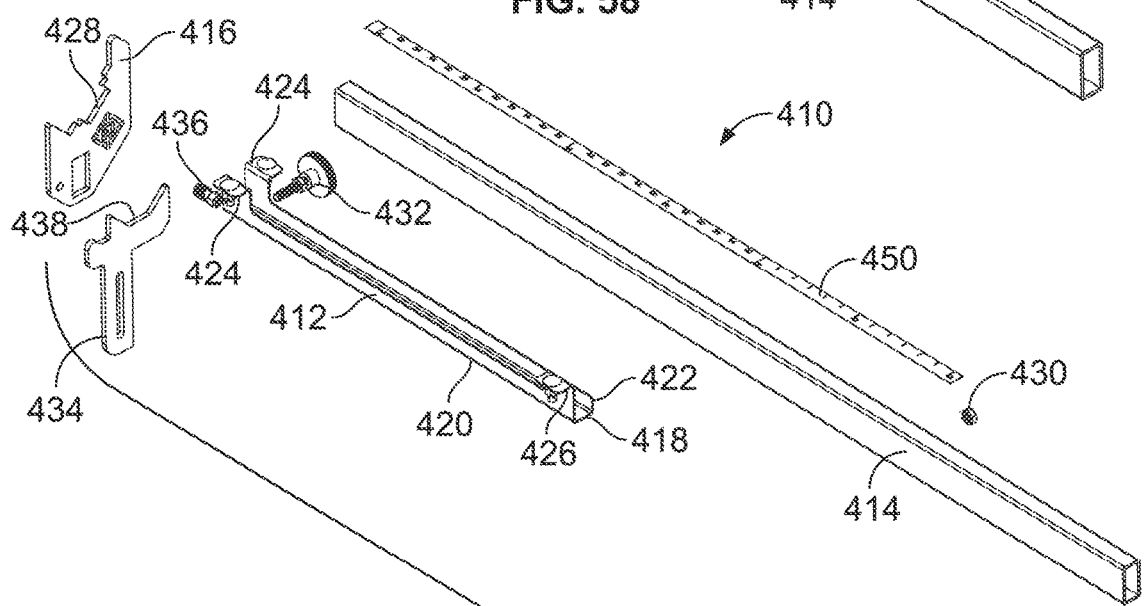
FIG. 59 depicts an exploded perspective view of the measurement assembly.
Figure 60:
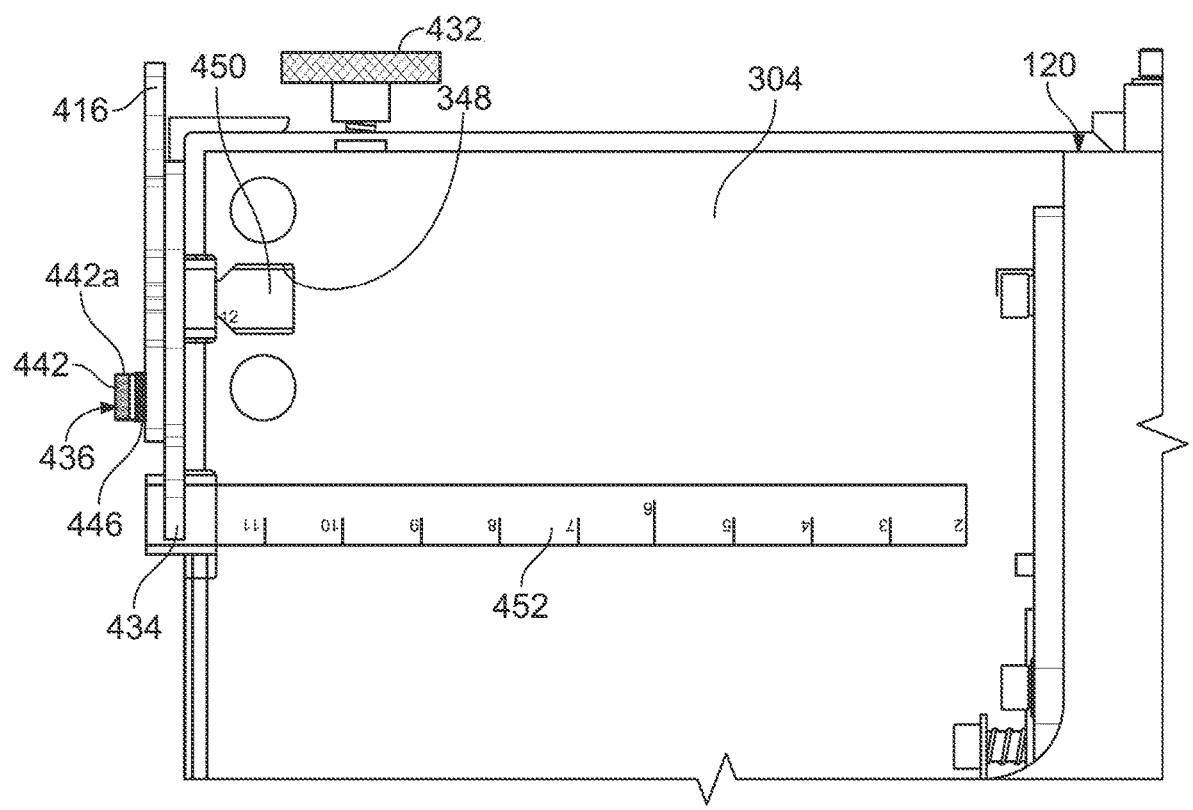
FIG. 60 depicts a partial top plan view of the shearing apparatus and mobile cart.
Figure 61:
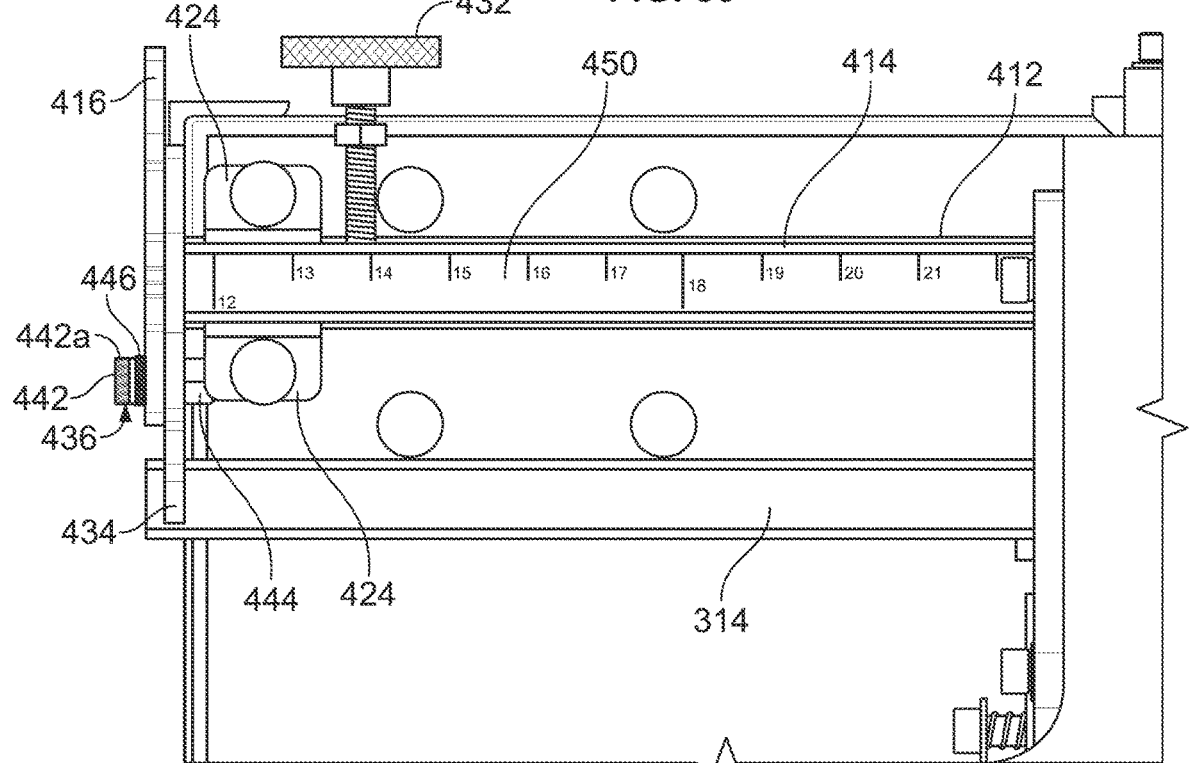
FIG. 61 depicts a partial top plan view of the shearing apparatus and mobile cart with an upper tray of the mobile cart removed.

In an embodiment, the slide channel 412, see FIGS. 58 and 59, is generally U-shaped having a base wall 418 and first and second upright walls 420, 422 which depend from the base wall 418. L-shaped legs 424 extend from a first end of the base wall 418 and are attached to the upper tray 304 by suitable means such as fasteners or welding. An L-shaped leg 426 extends from an end of the base wall 418 and are attached to the upper tray 304 by suitable means such as fasteners or welding.

The extension beam 414, see FIGS. 58 and 59, is elongated and seats within the slide channel 412. In an embodiment, the extension beam 414 has a length which is greater than the length of the upper tray 304 such that end portions of the extension beam 414 can extend outwardly from the upper tray 304. A measuring tape 450 is provided on the extension beam 414 and allows the operator to set the distance the second stop plate 434 is away from the shearing apparatus 120. In an embodiment, the measuring tape 450 is a decal adhered to the extension beam 414. In an embodiment, the measuring tape 450 is painted on or printed on the extension beam 414. In an embodiment, the measuring tape 450 is engraved, such as by a laser, into the extension beam 414. As the operator pulls more of the extension beam 414 outwardly from the upper tray 304, more of the measuring tape 450 is exposed. In an embodiment, the upper tray 304 has a window 348 provided therethrough which allows the operator to see the measurements on the measuring tape 450. This allows the operator to set the desired distance the second stop plate 434 is away from the die 22' to set the length of the cut section of the workpiece.

The first stop plate 416 is fixed to an end of the extension beam 414 by suitable means, such as welding. As shown in FIG. 56, the first stop plate 416 has an upper edge 416a, a lower edge 416b, a front edge 416c and a rear edge 416d. In an embodiment, the first stop plate 416 is planar. In some embodiments, a cutout 428 is provided in the first stop plate 416 and extends downwardly from the upper edge 416a and inwardly from the front edge 416c. The profile of the cutout 428 can vary from that shown in the drawings. In some embodiments, the profile of the cutout 428 has the same shape as, or generally the same shape as, the profile of the cutout 328 in the workpiece seat plate 316. The cutout 428 does not completely align with the through passageway 164 in the side wall 148.

In some embodiments and as shown in FIG. 56, the cutout 428 includes series of surfaces 428a-428k, with surfaces 428b-428k being perpendicular to each other. A first surface 428a extends from the upper edge 416a and extends parallel to a vertical centerline of the plate 416. An eleventh surface 428k extends from the front edge 416c extends at an angle relative to the vertical centerline of the plate 416. The second, fourth, sixth, eighth, tenth surfaces 428b, 428d, 428f, 428h, 428j are parallel to each other. The third, fifth, seventh, ninth and eleventh surfaces 428c, 428e, 428g, 428i, 428k are parallel to each other. Surfaces 428b and 428j are aligned with each other. Surfaces 428d and 428h are aligned with each other. Surface 428f has a width which is less than the width between surfaces 428c and 428i. The width between surfaces 428c and 428i is less than the width between surfaces 428a and 428k. The first stop plate 416 prevents the end of the extension beam 414 from moving into the slide channel 412.

In an embodiment, a stop 430, which may take the form of a fastener, is attached to the extension beam 414. The stop 430 is provided on the extension beam 414 on the opposite side of the legs 424 than where the first stop plate 416 is provided. When the stop 430 engages with the leg 424, the extension beam 414 is prevented from further moving along the length of the upper tray 304.

In an embodiment, a lock 432, see FIGS. 51 and 52, is provided on the upper tray 304 which engages with the extension beam 414 to prevent movement of the extension beam 414 relative to the upper tray 304. In an embodiment, the lock 432 is set screw which extends through the upper tray 304 and engages with a surface of the extension beam 414. In an embodiment, the lock 432 extends through a side of the upper tray 304. Alternate locks 432 can be provided. For example, the extension beam 414 can have a plurality of spaced apart apertures provided therethrough and a spring biased pin extends through the upper tray 304. The spring biased pin can be seated within each aperture or retracted therefrom to allow the extension beam 414 to move relative to the upper tray 304.

The second stop plate 434 is movably attached to the first stop plate 416. The position of the second stop plate 434 can be vertically adjusted relative to the first stop plate 416 and fixed in position to the first stop plate 416 by a locking mechanism 436. The second stop plate 434 is between the first stop plate 416 and the shearing apparatus 120.

Figure 57:
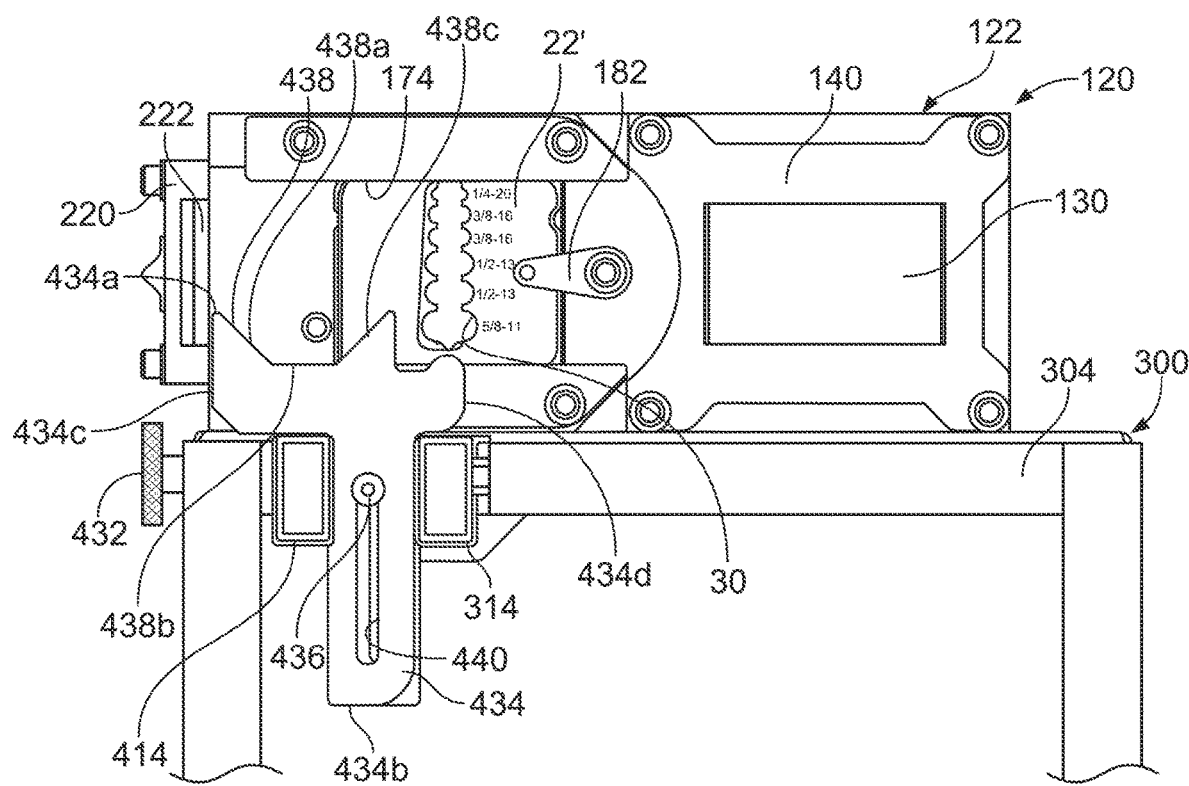
FIG. 57 depicts a partial side elevation view of the shearing apparatus and mobile cart, with a first stop plate of the measurement assembly removed.

As shown in FIG. 57, the second stop plate 434 has an upper edge 434*a*, a lower edge 434*b*, a front edge 434*c* and a rear edge 434*d*. In an embodiment, the second stop plate 434 is planar. In some embodiments, a cutout 438 is provided in the second stop plate 434 and extends downwardly from the upper edge 434*a* and inwardly from the front edge 434*c*. The profile of the cutout 438 can vary from that shown in the drawings. As shown, and in an embodiment, the profile of the cutout 438 includes a first surface 438*a* extending from the upper edge 434*a* and which extends at an angle relative to a vertical centerline of the second stop plate 434, a second surface 438*b* extending from the first surface 438*a* and which is perpendicular to the vertical centerline of the second stop plate 434, and a third surface 438*c* extending from the second surface 438*b* and which extends at an angle relative to the vertical centerline of the second stop plate 434. The first and third surfaces 438*a*, 438*c* angle toward each other such that the upper ends of the first and third surfaces 438*a*, 438*c* are spaced further apart from each other than the distance the lower ends of the first and third surfaces 438*a*, 438*c* are spaced apart from each other.

In an embodiment, the locking mechanism 436 includes an elongated vertical slot 440 through the second stop plate 434, a fastener 442 which extends through the first stop plate 416 and through the slot 440, a nut 444 attached to the end of the fastener 442 and a spring 446 between a head 442*a* of the fastener 442 and the first stop plate 416.

To move the extension beam 414 relative to the slide channel 412 and the upper tray 304, the lock 432 is disengaged and the extension beam 414 is slid such that the second stop plate 434 is moved closer to or further away from the edge of the upper tray 304. Once the desired position is reached, the lock 432 is engaged to prevent movement of the extension beam 414 relative to the slide channel 412 and the upper tray 304. The extension beam 314 is pulled outwardly from the upper tray 304 in a first direction, and the extension beam 414 is pulled outwardly from the upper tray 304 in a second, opposite direction.

To move the second stop plate 434 relative to the first stop plate 416, the operator grasps the second stop plate 434 and lifts or lowers the second stop plate 434 to a new position by sliding the second stop plate 434 relative to the first stop plate 416 such that the fastener 442 is repositioned within the elongated slot 440. Alternatively, the operator pushes the head 442*a* toward the first stop plate 416 and compresses the spring 446, thereby moving the nut 444 away from the second stop plate 434; the second stop plate 434 can then be lifted (or lowered) by the operator to a new position by sliding the second stop plate 434 relative to the first stop plate 416 such that the fastener 442 is repositioned within the elongated slot 440, and thereafter, releasing the head 442*a* such that the spring 446 expands and the nut 444 reengages with the second stop plate 434 to fix the second stop plate 434 in position relative to the first stop plate 416. When the workpiece is loaded into the shearing apparatus 120, the end of the workpiece abuts against the face of the second stop plate 434 that faces the shearing apparatus 120. Alternate locking mechanisms can be provided.

Thereafter, the shearing apparatus 120 is activated as discussed herein and the workpiece is sheared. After the workpiece is sheared, the locking mechanism 436 on the second stop plate 434 is disengaged and the operator lowers the second stop plate 434 downwardly relative to the first stop plate 416. This allows the operator to remove the sheared piece of the workpiece from the shearing apparatus 120. Thereafter, the position of the second stop plate 434 can be reset to allow another workpiece to be sheared.

If the workpiece is to be cut to a length of less than 12 inches, a second measuring tape 452 provided on the upper tray 304 can be used to approximate the distance by aligning the end of the workpiece with the approximate measurement mark on the second measuring tape 452. The second measuring tape 452 may be a decal that is mounted to the upper surface of the upper tray 304. The second measuring tape 452 can be used in conjunction with a square or similar tool for a more exact length.

If the workpiece is to be cut to a length of more than 48 inches, the second stop plate 434 is lowered such that the workpiece can pass by the measurement assembly 410. A ruler or other means can be used to measure the finished length.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A shearing apparatus for shearing a workpiece, comprising:
 a housing comprising walls forming a die pocket having opposite open sides;
 a stationary die which is configured to be seated in the die pocket and configured to be removed from the die pocket, the stationary die having a cutout therethrough which is configured to receive the workpiece therethrough;
 a movable die which is configured to be seated in the die pocket and configured to be removed from the die pocket, the movable die having a cutout therethrough which is configured to receive the workpiece therethrough, the dies and the cutouts aligning with each other within the die pocket in a lateral direction prior to commencement of a shearing action so that the workpiece can be received through both cutouts prior to commencement of the shearing action;
 a force transmitting apparatus configured to provide a force which moves the movable die longitudinally relative to the stationary die and relative to the housing when the dies are seated within the die pocket thereby shearing the workpiece with the shearing action; and
 a die engaging mechanism coupled to the force transmitting apparatus, wherein the die engaging mechanism and the movable die are configured to be coupled together when the movable die is seated within the die pocket such that the movable die is capable of being moved by the force transmitting apparatus to effect the shearing action, and wherein the movable die and the force transmitting apparatus further are configured to be decoupled from each other so that the movable die can be replaced with another movable die.

2. The shearing apparatus of claim 1, wherein the die engaging mechanism comprises an arm having an engagement member thereon which is configured to engage with the movable die and is further configured to disengage from the movable die, the engagement member aligning in the lateral direction with the die pocket, the movable die and the stationary die when engaged with the movable die prior to the shearing action.

3. A shearing apparatus for shearing a workpiece, comprising:
 a housing comprising walls forming a die pocket having opposite open sides;
 a stationary die seated in the die pocket, the stationary die having a cutout therein configured to receive the workpiece;
 a movable die seated in the die pocket, the movable die having a cutout therein configured to receive the workpiece;
 a die engaging mechanism comprising a spring-biased arm having an engagement member thereon which is configured to engage with the movable die; and
 a force transmitting apparatus coupled to the movable die by the die engaging mechanism, the die engaging mechanism configured to be released to decouple the force transmitting apparatus and the movable die; and
 wherein the movable die is movable longitudinally relative to the stationary die and the housing when moved by the force transmitting apparatus.

4. The shearing apparatus of claim 3, wherein the movable die has a receiving opening therein in which the engagement member of the arm is received.

5. The shearing apparatus of claim 4, wherein the arm is pivotable relative to the movable die.

6. The shearing apparatus of claim 5, wherein the engagement member is one of a pin, a spring-biased ball and a magnet.

7. The shearing apparatus of claim 4, wherein the engagement member is one of a pin, a spring-biased ball and a magnet.

8. The shearing apparatus of claim 2, wherein the engagement member is one of a pin, a spring-biased ball and a magnet.

9. The shearing apparatus of claim 3, wherein the engagement member is one of a pin, a spring-biased ball and a magnet.

10. The shearing apparatus of claim 9, wherein the arm is pivotable relative to the movable die.

11. The shearing apparatus of claim 8, wherein the arm is pivotable relative to the movable die.

12. The shearing apparatus of claim 1, wherein a first set of dies comprising the stationary die and the movable die is configured to be mounted in the housing, and a second set of dies comprising the stationary die and the movable die is configured to be mounted in the housing, wherein each die in the first set of dies includes a cutout which is configured to receive a workpiece, and each die in the second set of dies includes a cutout which is configured to receive a workpiece, wherein the cutout in each die in the first set of dies has a different shape than the cutout in each die in the second set of dies.

13. The shearing apparatus of claim 1, wherein the force transmitting apparatus comprises a hydraulic cylinder.

14. The shearing apparatus of claim 3, wherein the movable die is configured to be removed from the housing.

15. The shearing apparatus of claim 14, wherein the stationary die is configured to be removed from the housing.

16. The shearing apparatus of claim 1, wherein the die engaging mechanism is configured to be disengaged from the movable die without the use of tools.

17. The shearing apparatus of claim 2, wherein the movable die has a receiving opening therein in which the engagement member is received.

18. The shearing apparatus of claim 17, wherein the engagement member is one of a pin, a spring-biased ball and a magnet.

19. The shearing apparatus of claim 18, wherein the arm is pivotable relative to the movable die.

20. The shearing apparatus of claim 2, wherein engagement member does not align with the die pocket when disengaged from the movable die.

21. The shearing apparatus of claim 3, wherein the die engaging mechanism is configured to be disengaged from the movable die without the use of tools.

22. The shearing apparatus of claim 3, wherein a first set of dies comprising the stationary die and the movable die is configured to be mounted in the housing, and a second set of dies comprising the stationary die and the movable die is configured to be mounted in the housing, wherein each die in the first set of dies includes a cutout which is configured to receive a workpiece, and each die in the second set of dies includes a cutout which is configured to receive a workpiece, wherein the cutout in each die in the first set of dies has a different shape than the cutout in each die in the second set of dies.

23. The shearing apparatus of claim 3, wherein the force transmitting apparatus comprises a hydraulic cylinder.

* * * * *